US010539411B2

(12) United States Patent
Odaira et al.

(10) Patent No.: US 10,539,411 B2
(45) Date of Patent: Jan. 21, 2020

(54) SAMPLE SHAPE MEASURING APPARATUS

(71) Applicant: OLYMPUS CORPORATION, Tokyo (JP)

(72) Inventors: Mayumi Odaira, Akiruno (JP); Yoshimasa Suzuki, Kawasaki (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 16/406,103

(22) Filed: May 8, 2019

(65) Prior Publication Data
US 2019/0265022 A1 Aug. 29, 2019

Related U.S. Application Data

(63) Continuation of application No. PCT/JP2016/084155, filed on Nov. 17, 2016.

(51) Int. Cl.
| G01B 11/24 | (2006.01) |
| G01B 11/30 | (2006.01) |
| G02B 7/28 | (2006.01) |
| G02B 21/18 | (2006.01) |
| G02B 21/26 | (2006.01) |
| G02B 21/36 | (2006.01) |

(52) U.S. Cl.
CPC ............... *G01B 11/24* (2013.01); *G01B 11/30* (2013.01); *G02B 7/28* (2013.01); *G02B 21/18* (2013.01);
(Continued)

(58) Field of Classification Search
CPC . G01B 11/24; G01B 11/2441; G01B 11/2513; G01B 11/2518; G01B 11/254;
(Continued)

(56) References Cited

U.S. PATENT DOCUMENTS 5,760,906 A * 6/1998 Sato ..................... G01B 11/24
250/559.23
7,277,556 B2 10/2007 Miyawaki et al.
(Continued)

FOREIGN PATENT DOCUMENTS

| JP | H09-251128 A | 9/1997 |
| JP | 2004-109348 A | 4/2004 |

(Continued)

OTHER PUBLICATIONS

International Search Report dated Feb. 7, 2017 issued in International Application No. PCT/JP2016/084155.
(Continued)

*Primary Examiner* — Hoa Q Pham
(74) *Attorney, Agent, or Firm* — Scully, Scott, Murphy & Presser, P.C.

(57) ABSTRACT

A sample shape measuring apparatus includes a light source unit, an illumination optical system, a detection optical system, a light detection element, and a processing apparatus. A scanning unit relatively moves a light spot and the sample. Illumination light applied to the sample is transmitted through the sample, and light transmitted through the sample is incident on the detection optical system. The light detection element receives light. The illumination optical system or the detection optical system includes an optical member. The processing apparatus obtains a quantity of light based on a received light, calculates at least one of a difference and a ratio between the quantity of light and a reference quantity of light, calculates an amount of tilt at a surface of the sample, and calculates a shape of the sample from the amount of tilt.

19 Claims, 45 Drawing Sheets

(52) U.S. Cl.
CPC ............. *G02B 21/26* (2013.01); *G02B 21/36* (2013.01); *G01B 2210/60* (2013.01)

(58) Field of Classification Search
CPC .......... G01B 11/30; G01B 11/26; G01B 9/04; G01B 9/0203; G01B 9/02042; G01B 9/02043; G01B 21/082; G01B 21/18; G01B 21/26; G01B 21/084; G02B 21/36; G02B 7/28
USPC .................................................. 356/601–623
See application file for complete search history.

(56) References Cited

U.S. PATENT DOCUMENTS

| | | | |
|---|---|---|---|
| 9,551,571 B2 * | 1/2017 | Kiontke | G01B 11/27 |
| 2004/0061914 A1 | 4/2004 | Miyawaki et al. | |
| 2018/0073865 A1 * | 3/2018 | Suzuki | G01B 11/26 |
| 2018/0313643 A1 * | 11/2018 | Odaira | G01B 11/26 |
| 2019/0265024 A1 * | 8/2019 | Odaira | G01B 11/2441 |
| 2019/0271644 A1 * | 9/2019 | Suzuki | G01N 21/64 |

FOREIGN PATENT DOCUMENTS

| | | |
|---|---|---|
| JP | 2004-163129 A | 6/2004 |
| JP | 2005-208027 A | 8/2005 |
| JP | 2009-008643 A | 1/2009 |
| JP | 2009-168582 A | 7/2009 |

OTHER PUBLICATIONS

International Preliminary Report on Patentability dated May 31, 2019, together with the Written Opinion received in related International Application No. PCT/JP2016/084155.

* cited by examiner

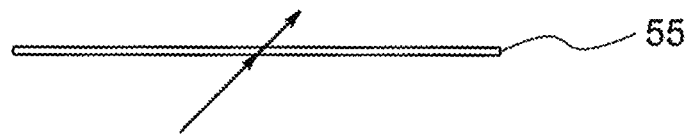
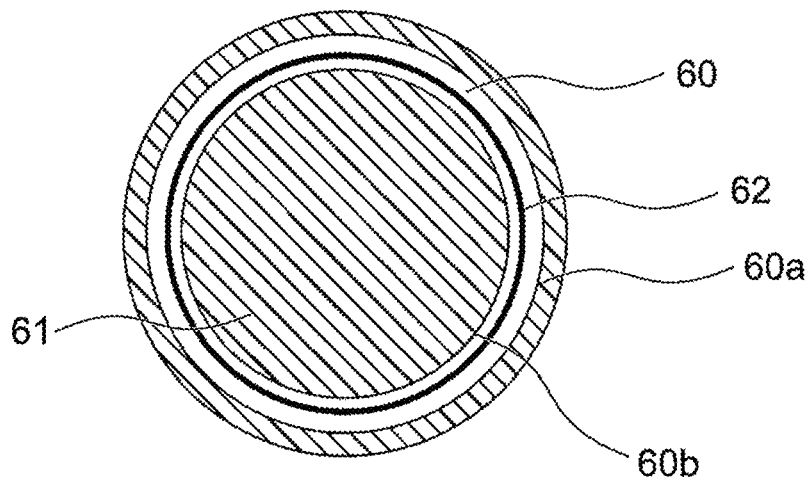
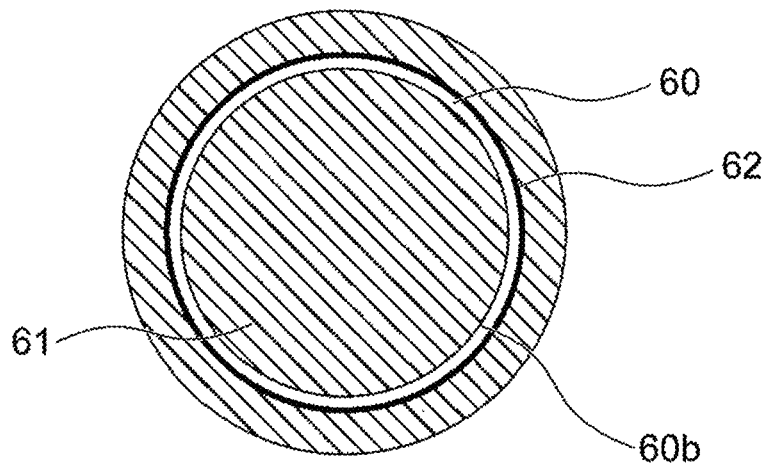

FIG. 15A
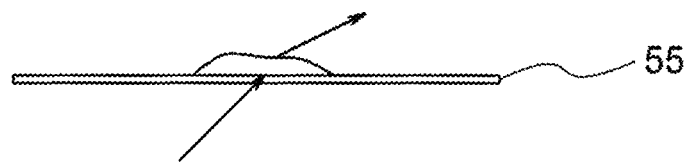
FIG. 15B
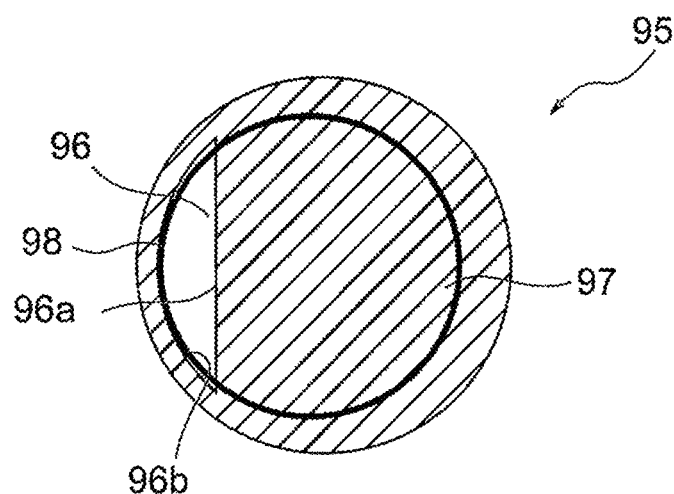
FIG. 15C
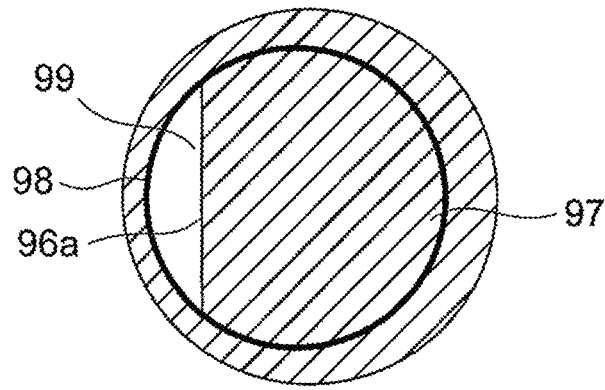

| BRIGHTNESS | $n_{AVE}$=1.34 | 3.0374 | 3.0176 | 2.9985 | 2.9800 | 2.9621 | 2.9447 | 2.9278 | 2.9114 | 2.8955 | 2.8800 | 2.8649 |
|---|---|---|---|---|---|---|---|---|---|---|---|---|
| | $n_{AVE}$=1.35 | 3.6280 | 3.5861 | 3.5457 | 3.5067 | 3.4690 | 3.4325 | 3.3972 | 3.3629 | 3.3296 | 3.2972 | 3.2657 |
| | $n_{AVE}$=1.36 | 4.2488 | 4.1828 | 4.1193 | 4.0580 | 3.9988 | 3.9417 | 3.8864 | 3.8328 | 3.7808 | 3.7304 | 3.6814 |
| INCLINATION ANGLE | | -50 | -49 | -48 | -47 | -46 | -45 | -44 | -43 | -42 | -41 | -40 |

. . . .

| 2.4749 | 2.4650 | 2.4551 | 2.4452 | 2.4352 | 2.4253 | 2.4153 | 2.4053 | 2.3953 | 2.3852 | 2.3751 | 2.3649 |
|---|---|---|---|---|---|---|---|---|---|---|---|
| 2.4700 | 2.4502 | 2.4304 | 2.4106 | 2.3908 | 2.3710 | 2.3512 | 2.3313 | 2.3114 | 2.2915 | 2.2715 | 2.2514 |
| 2.4650 | 2.4353 | 2.4057 | 2.3761 | 2.3466 | 2.3171 | 2.2875 | 2.2580 | 2.2284 | 2.1988 | 2.1692 | 2.1394 |
| -6 | -5 | -4 | -3 | -2 | -1 | 0 | 1 | 2 | 3 | 4 | 5 |

. . . .

| 1.9372 | 1.9184 | 1.8991 | 1.8791 | 1.8583 | 1.8367 | 1.8143 | 1.7910 | 1.7667 | 1.7414 | 1.7148 | 1.6871 | 1.6580 |
|---|---|---|---|---|---|---|---|---|---|---|---|---|
| 1.4315 | 1.3969 | 1.3613 | 1.3246 | 1.2866 | 1.2475 | 1.2070 | 1.1650 | 1.1216 | 1.0765 | 1.0297 | 0.9811 | 0.9305 |
| 0.9711 | 0.9246 | 0.8770 | 0.8283 | 0.7785 | 0.7276 | 0.6755 | 0.6222 | 0.5679 | 0.5125 | 0.4560 | 0.3988 | 0.3409 |
| 38 | 39 | 40 | 41 | 42 | 43 | 44 | 45 | 46 | 47 | 48 | 49 | 50 |

FIG. 27

SAMPLE SHAPE MEASURING APPARATUS

CROSS-REFERENCE TO RELATED APPLICATION

The present application is a continuation application of International Application No. PCT/JP2016/084155 filed on Nov. 17, 2016, the entire contents of which are incorporated herein by reference.

BACKGROUND OF THE INVENTION

Field of the Invention

The present invention relates to an apparatus which measures a tilt and a shape at a surface of a sample.

Description of the Related Art

As an apparatus which enables observation of an external appearance of a sample or which enables acquisition of information about a depth, an apparatus disclosed in Japanese Patent Application Laid-open Publication No. Hei 9-251128 is available.

The apparatus disclosed in Japanese Patent Application Laid-open Publication No. Hei 9-251128 includes a laser light source, a scanning unit, an objective lens, an optical stop, and a light receiving element. The light receiving element detects a light reflected from a sample surface.

SUMMARY OF THE INVENTION

A sample shape measuring apparatus of the present invention comprises:

a light source unit; an illumination optical system; a detection optical system; a light detection element, and a processing apparatus, wherein the illumination optical system and the detection optical system are disposed to face each other with a sample interposed therebetween, light emitted from the light source unit is incident on the illumination optical system, a light spot is formed between the illumination optical system and the detection optical system by the illumination optical system, a scanning unit is disposed in an optical path from the light source unit to the light detection element, the scanning unit relatively moves the light spot and the sample, illumination light applied to the sample by the illumination optical system is transmitted through the sample, light transmitted through the sample is incident on the detection optical system, the light detection element receives light emerged from the detection optical system, at least one of the illumination optical system and the detection optical system includes an optical member, and the processing apparatus obtains a quantity of light based on the received light, calculates at least one of a difference and a ratio between the quantity of light and a reference quantity of light, calculates an amount of tilt at a surface of the sample based on at least one of the difference and the ratio, and calculates a shape of the sample from the amount of tilt.

BRIEF DESCRIPTION OF THE DRAWINGS

FIG. 9A is a diagram showing a state of refraction of light at the sample position;

FIG. 9B is a diagram showing relationship between a pupil of a detection optical system and an image of the aperture member;

FIG. 9C is a diagram showing a state of a light flux passing through the pupil of the detection optical system;

FIG. 15A is a diagram showing a state of refraction of light at the sample position;

FIG. 15B is a diagram showing relationship between the pupil of the objective lens and an image of the aperture member;

FIG. 15C is a diagram showing a state of a light flux passing through the pupil of the objective lens;

FIG. 27 is an example of a lookup table;

DETAILED DESCRIPTION OF THE INVENTION

Embodiments and examples of a sample shape measuring apparatus will be described below in detail by referring to the accompanying diagrams. However, the present invention is not restricted to the embodiments and the examples described below.

A sample shape measuring apparatus of the present embodiment includes a light source unit, an illumination optical system, a detection optical system, a light detection element, and a processing apparatus, wherein the illumination optical system and the detection optical system are disposed to face each other with a sample interposed therebetween, light emitted from the light source unit is incident on the illumination optical system, a light spot is formed between the illumination optical system and the detection optical system by the illumination optical system, a scanning unit is disposed in an optical path from the light source unit to the light detection element, the scanning unit relatively moves the light spot and the sample, illumination light applied to the sample by the illumination optical system is transmitted through the sample, light transmitted through the sample is incident on the detection optical system, the light detection element receives light emerged from the detection optical system, at least one of the illumination optical system and the detection optical system includes an optical member, and the processing apparatus obtains a quantity of light based on a received light, and calculates at least one of a difference and a ratio between the quantity of light and a reference quantity of light, calculates an amount of tilt at a surface of the sample based on at least one of the difference and the ratio, and calculates a shape of the sample from the amount of tilt.

Figure 1:
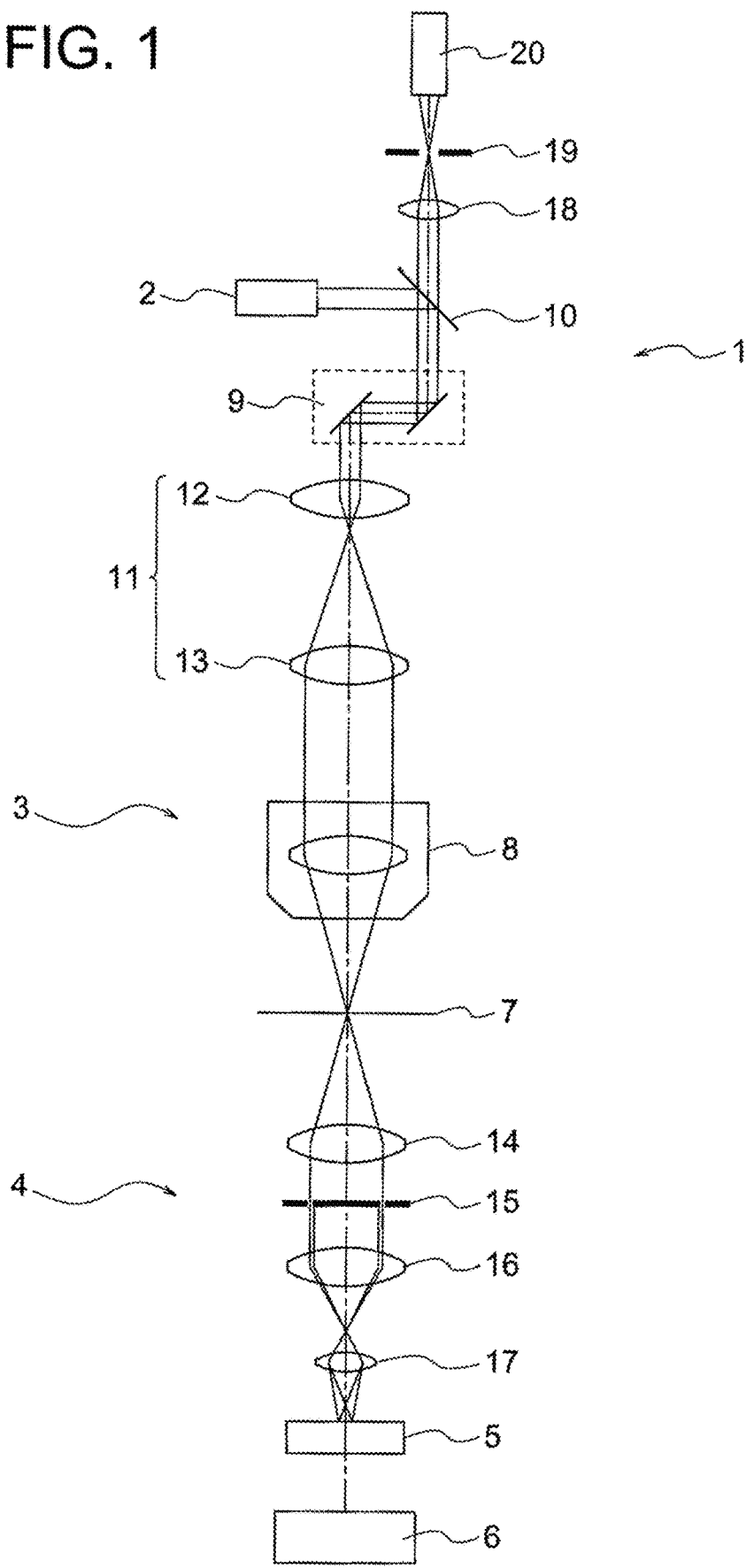
FIG. 1 is a diagram showing a sample shape measuring apparatus of the present embodiment.

FIG. 1 is a diagram showing a sample shape measuring apparatus of the present embodiment. A sample shape measuring apparatus 1 includes a light source unit 2, an illumination optical system 3, a detection optical system 4, a light detection element 5, and a processing apparatus 6. In the sample shape measuring apparatus 1, the illumination optical system 3 and the detection optical system 4 are disposed to face each other with a sample 7 interposed therebetween.

The light source unit 2 includes a point light source or a surface light source. As the point light source, for example, a laser is available. As the surface light source, for example, an LED, a mercury lamp, or a xenon lamp is available.

The surface light source is used together with a minute aperture. As the minute aperture, for example, a pinhole is available. With a combination of the surface light source and the minute aperture, light substantially equal to the light emitted from the point light source is emitted from the light source unit 2.

The light emitted from the light source unit 2 (hereinafter referred to as "illumination light") is incident on a light-ray separating unit 10. At the light-ray separating unit 10, incident illumination light emerges upon being split into transmitted light and reflected light. As a method of splitting into two lights, splitting according to the light intensity, splitting according to a difference of a direction of polarization, and splitting according to a difference of wavelength are available.

The illumination light reflected with the light-ray separating unit 10 is incident on the illumination optical system 3. By the illumination optical system 3, a light spot is formed between the illumination optical system 3 and the detection optical system 4. The sample 7 is disposed between the illumination optical system 3 and the detection optical system 4. By making an arrangement such that the position of the sample 7 coincides with the position of the light spot, it is possible to illuminate the sample 7 with the light spot.

To form the light spot, the illumination light may be light emitted from the point light source. As described above, the light emitted from the light source unit 2 is light emitted from the point light source. Accordingly, in the sample shape measuring apparatus 1, a light spot is formed.

In the sample shape measuring apparatus 1, a microscope optical system is used. Accordingly, in the sample shape measuring apparatus 1, a microscope objective lens 8 (hereinafter referred to as "objective lens 8") is used as the illumination optical system 3.

As described above, the sample 7 is illuminated with the light spot. In this case, only one point on the sample 7 is illuminated. To illuminate the whole sample 7, it is necessary to relatively move the light spot and the sample 7. It is possible to relatively move the light spot and the sample 7 by disposing a scanning unit in an optical path from the light source unit 2 to the light detection element 5.

In the sample shape measuring apparatus 1, as the scanning unit, an optical scanning unit 9 is disposed in an optical path between the light source unit 2 and the illumination optical system 3. The optical scanning unit 9 includes two optical deflection elements. As the light detection element, a galvanometer scanner, a polygon scanner, or an acousto-optical deflection element is available.

In the optical scanning unit 9, light incident on the optical scanning unit 9 is deflected in two orthogonal directions, for example, in an X direction and a Y direction. As described above, a scanning pattern is generated in the optical scanning unit 9.

A pupil projection optical system 11 is disposed between the optical scanning unit 9 and the objective lens 8. The pupil projection optical system 11 includes a lens 12 and a lens 13. By the pupil projection optical system 11, the optical scanning unit 9 and a pupil of the objective lens 8 are conjugate.

When the two optical deflection elements are close to each other, any position between a deflection surface of one deflection element and a deflection surface of the other deflection element is conjugate with the pupil position of the objective lens 8. When a lens is disposed between the two deflection elements, both the deflection surface of one deflection element and the deflection surface of the other deflection element are conjugate with the pupil of the objective lens 8.

The scanning pattern generated in the optical scanning unit 9 is projected onto the pupil of the objective lens 8. On the basis of the scanning pattern, the light spot moves on the sample 7. In this state, only the light spot moves, and the sample 7 does not move.

As described above, in the sample shape measuring apparatus 1, the light spot and the sample 7 relatively move in a plane orthogonal to the optical axis. As a result, it is possible to scan the sample with the light spot discretely or continuously.

The light transmitted through the sample 7 (hereinafter referred to as "imaging light") is incident on the detection optical system 4. As described above, in the sample shape measuring apparatus of the present embodiment, an optical member may be disposed in at least one of the illumination optical system and the detection optical system. In the sample shape measuring apparatus 1, an optical member 15 is disposed in the detection optical system 4.

The detection optical system 4 includes a pupil projection lens 14, the optical member 15, a lens 16, and a lens 17. As the pupil projection lens 14, for example, it is possible to use a condenser lens of a microscope.

The imaging light incident on the detection optical system 4 is transmitted through the pupil projection lens 14 and the optical member 15, and incident on the lens 16. The imaging light incident on the lens 16 is transmitted through the lens 17, and reaches the light-receiving surface of the light detection element 5.

A pupil position of the pupil projection lens 14 and a position of the light detection element 5 are conjugate by the lens 16 and the lens 17. Moreover, as mentioned above, the optical scanning unit 9 and the pupil position of the objective lens 8 are conjugate. Furthermore, the pupil position of the objective lens 8 and the pupil position of the pupil projection lens 14 are conjugate. Accordingly, in the sample shape measuring apparatus 1, the optical scanning unit 9 and the position of the light detection element 5 are conjugate.

In the optical scanning unit 9, illumination light is deflected. In the deflection, an angle made between the illumination light and the optical axis is changed. However, in a plane orthogonal to the optical axis, the position of the illumination light is not changed. As described above, the optical scanning unit 9 and the position of the light detection element 5 are made to be conjugate. Therefore, in the light detection element 5, the incident angle of the imaging light incident on the light-receiving surface is changed, but the incident position in the light-receiving surface thereof is not changed.

In the light detection element 5, photoelectric conversion is performed. The imaging light is converted into an electric signal and, in this manner, an image signal of the sample 7 is generated. The image signal of the sample 7 is input to the processing apparatus 6. In the processing apparatus 6, various processing is performed.

The sample shape measuring apparatus of the present embodiment preferably further includes a second light detection element to detect radiated light from the sample, and detection of fluorescence is preformed by the second light detection element.

When illumination light is applied to the sample 7, reflected light is generated in the sample 7. In addition, when the sample is stained with fluorescent dye, fluorescence is generated from the sample 7. Accordingly, it is possible to form an optical image using these types of light.

Part of the reflected light and/or fluorescence is incident on the illumination optical system 3. The light incident on the illumination optical system 3 passes through the pupil projection optical system 11 and the optical scanning unit 9, and is incident on the light-ray separating unit 10.

The light incident on the light-ray separating unit 10 passes through the light-ray separating unit 10, and is condensed by a confocal lens 18. A confocal pinhole 19 is disposed at a condensing position. Light having passed through the confocal pinhole 19 is detected by a photodetector 20.

The photodetector 20 is the second light detection element. In the photodetector 20, light reflected from the sample 7 and/or fluorescence are detected. For this reason, it is possible to acquire a reflected image of the sample 7 and/or a fluorescent image of the sample 7.

Photoelectric conversion is performed in the photodetector 20. The light having passed through the confocal pinhole 19 is converted into an electric signal and thereby an image signal of the sample 7 is generated. The image signal at this time is a signal of a confocal image.

In the sample shape measuring apparatus of the present embodiment, since the sample shape measuring apparatus includes the optical detector 20, by one illumination, it is possible to acquire a fluorescent image and an image in which a surface shape of a sample is measured. Moreover, by superimposing the fluorescent image and the image in which the surface shape of the sample is measured, it is possible to observe two images simultaneously. In this case, it is possible to superimpose two images accurately.

In the sample shape measuring apparatus 1, as the scanning unit, two light deflection elements are used. However, the scanning unit is not limited thereto. Another scanning unit will be described.

Figure 2A:
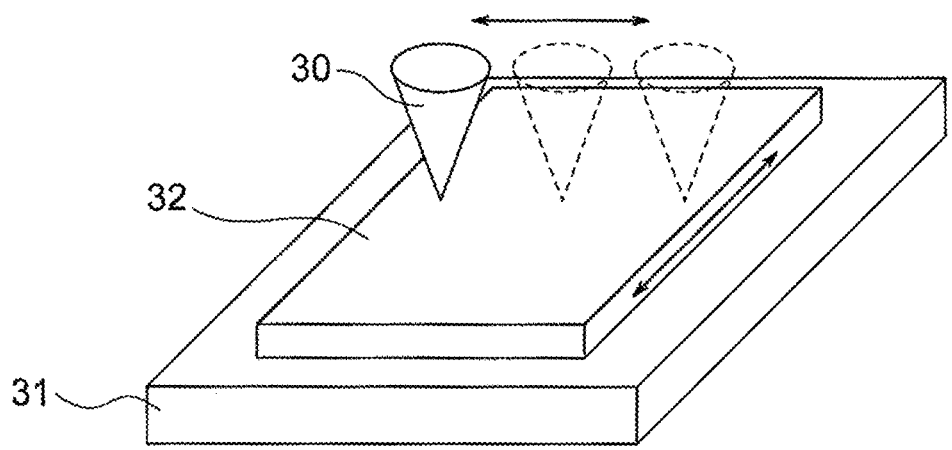
FIG. 2A is a diagram showing a scanning unit of a first example.

A scanning unit of a first example will be described. FIG. 2A is a diagram showing a scanning unit of the first example. In the scanning unit of the first example, scanning in one direction is performed by movement of the light spot, and scanning in the other direction is performed by movement of the stage. Accordingly, in the scanning unit of the first example, both the light spot and the sample move.

In the scanning unit of the first example, an optical scanning unit is disposed in an optical path between the light source unit and the illumination optical system. The optical scanning unit includes one light deflection element. In addition, a movement stage 32 is placed on a holding member 31. The sample is placed on the movement stage 32.

In the scanning unit of the first example, illumination light 30 is moved in the X direction by the light deflection element. In addition, the sample is moved in the Y direction by the movement stage 32. In this manner, it is possible to scan the sample with the light spot discretely or continuously.

Figure 2B:
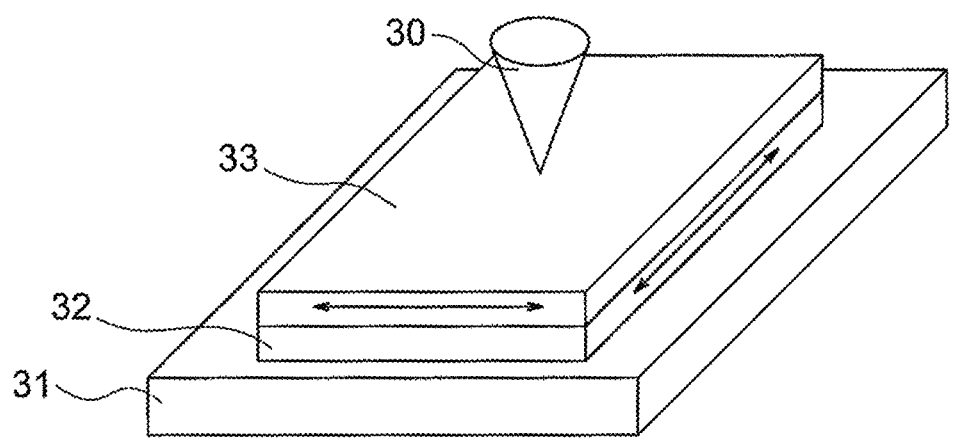
FIG. 2B is a diagram showing a scanning unit of a second example.

A scanning unit of a second example will be described. FIG. 2B is a diagram showing a scanning unit of the second example. In the scanning unit of the second example, both scanning in one direction and scanning in the other direction are performed by movement of the stage. Accordingly, in the scanning unit of the second example, the light spot does not move, but only the sample moves.

In the scanning unit of the second example, the movement stage 32 and a movement stage 33 are placed on the holding member 31. The sample is placed on the movement stage 33. No optical scanning unit is disposed in the optical path between the light source unit and the illumination optical system.

In the scanning unit of the second example, the illumination light 30 does not move. Instead, the sample is moved in the Y direction by the movement stage 32, and the sample is moved in the X direction by the movement stage 33. In this manner, it is possible to scan the sample with the light spot discretely or continuously.

Figure 3:
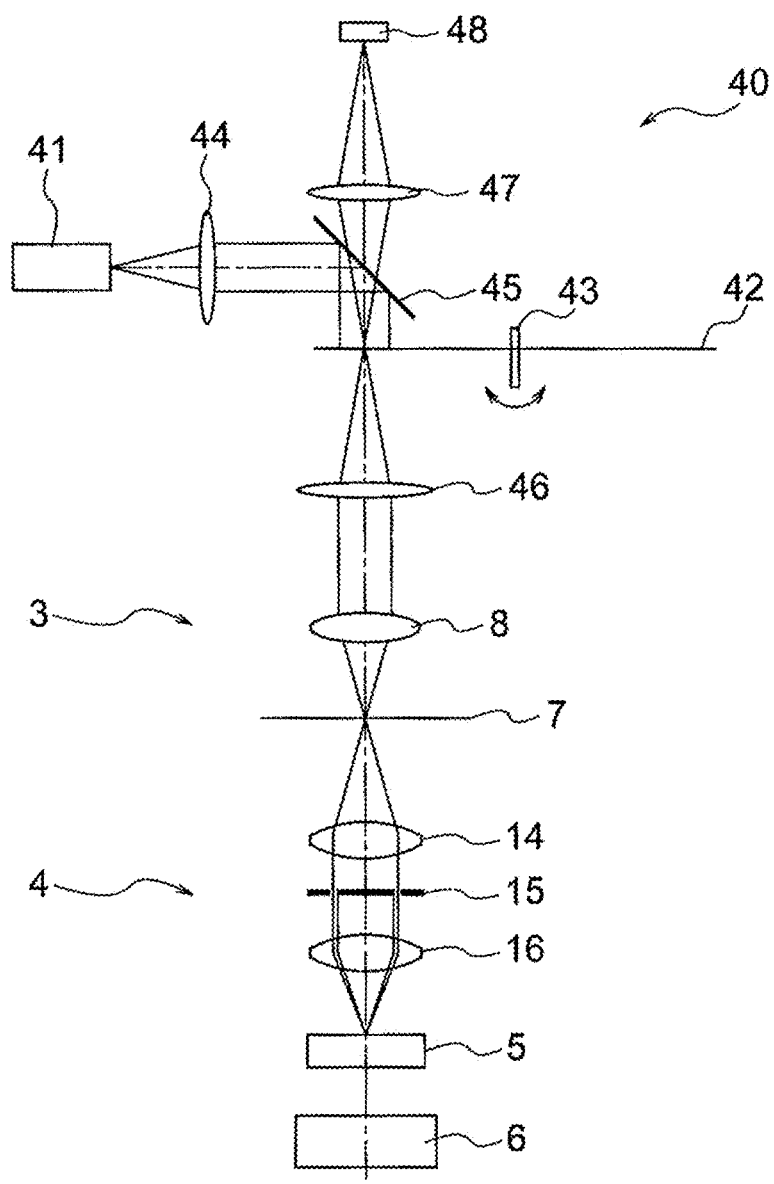
FIG. 3 is a diagram showing the sample shape measuring apparatus including a scanning unit of a third example.

A scanning unit of a third example will be described. FIG. 3 is a diagram showing a sample shape measuring apparatus including the scanning unit of the third example. The same reference numerals are assigned to the same configurations as those in FIG. 1, and their detailed descriptions are omitted.

A sample shape measuring apparatus 40 includes a light source unit 41, the illumination optical system 3, the detection optical system 4, the light detection element 5, and the processing apparatus 6. The sample shape measuring apparatus 40 includes a confocal substrate 42 as the scanning unit of the third example. The confocal substrate 42 is disposed in an optical path between the light source unit 41 and the illumination optical system 3.

The light source unit 41 includes a point light source or a surface light source. Light emitted from the light source unit 41 may be light emitted from a point light source or light emitted from a surface light source. In this example, the light emitted from the light source unit 41 is light emitted from a point light source.

The light emitted from the light source unit 41 is converted to substantially parallel light by a collimator lens 44. The light converted to the substantially parallel is reflected by a beam splitter 45, and applied to the confocal substrate 42. The confocal substrate 42 is rotatable around an axis 43 with a motor (not illustrated).

Figure 4:
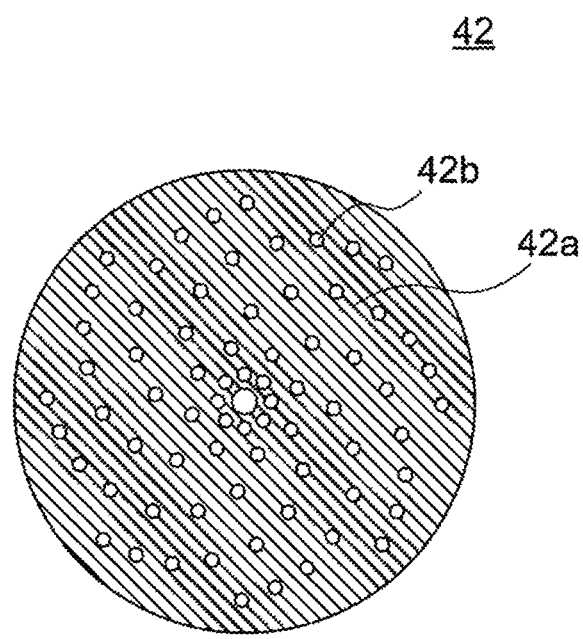
FIG. 4 is a diagram showing a structure of a confocal substrate.

FIG. 4 is a diagram illustrating a structure of the confocal substrate. The confocal substrate 42 is a circular flat plate, and includes a light-shielding part 42a and transmission part 42b. The light-shielding part 42a is formed from an opaque material, such as a metal plate. The transmission parts 42b are aperture (hole) formed in the metal plate.

The confocal substrate 42 may be formed from, for example, a glass plate and/or a resin plate. The light-shielding part 42a is formed by applying light-shielding paint on a glass plate, for example. By contrast, no paint is applied to the transmission part 42b. Accordingly, the transmission part 42b is formed from the glass plate itself.

The size of the transmission part 42b is very small. For this reason, light substantially equal to the light emitted from the point light source is emerged from the transmission part 42b. In addition, a plurality of transmission parts 42b are formed. The diameter of light applied to the confocal substrate 42 is set to include a plurality of transmission parts 42b. For this reason, light substantially equal to the light emitted from a point light source is emerged from a plurality of positions of the confocal substrate 42.

The light emerged from the confocal substrate 42 passes through an imaging lens 46, and is incident on the objective lens 8. The light incident on the objective lens 8 is applied to the sample 7. In the sample shape measuring apparatus 40, the position of the confocal substrate 42 and the position of the sample 7 are conjugate. For this reason, a plurality of light spots are generated on the sample 7.

As described above, the confocal substrate 42 is rotatable around the axis 43. When the confocal substrate 42 is rotated, a plurality of light spots formed on the sample 7 move. As a result, it is possible to scan the sample with the light spots continuously.

The light transmitted through the sample 7 is incident on the light-receiving surface of the light detection element 5 through the detection optical system 4. In the sample shape measuring apparatus 40, a plurality of light spots are generated on the sample 7. Accordingly, the position of the light detection element 5 is conjugate with the position of the sample 7.

The light reflected with the sample 7 and/or fluorescence generated in the sample 7 passes through the objective lens 8 and the imaging lens 46, and is incident on the confocal substrate 42. These types of light pass through the transmission parts 42b and the beam splitter 45, and are condensed with the lens 47.

A photodetector 48 is disposed at the condensing position. The light condensed with the lens 47 is detected with the photodetector 48. It is possible to regard the transmission part 42b as pinhole. Accordingly, a signal of a confocal image is acquired from the photodetector 48.

The optical member 15 will be described. The optical member 15 is an aperture member which includes a light-shielding part or a darkening part, and a transmission part. A structure of the aperture member will be described.

Figure 5:
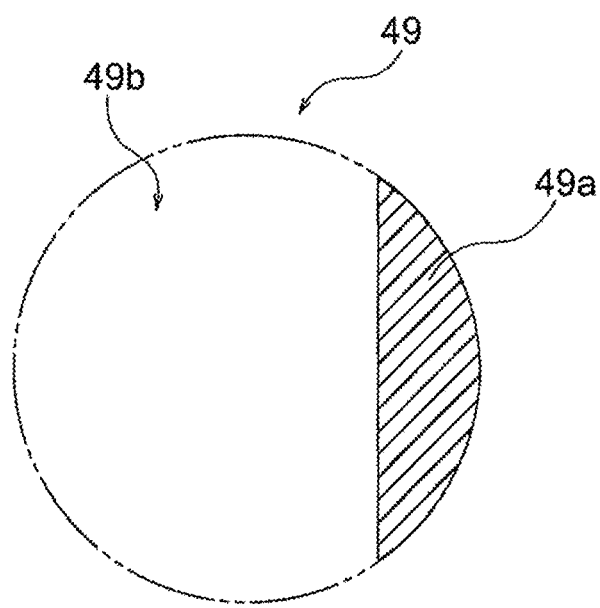
FIG. 5 is a diagram showing an aperture member.

FIG. 5 is a diagram showing an aperture member. An aperture member 49 has a light-shielding part 49a and a transmission part 49b. A shape of the aperture member 49 is a shape of a portion cut out from a circular-shaped member. The cut-out portion is the transmission part 49b. A shape of the light-shielding part 49a is an arc shape.

Figure 6A:
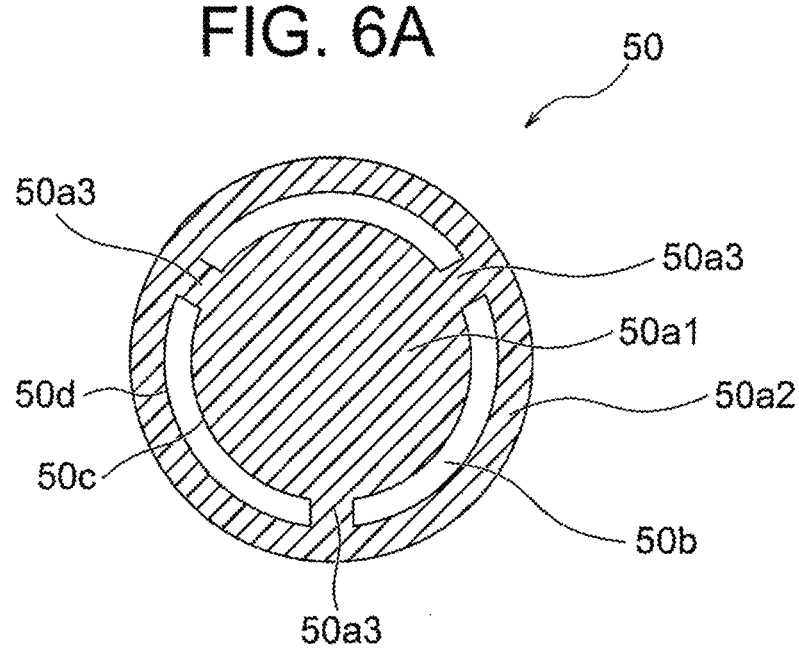
FIG. 6A is a diagram showing an aperture member formed from an opaque member.
Figure 6B:
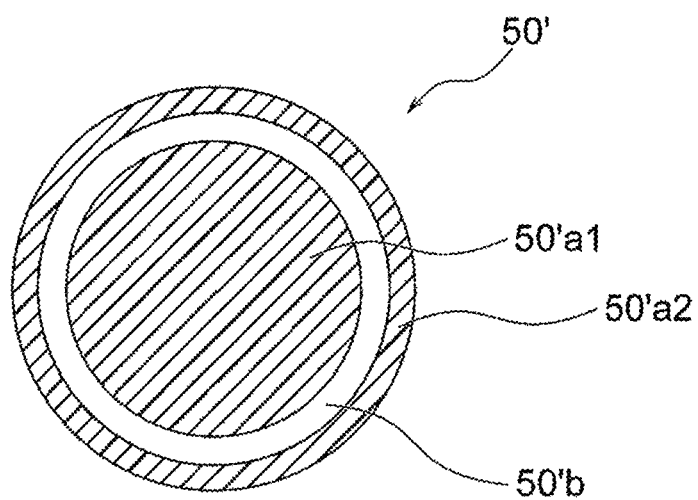
FIG. 6B is a diagram showing an aperture member formed from a transparent member.

The configuration of another aperture member is shown in FIG. 6A and FIG. 6B. FIG. 6A shows the aperture member formed from an opaque member, and FIG. 6B shows the aperture member formed from a transparent member.

As shown in FIG. 6A, the aperture member 50 includes a light-shielding part 50a1 and a transmission part 50b. Further, the aperture member 50 includes a light-shielding part 50a2. The light-shielding parts 50a1 and 50a2 are formed from an opaque member, such as a metal plate. The transmission part 50b is a gap (hole) bored at the metal plate.

At the aperture member 50, three connecting parts 50a3 are formed between the light-shielding part 50a1 and the light-shielding part 50a2 to hold the light-shielding part 50a1. Therefore, the transmission part 50b is divided three parts. The shape of each transmission part 50b is a substantially fan-like shape (discrete ring-band shape). The number of the connecting parts 50a3 is not limited to three.

The aperture member 50 can be disposed in the illumination optical system. In this case, the aperture member 50 is disposed so that the light-shielding part 50a1 includes the optical axis of the illumination optical system. The light-shielding part 50a1 has an outer edge 50c that is at a position away from the optical axis of the illumination optical system by predetermined distance. Therefore, the illumination light incident on the aperture member 50 is shielded at the center of the light flux by the light-shielding part 50a1. Here, the boundary between the light-shielding part 50a1 and the transmission part 50b corresponds to the outer edge 50c of the light-shielding part 50a1.

The light-shielding part 50a2 is located outer side (direction moving away from the optical axis) of the light-shielding part 50a1 and the transmission part 50b. Here, the boundary between the transmission part 50b and the light-shielding part 50a2 corresponds to an inner edge 50d of the light-shielding part 50a2.

The transmission part 50b is located outer side of the outer edge 50c of the light-shielding part 50a1. Here, the boundary between the light-shielding part 50a1 and the transmission part 50b corresponds to the inner edge of the transmission part 50b. Moreover, the boundary between the transmission part 50b and the light-shielding part 50a2 corresponds to the outer edge of the transmission part 50b. Therefore, 50c represents the outer edge of the light-shielding part 50a1 and the inner edge of the transmission part 50b, and 50d represents the inner edge of the light-shielding part 50a2 and the outer edge of the transmission part 50b.

Moreover, as shown in FIG. 6B, an aperture member 50' includes a light-shielding part 50'a1 and a transmission part 5'0b. Further, the aperture member 50' includes a light-shielding part 50'a2. The light-shielding parts 50'a1 and 50'a2, and the transmission part 50'b are formed from a transparent member, such as a glass plate or a resin plate. The light-shielding parts 50'a1 and 50'a2 are formed by applying light-shielding paint on a glass plate. On the other hand, nothing is applied to the transmission part 50'b. Therefore, the transmission part 50'b is a glass plate as it is.

At the aperture member 50', a shape of the transmission part 50'b is an annulus. This is because there is no need to hold the light-shielding part 50'a2. Therefore, at the aperture member 50', a connecting part does not formed between the light-shielding part 50'a1 and the light-shielding part 50'a2.

A major difference between the aperture member 50' and the aperture member 50 are the material, and the presence or not of the connecting part. Therefore, the detailed descriptions of the light-shielding part 50'a1 and 50'a2, and the transmission part 50'b are omitted.

The light-shielding part 50a2 and the connecting parts 50a3 of the aperture member 50, and the light-shielding part 50'a2 of the aperture member 50' are not always required. For instance, the size (diameter) of a light flux of the illumination light may correspond to the outer edge of the transmission part 50b or the outer edge of the transmission part 50'b.

As described above, the aperture member 50, 50' includes the light-shielding part 50a1, 50'a1 and the transmission part 50b, 50'b. Therefore, an illumination light having a substantially annular shape or an annular shape (hereinafter, referred to as "annular shape" as appropriate) emanates form the aperture member 50, 50'.

An action generated with the optical member 15 will be described. In the sample shape measuring apparatus of the present embodiment, the optical member is disposed in at least one of the illumination optical system and the detection optical system. Here, a case where the optical member is disposed in the detection optical system will be described. The aperture member 50' shown in FIG. 6B is used as the optical member.

The aperture member 50' includes a light-shielding part 50'a1, a light-shielding part 50'a2, and a transmission part 50'b. The aperture member 50' is disposed such that the light-shielding part 50'a1 includes the optical axis of the detection optical system 4. The transmission part 50'b is located outer side of the outer edge of the light-shielding part 50'a1.

Figure 7A:
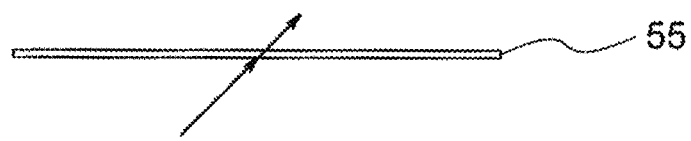
FIG. 7A is a diagram showing a state of refraction of light at a sample position.
Figure 7B:
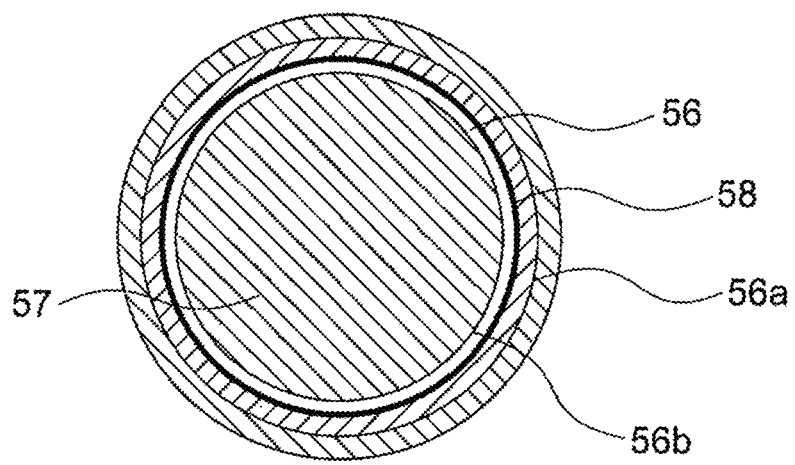
FIG. 7B is a diagram showing relationship between an image of a pupil of an illumination optical system and the aperture member.

FIG. 7A is a diagram showing the state of refraction of light at the sample position, and FIG. 7B is a diagram showing the relationship between an image of the pupil of the illumination optical system and the aperture member. FIG. 7A and FIG. 7B show a case where no sample is present. A case where a sample is present but its surface is flat, is included in the case where no sample is present.

Figure 8A:
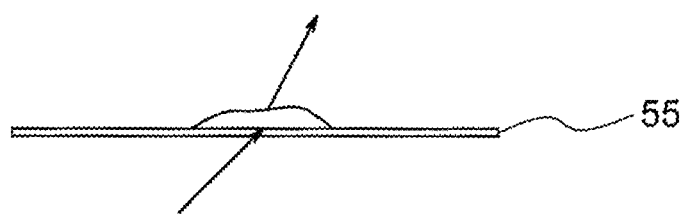
FIG. 8A is a diagram showing a state of refraction of light at the sample position.
Figure 8B:
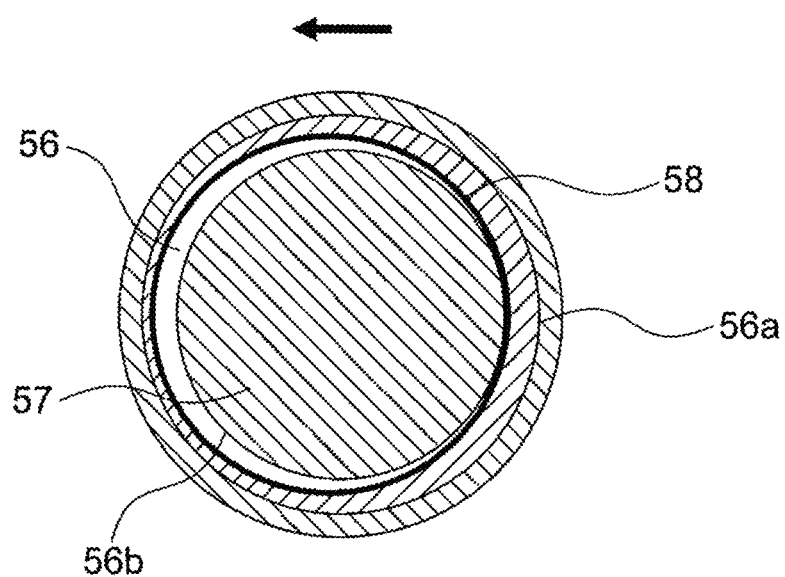
FIG. 8B is a diagram showing relationship between an image of a pupil of the illumination optical system and the aperture member.

FIG. 8A is a diagram showing the state of refraction of light at the sample position, and FIG. 8B is a diagram showing the relationship between an image of the pupil of the illumination optical system and the aperture member. FIG. 8A and FIG. 8B show a case where a sample is present. The case where a sample is present refers to a case where the surface of the sample is inclined (not-flat). Therefore, the case where a sample is present but its surface is flat, is not included in the case where a sample is present.

In the case where no sample is present, as shown in FIG. 7A, light incident on the holding member 55 and light emerged from the holding member 55 have same traveling direction. As a result, an image of the pupil of the objective lens formed at the pupil position of the pupil projection lens, i.e., at the position of the optical member 15 becomes as shown in FIG. 7B. The circle (circumference) indicated with numeral 58 is the outer edge image of the pupil of the objective lens, and the inner side of the circle (circumference) is the image of the pupil of the objective lens.

As shown in FIG. 7B, a shape of the transmission part 56 is an annulus, a shape of the light-shielding part 57 is a circle, and a shape of the outer edge image 58 is a circle. Then, the transmission part 56, the light-shielding part 57 and the outer edge image 58 are concentric. Further, the center of the transmission part 56, the center of the light-shielding part 57 and the center of the outer edge image 58 coincide with each other.

Here, the center of the transmission part 56 refers to the center of a circle defining an outer edge 56a of the transmission part (since the transmission part 56 is an annulus, the center of the transmission part 56 is the center of the circle defining an inner edge 56b of the transmission part as well).

The outer edge image 58 is located outer side (the direction moving away the optical axis) of the inner edge 56b of the transmission part, and is located inner side (the direction approaching the optical axis) of the outer edge 56a of the transmission part. As just described, in the sample shape measuring apparatus of the present embodiment, the image 58 of the outer edge of the pupil of the objective lens is formed between the inner edge 46b of the transmission part and the outer edge 56a of the transmission part.

Here, light outer side of the outer edge image 58 does not pass through the transmission part 56 because it is not emerged from the objective lens 8. Therefore, the region of a light flux passing through the transmission part 56 is the region between the inner edge 56b of the transmission part and the outer edge image 58. Then, the area of this region as a whole corresponds to the brightness of the sample image.

On the other hand, in the case where a sample is present, as shown in FIG. 8A, light incident on the holding member 55 and light emerged from the holding member 55 have different traveling direction. As a result, an image of the pupil of the objective lens formed at the position of the optical member 15 becomes as shown in FIG. 8B. Also in FIG. 8B, the circle (circumference) indicated with numeral 58 is the outer edge image, and the inner side of the circle (circumference) is the image of the pupil of the objective lens.

As shown in FIG. 8B, a shape of the transmission part 56 is an annulus, a shape of the light-shielding part 57 is a circle, and a shape of the outer edge image 58 is a circle. However, the transmission part 56 and the light-shielding part 57, and the outer edge image 58 are not concentric. Moreover, the center of the transmission part 56 and the center of the light-shielding part 57, and the center of the outer edge image 58 do not coincide with each other. That is, the center of the outer edge image 58 shifts to the left on the sheet with reference to the center of the transmission part 56 and the center of the light-shielding part 57.

In FIG. 8B as well, light outer side of the outer edge image 58 does not pass through the transmission part 56 because it is not emerged from the objective lens 8. Therefore, the region of a light flux passing through the transmission part 56 is the region between the inner edge 56b of the transmission part and the outer edge image 58. Then, the area of this region as a whole corresponds to the brightness of the sample image.

Here, the outer edge image 58 is located outer side of the inner edge 56b of the transmission part. In other words, in FIG. 8B, the light-shielding part 57 is located inner side of the outer edge image 58. This is because the inclination of the surface of the sample is small. On the other hand, in the case where no sample is present as well, the light-shielding part 57 is located inner side of the outer edge image 58. Therefore, even in the case where a sample is present, if the inclination of the surface of the sample is small, brightness of the sample image will be the same as in the case where no sample is present.

However, when the inclination of the surface of the sample is becomes larger, displacement of the center of the outer edge image 58 with reference to the center of the transmission part 56 becomes larger. In this case, apart of the outer edge image 58 will be located inner side of the inner edge 56b of the transmission part. Moreover, a part of the outer edge image 58 will be located outer side of the outer edge 56a of the transmission part. In other words, a part of the outer edge image 58 is located inner side of the light-shielding part 57. As a result, the region of a light flux passing through the transmission part 56 changes greatly. That is, the brightness of the sample image is different between in the case where the sample is present and in the case where no sample is present.

The case where the optical member is disposed in the detection optical system has been described above. However, the optical member may be disposed in the illumination optical system. A case where the optical member is disposed in the illumination optical system will be described. The aperture member 50' shown in FIG. 6B is used as the optical member.

The aperture member 50' includes a light-shielding part 50'a1, a light-shielding part 50'a2, and a transmission part 50'b. The aperture member 50' is disposed such that the light-shielding part 50'a1 includes the optical axis of the detection optical system 4. The transmission part 50'b is located outer side of the outer edge of the light-shielding part 50'a1.

FIG. 9A is a diagram showing the state of refraction of light at the sample position, FIG. 9B is a diagram showing the relationship between the pupil of the detection optical system and an image of the aperture member, and FIG. 9C is a diagram showing the state of a light flux passing through the pupil of the detection optical system. FIG. 9A, FIG. 9B and FIG. 9C show when no sample is present. The case where a sample is present but its surface is flat, is included in the case where no sample is present.

Figure 10A:
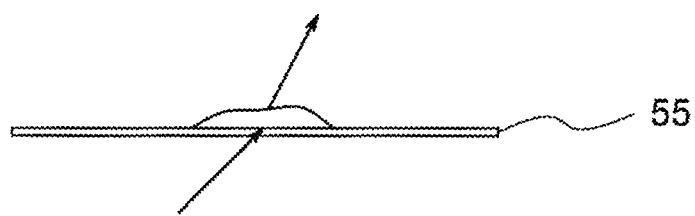
FIG. 10A is a diagram showing a state of refraction of light at the sample position.
Figure 10B:
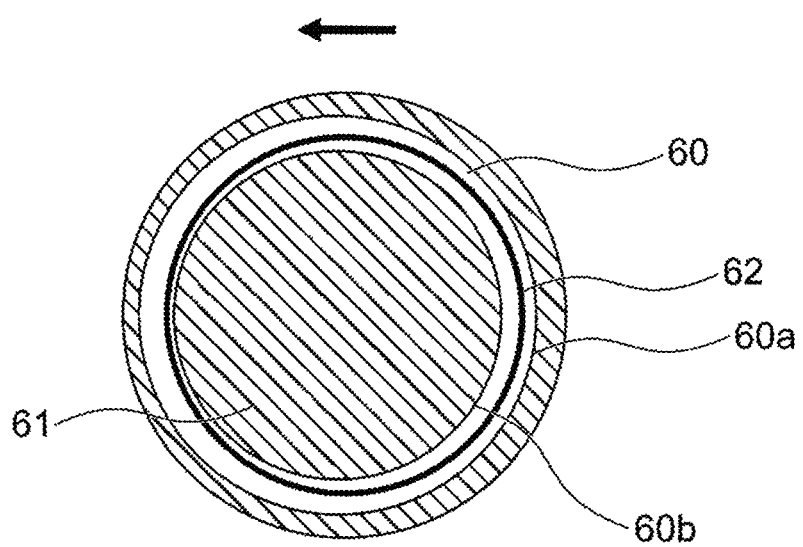
FIG. 10B is a diagram showing relationship between the pupil of the detection optical system and an image of the aperture member.
Figure 10C:
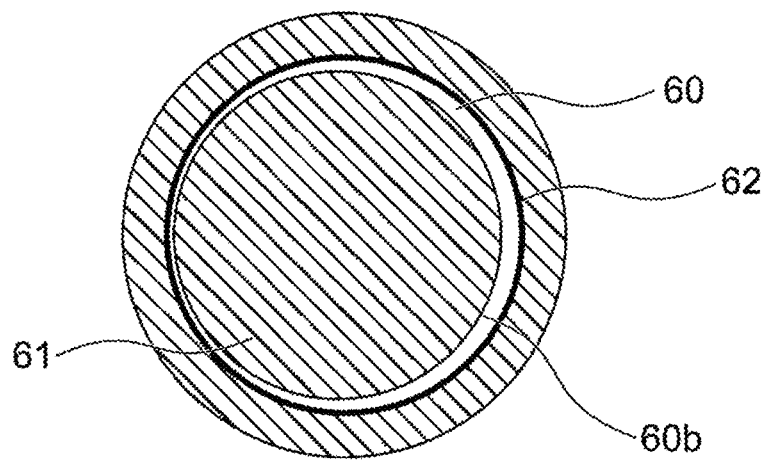
FIG. 10C is a diagram showing a state of a light flux passing through the pupil of the detection optical system.

FIG. 10A is a diagram showing the state of refraction of light at the sample position, FIG. 10B is a diagram showing the relationship between the pupil of the detection optical system and an image of the aperture member, and FIG. 10C is a diagram showing the state of a light flux passing through the pupil of the detection optical system. FIG. 10A, FIG.

10B and FIG. 10C show when a sample is present. The case where a sample is present refers to the case where the surface of the sample is inclined (not-flat). Therefore, the case where a sample is present but its surface is flat, is not included in the case where a sample is present.

In the case where no sample is present, as shown in FIG. 9A, light incident on the holding member 55 and light emerged from the holding member 55 have same traveling direction. As a result, an image of the aperture member formed at the pupil position of the pupil projection lens 14 becomes as shown in FIG. 9B. The circle (circumference) indicated with numeral 62 is the outer edge of the pupil of the pupil projection lens, and the inner side of the circle (circumference) is the pupil of the pupil projection lens.

As shown in FIG. 9B, a shape of an image 60 of the transmission part is an annulus, a shape of an image 61 of the light-shielding part is a circle, and a shape of the outer edge 62 is a circle. Then, the image 60 of the transmission part, the image 61 of the light-shielding part, and the outer edge 62 are concentric. Moreover, a center of the image 60 of the transmission part, a center of the image 61 of the light-shielding part, and a center of the outer edge 62 coincide with each other. The image 61 of the light-shielding part is an image of the light-shielding part 50$a$1 in the aperture member 50 or an image of the light-shielding part 50'$a$1 in the aperture member 50', for example.

Here, the center of the image 60 of the transmission part refers to the center of a circle defining an image 60$a$ of the outer edge of the transmission part (since the image 60 of the transmission part is annulus, the center of the image 60 of the transmission part is the center of the circle defining an image 60$b$ of the inner edge of the transmission part as well).

Then, the image 60$b$ of the inner edge of the transmission part is located inner side (the direction approaching the optical axis) of the outer edge 62. Moreover, the image 60$a$ of the outer edge of the transmission part is located outer side (the direction moving away from the optical axis) of the outer edge 62. As just described, in the sample shape measuring apparatus of the present embodiment, the image 60$b$ of the inner edge of the transmission part is formed inner side of the outer edge 62, and the image 60$a$ of the outer edge of the transmission part is formed outer side of the outer edge 62.

Here, light outer side of the outer edge 62 does not pass through the pupil of the pupil projection lens (is not emerged from the pupil projection lens). Therefore, as shown in FIG. 9C, the region of a light flux passing through the pupil of the pupil projection lens is the region between the image 60$b$ of the inner edge of the transmission part and the outer edge 62. Then, the area of this region as a whole corresponds to the brightness of the sample image.

On the other hand, in the case where a sample is present, as shown in FIG. 10A, light incident on the holding member 55 and the light emerged from the holding member 55 have different traveling direction. As a result, an image of the aperture member formed at the pupil position of the pupil projection lens becomes as shown in FIG. 10B. Also in FIG. 10B, the circle (circumference) indicated with numeral 62 is the outer edge of the pupil of the pupil projection lens, and the inner side of the circle (circumference) is the pupil of the pupil projection lens.

As shown in FIG. 10B, a shape of an image 60 of the transmission part is an annulus, a shape of an image 61 of the light-shielding part is a circle, and a shape of the outer edge 62 is a circle. However, the image 60 of the transmission part and the image 61 of the light-shielding part, and the outer edge 62 are not concentric. Moreover, the center of the image 60 of the transmission part and the center of the image 61 of the light-shielding part, and the center of the outer edge 62 do not coincide with each other. That is, the center of the image 60 of the transmission part and the center of the image 61 of the light-shielding part shift to the left on the sheet with reference to the center of the outer edge 62.

Moreover, as shown in FIG. 10C, the region of a light flux passing through the pupil of the pupil projection lens is the region between the image 60$b$ of the inner edge of the transmission part and the outer edge 62. Then, the area of this region as a whole corresponds to the brightness of the sample image.

Here, in FIG. 10B, the image 60$b$ of the inner edge of the transmission part is located inner side of the outer edge 62. In other words, in FIG. 10B, the image 61 of the light-shielding part is located inner side of the outer edge 62. This is because the inclination of the surface of the sample is small. On the other hand, in the case where no sample is present as well, the image 61 of the light-shielding part is located inner side of the outer edge 62. Therefore, even in the case where a sample is present, if the inclination of the surface of the sample is small, brightness of the sample image will be the same as in the case where no sample is present.

Figure 11A:
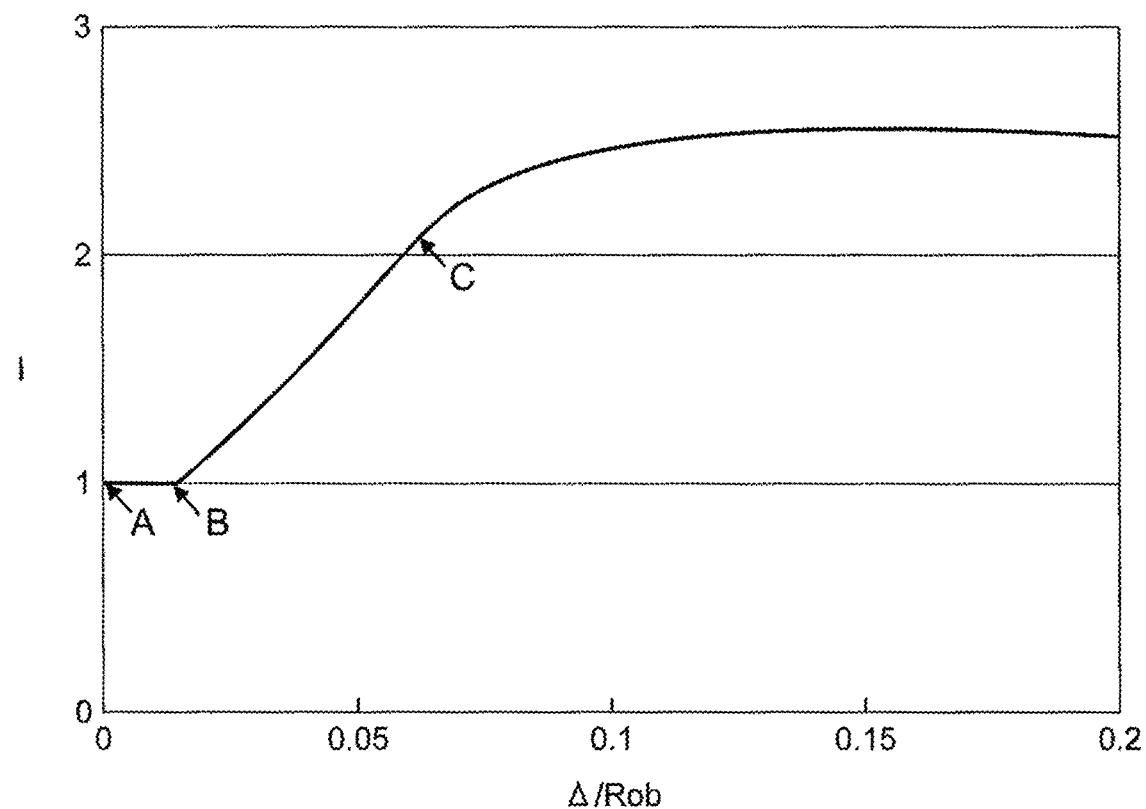
FIG. 11A is a graph showing relationship of between an amount of displacement Δ and an area S.
Figure 11B:
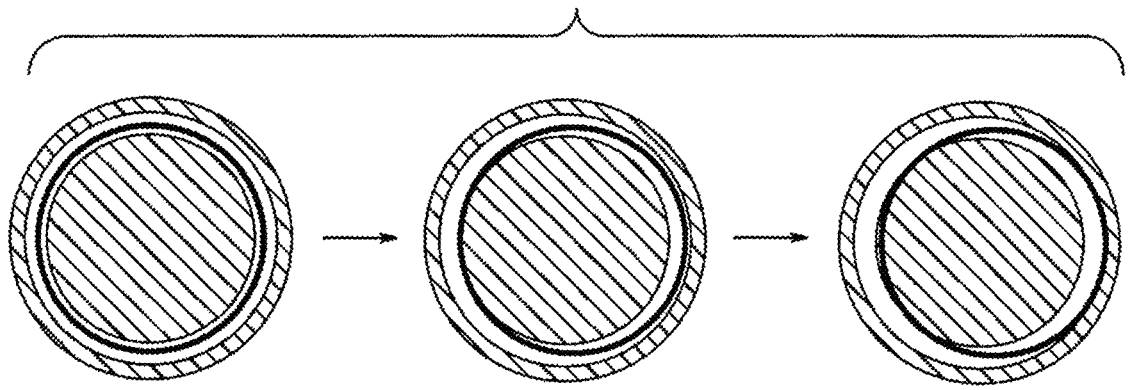
FIG. 11B is a diagram showing a shift of an image of the aperture member with respect to a pupil of an objective lens.

However, when the inclination of the surface of the sample becomes larger, displacement of the center of the image 60 of the transmission part with reference to the center of the pupil of the pupil projection lens (hereinafter, referred to as "displacement of an image of the transmission part" as appropriate) becomes larger. In this case, as described later, a part of the image 60$b$ of the inner edge of the transmission part will be located outer side of the outer edge 62 (as shown in FIG. 11B). Moreover, a part of the image 60$a$ of the outer edge of the transmission part will be located inner side of the outer edge 62. In other words, a part of the image 61 of the light-shielding part is located outer side of the outer edge 62. As a result, the region of a light flux passing through the pupil of the pupil projection lens changes greatly. That is, the brightness of the sample image is different from that in the case where no sample is present.

When the optical member is disposed in the illumination optical system, the image of the optical member, that is, the image of the aperture member is displaced relative to the pupil of the pupil projection lens. Suppose that the amount of displacement $\Delta$ is an amount of displacement of the image of the aperture member relative to the pupil of the pupil projection lens, and the area S is an area of the light flux passing through the pupil of the pupil projection lens. When the amount of displacement $\Delta$ is changed, the area S is also changed. FIG. 11A is a graph showing relationship between the amount of displacement $\Delta$ and the area S. FIG. 11B is a diagram showing displacement of the image of the aperture member relative to the pupil of the objective lens.

In FIG. 11A, calculation is performed based on R'0×β=0.97×RPL, R'1×β=1.15×RPL.

where

R'0 denotes a length from the optical axis of the illumination optical system to the inner edge of the transmission part, R'1 denotes a length from the optical axis of the illumination optical system to the outer edge of the transmission part;

RPL denotes a radius of the pupil of the pupil projection lens; and

β denotes a value obtained by dividing the focal length of the pupil projection lens by the focal length of the objective lens.

Moreover, the transmittance of the transmission part is 100%. Moreover, in FIG. 11A, with respect to the numerical values on the horizontal axis, the displacement amount Δ is normalized with the radius RPL of the pupil of the pupil projection lens. The numerical values on the vertical axis are normalized with the area ($\pi$ (RPL$^2$−(R'0×β)$^2$)) when the displacement amount Δ is 0.

The area S indicates the area of a light flux passing through the pupil of the pupil projection lens. Therefore, the area S can be replaced with the amount I of the light flux. Then, in FIG. 11A, I is used as a variable of the vertical axis.

In the case where no sample is present (alternatively, the surface of the sample is flat), the displacement amount Δ is 0. In this case, the relationship between the pupil of the pupil projection lens and an image of the aperture member becomes as shown in (A) of FIG. 11B. Therefore, the amount I of the light flux becomes 1 as shown in arrow A.

Next, in the case where a sample is present, the displacement amount Δ is not 0. Here, when the inclination of the surface of the sample is small, the relationship between the pupil of the pupil projection lens and an image of the aperture member becomes as shown in (B) of FIG. 11B. However, although (A) in FIG. 11B and (B) in FIG. 11B differ in the position of the image of the light-shielding part in the pupil of the pupil projection lens, the image of the light-shielding part is located inner side of the outer edge of the pupil of the pupil projection lens in both cases. Accordingly, the amount I of the light flux becomes 1 as shown in arrow B.

On the other hand, when the inclination of the surface of the sample is large, the relationship between the pupil of the pupil projection lens and an image of the aperture member becomes as shown in (C) of FIG. 11B. In this case, a part of the image of the light-shielding part is located outer side of the pupil of the pupil projection lens. Therefore, the amount I of the light flux becomes more than 1 as shown in arrow C.

As just described, in the sample shape measuring apparatus of the present embodiment, the amount I of a light flux changes with a change in the displacement amount Δ between arrow B and arrow C. Therefore, according to the sample shape measuring apparatus of the present embodiment, it is possible to detect a change in shape at the sample as a change in brightness.

Moreover, "the image of the inner edge of the transmission part is formed inner side of the outer edge of the pupil of the pupil projection lens" includes not only the case where the entire image of the inner edge of the transmission part is included inner side of the outer edge of the pupil of the pupil projection lens as shown in (B) of FIG. 11B, but also the case where a part of the image of the inner edge of the transmission part is included as shown in (C) of FIG. 11C.

Figure 12A:
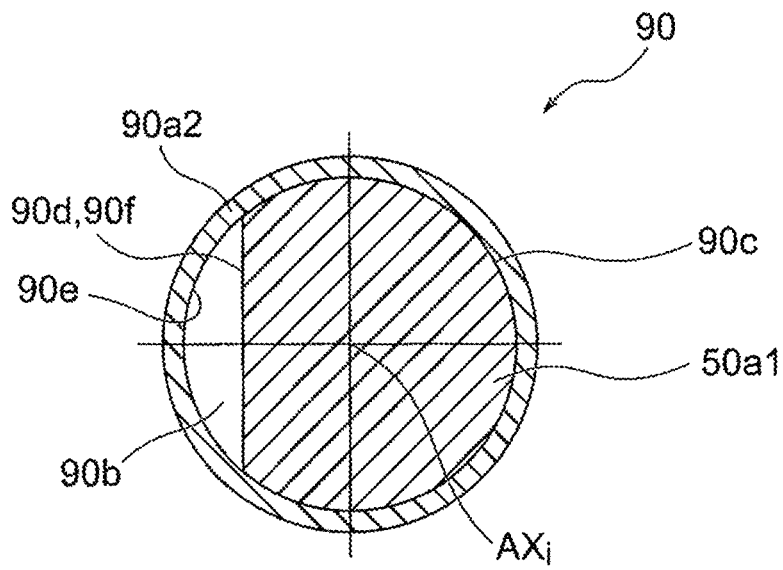
FIG. 12A is a diagram showing an aperture member in which a light-shielding part is formed at an outer side of a transmission part.
Figure 12B:
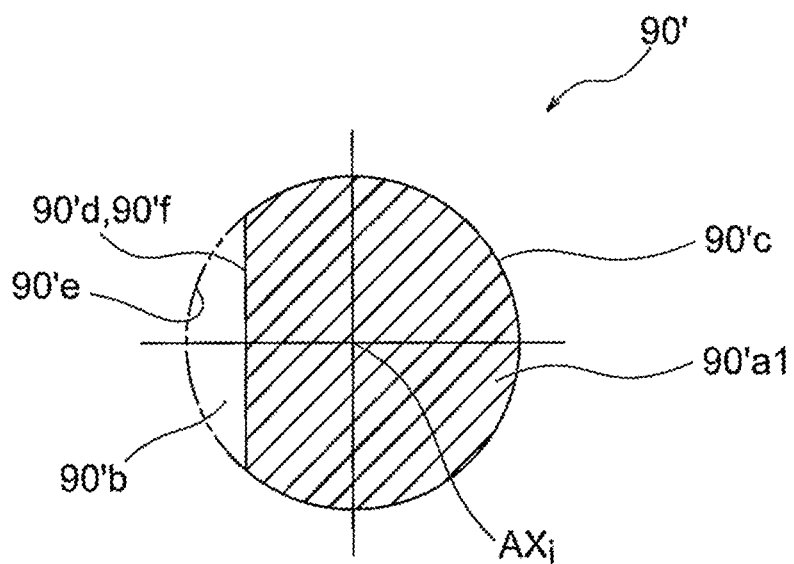
FIG. 12B is a diagram showing an aperture member in which no light-shielding part is formed at the outer side of the transmission part.

Furthermore, a configuration of another aperture member is shown in FIG. 12A and FIG. 12B. FIG. 12A is a diagram showings an aperture member in which a light-shielding part is formed outer side the transmission part. FIG. 12B is a diagram showing an aperture member in which no light-shielding part is formed outer side the transmission part. A darkening part may be used in place of the light-shielding part.

Figure 13A:
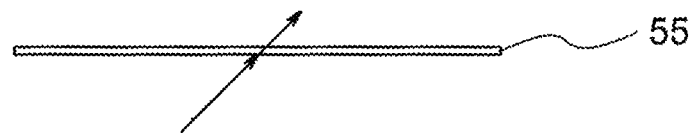
FIG. 13A is a diagram showing a state of refraction of light at a sample position.

First, an aperture member 90 will be described. As shown in FIG. 12A, the aperture member 90 has a light-shielding part 90a1, a light-shielding part 90a2, and a transmission part 90b. FIG. 13A depicts the light-shielding part 90a1 and the light-shielding part 90a2 in a distinguishable manner, for convenience of explanation. However, both portions do not have to be distinguished from each other. The light-shielding part 90a1 and the light-shielding part 90a2 may be formed from a single member.

In the aperture member 90, the light-shielding part 90a1 and the light-shielding part 90a2 are formed from an opaque member, for example, a metal plate. In this case, the transmission part 90b is a gap (hole) formed in a metal plate. Alternatively, the light-shielding parts 90a1 and 90a2 and the transmission part 90b are formed from a transparent member, for example, a glass plate or a resin plate. In this case, the light-shielding part 90a1 and the light-shielding part 90a2 are formed, for example, by applying light-shielding paint on a glass plate, but the transmission part 90b is not coated. The transmission part 90b is thus a glass plate per se.

The light-shielding part 90a1 is formed so as to include the optical axis $AX_i$ of the illumination optical system. The shape of the light-shielding part 90a1 is defined by a first outer edge 90c and a second outer edge 90d. Both ends of the first outer edge 90c are connected to each other with the second outer edge 90d. In FIG. 12A, the first outer edge 90c is part of a circumference, and the second outer edge 90d is a straight line. As indicated by the first outer edge 90c and the second outer edge 90d, the light-shielding part 90a1 is shaped in the form of a circle with a cut-off segment, that is, a D-cut shape The shape of the transmission part 90b is defined by an outer edge 90e and an inner edge 90f. Both ends of the outer edge 90e are connected to each other with the inner edge 90f. In FIG. 12A, the outer edge 90e is part of a circumference, and the inner edge 90f is a straight line. As indicated by the outer edge 90e and the inner edge 90f, the transmission part 90b is shaped in the form of a circle with a cut-off segment, that is, a bow shape.

The shape of the light-shielding part 90a2 is a ring. Although the light-shielding part 90a2 is not necessarily provided, the provision of the light-shielding part 90a2 outer side of the light-shielding part 90a1 makes clear the outer edge 90e. Thus, even when the diameter of light flux incident on the aperture member 90 is set larger than the outer edge 90e, the light flux incident on the aperture member 90 is restricted by the outer edge 90e when passing through the transmission part 90b.

Therefore, the maximum diameter of the light flux emerged from the aperture member 90 is thus a diameter determined by the outer edge 90e. Hence, when compared with an aperture member 90' described next, the diameter of light flux incident on the aperture member 90 need not be precisely matched with the outer edge 90e.

Next, the aperture member 90' will be described. As shown in FIG. 12B, the aperture member 90' has a light-shielding part 90'a1. In the aperture member 90', similar to the aperture member 90, the light-shielding part 90'a1 may be formed from an opaque member, for example, a metal plate. Alternatively, the light-shielding part 90'a1 may be formed from a transparent member, for example, a glass plate or a resin plate. The light-shielding part 90'a1 is formed, for example, by applying light-shielding paint on a glass plate.

The light-shielding part 90'a1 is formed so as to include the optical axis $AX_i$ of the illumination optical system. The shape of the light-shielding part 90'a1 is defined by a first outer edge 90'c and a second outer edge 90'd. Both ends of the first outer edge 90'c are connected to each other with the second outer edge 90'd. In FIG. 12B, the first outer edge 90'c is part of a circumference, and the second outer edge 90'd is a straight line. As indicated by the first outer edge 90'c and the second outer edge 90'*d*, the light-shielding part 90'*a*1 is shaped in the form of a circle with a cut-off segment, that is, a D-cut shape.

The shape of the transmission part 90'*b* is defined by an outer edge 90'*e* and an inner edge 90'*f*. Both ends of the outer edge 90'*e* are connected to each other with the inner edge 90'*f*. In FIG. 12B, the outer edge 90'*e* is part of a circumference, and the inner edge 90'*f* is a straight line. As indicated by the outer edge 90'*e* and the inner edge 90'*f*, the transmission part 90'*b* is shaped in the form of a circle with a cut-off segment, that is, a bow shape.

As described above, the shapes of the transmission part 90*b* and the transmission part 90'*b* are each a circle with a cut-off segment. Thus, it can be said that the transmission part 90*b* and the transmission part 90'*b* are both disposed asymmetrically with respect to the optical axis $AX_i$ of the illumination optical system.

When the aperture member 90' is formed from a metal plate, the transmission part 90'*b* does not physically exist. The outer edge of the transmission part 90'*b* therefore does not physically exist. When the aperture member 90' is formed from a transparent member, the transparent member is formed into the same shape as the light-shielding part 90'*a*1, so that the transmission part 90'*b* does not physically exist. The outer edge of the transmission part 90'*b* therefore does not physically exist.

In contrast, when the transparent member is formed into a circular shape, the transmission part 90'*b* physically exists. In this case, since the edge of the transparent member is the outer edge of the transmission part 90'*b*, the outer edge of the transmission part 90'*b* physically exists. However, since the transmission part 90'*b* is transparent, optically, substantially the same as when the aperture member 90' is formed from a metal plate. Therefore, even when the transparent member is formed into a circular shape, it is hard to say that the outer edge of the transmission part 90'*b* physically exists.

Accordingly, when the aperture member 90' is used, the diameter of light flux incident on the aperture member 90' is matched with the first outer edge 90'*c*. In this case, the outermost portion of the light flux comes to the outer edge of the transmission part 90'*b*. The inner edge of the transmission part 90'*b* is equivalent to the second outer edge 90'*d*. Based on the foregoing, the shape of the transmission part 90'*b* can be defined with the outermost portion of light flux and the second outer edge 90'*d*.

As described above, in the sample shape measuring apparatus of the present embodiment, the optical member is disposed in at least one of the illumination optical system and the detection optical system. For this reason, the aperture member 90 and/or the aperture member 90' may be disposed in the detection optical system. In this case, the transmission part is disposed asymmetrically relative to the optical axis of the detection optical system.

An action generated with the aperture member 90 and/or the aperture member 90' will be described. Hereinafter, a case where the optical member is disposed in the detection optical system will be described. In the example of using the aperture member 50' described above, the state at the position of the pupil of the pupil projection lens has been explained. In the following explanation, a state at the position of the pupil of the objective lens will be described.

The relation between the pupil of the objective lens and the image of the aperture member will be described. In the following description, the aperture member 90 shown in FIG. 12A is used as an aperture member.

In the aperture member 90, the second outer edge 90*d* or the inner edge 90*f* is the boundary that separates the light-shielding part 90*a*1 from the transmission part 90*b*. Here, the axis vertical to this boundary is defined as a first axis, and the axis parallel to the boundary is defined as a second axis. In FIG. 12A, the first axis is the axis in the right-left direction in the drawing sheet, and the second axis is the axis in the top-bottom direction in the drawing sheet. In the following description, the first axis and the second axis are used for explanation.

Figure 13B:
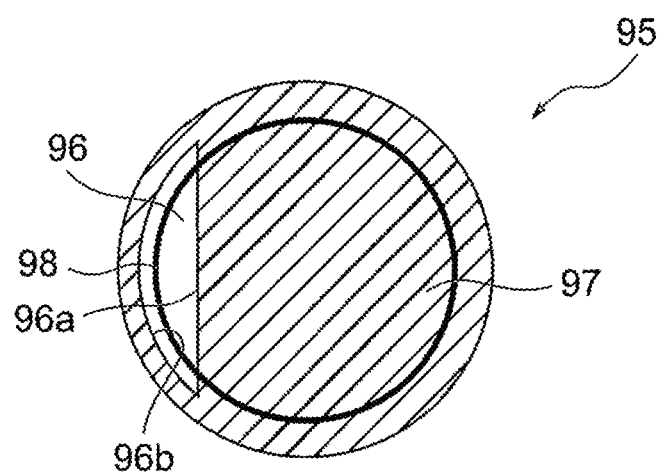
FIG. 13B is a diagram showing relationship between the pupil of the objective lens and an image of the aperture member.
Figure 13C:
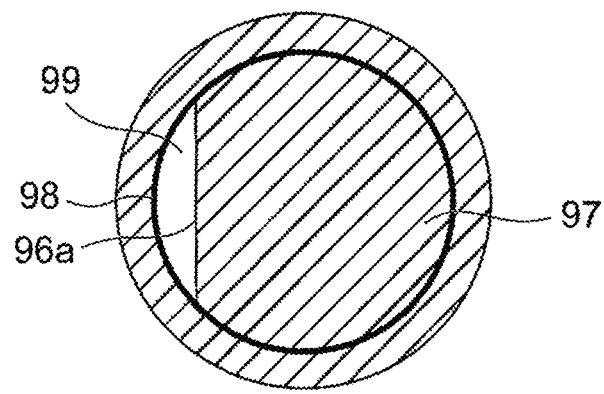
FIG. 13C is a diagram showing a state of a light flux passing through the pupil of the objective lens.

FIG. 13A is a diagram showing the state of refraction of light at the sample position, FIG. 13B is a diagram showing the relationship between the pupil of the objective lens and the image of the aperture member, and FIG. 13C is a diagram showing the state of a light flux passing through the pupil of the objective lens. In FIG. 13A, no sample is present. The case where a sample is present but its surface is flat, is included in the case where no sample is present.

Figure 14A:
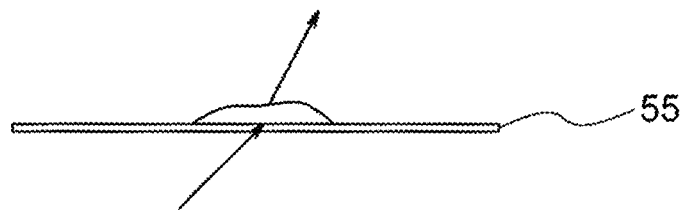
FIG. 14A is a diagram showing a state of refraction of light at a sample position.
Figure 14B:
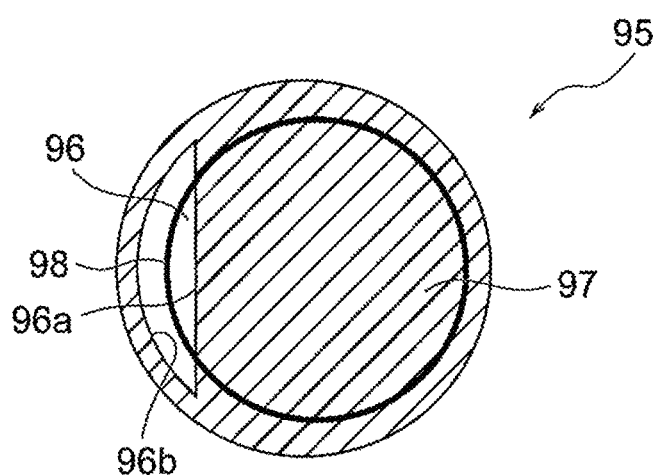
FIG. 14B is a diagram showing relationship between the pupil of the objective lens and an image of the aperture member.
Figure 14C:
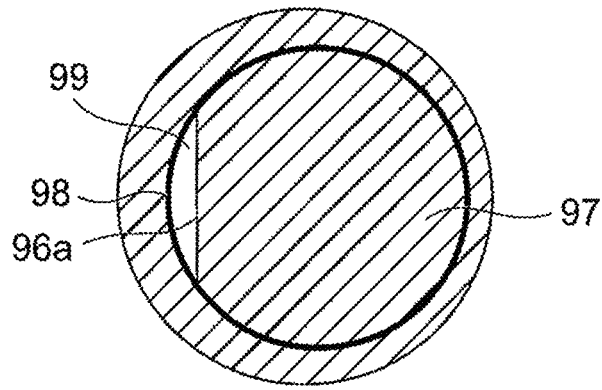
FIG. 14C is a diagram showing a state of a light flux passing through the pupil of the objective lens.

FIG. 14A is a diagram showing the state of refraction of light at the sample position, FIG. 14B is a diagram showing the relationship between the pupil of the objective lens and the image of the aperture member, and FIG. 14C is a diagram showing the state of a light flux passing through the pupil of the objective lens. In FIG. 14A, the inclination of the surface of the sample is upward to the right, that is, the surface of the sample is elevated from the left side to the right side of the first axis.

FIG. 15A is a diagram showing the state of refraction of light at the sample position, FIG. 15B is a diagram showing the relationship between the pupil of the objective lens and the image of the aperture member, and FIG. 15C is a diagram showing the state of a light flux passing through the pupil of the objective lens. In FIG. 15A, the inclination of the surface of the sample is downward to the right, that is, the surface of the sample is lowered from the left side to the right side of the first axis.

The case where a sample is present refers to a case where the surface of the sample is inclined (not-flat). Therefore, the case where a sample is present but its surface is flat, is not included in the case where a sample is present.

In the case where no sample is present, as shown in FIG. 13A, light incident on the holding member 55 and light emerged from the holding member 55 have same traveling direction. As a result, the image 95 of the aperture member formed at the pupil position of the objective lens becomes as shown in FIG. 13B. The circle (circumference) indicated with numeral 98 is the outer edge of the pupil of the objective lens, and the inner side of the circle (circumference) is the pupil of the objective lens.

As shown in FIG. 13B, the image 96 of the transmission part is shaped like a bow, and the shape of the pupil 98 of the objective lens is a circle. Here, the image 96 of the transmission part is positioned so as to include part of the outer edge of the pupil 98 of the objective lens. On the other hand, the image 97 of the light-shielding part is positioned so as to cover the pupil 96 of the objective lens as a whole, except the region of the image 98 of the transmission part.

Then, the image 96*a* of the inner edge of the transmission part is positioned inner side (the direction approaching the optical axis) of the outer edge of the pupil 98 of the objective lens. Moreover, the image 96*b* of the outer edge of the transmission part is positioned outer side (the direction moving away the optical axis) of the outer edge of the pupil 98 of the objective lens. In this manner, in the sample shape measuring apparatus of the present embodiment, the image 96*a* of the inner edge of the transmission part is formed inner side of the outer edge of the pupil 98 of the objective lens, and the image 96*b* of the outer edge of the transmission part is formed outer side of the outer edge of the pupil 98 of the objective lens.

Here, light outer side of the outer edge of the pupil 98 of the objective lens does not pass through the pupil 98 of the objective lens (is not emerged from the objective lens 98). Therefore, as shown in FIG. 13C, the region 99 of the light flux passing through the pupil 98 of the objective lens is the region between the image 96*a* of the inner edge of the transmission part and the outer edge of the pupil 98 of the objective lens. Then, the area of this region 99 as a whole corresponds to the brightness of the sample image.

Both ends of the image 96*a* of the inner edge of the transmission part are positioned outer side of the outer edge of the pupil 98 of the objective lens. Therefore, the image 96*a* of the inner edge of the transmission part is not entirely positioned inner side of the outer edge of the pupil 98 of the objective lens. However, most of the image 96*a* of the inner edge of the transmission part is positioned inner side of the outer edge of the pupil 98 of the objective lens. Accordingly, even in such a state, the image 96*a* of the inner edge of the transmission part is considered to be formed inner side of the outer edge of the pupil 98 of the objective lens.

On the other hand, in the case where a sample is present, as shown in FIG. 14A and FIG. 15A, light incident on the holding member 55 and light transmitted through the sample have different traveling directions.

In FIG. 14A, the surface of the sample is elevated from the left side to the right side of the first axis. Light transmitted through the sample is deflected in the direction toward the optical axis. As a result, an image of the aperture member formed at the pupil position of the objective lens is as shown in FIG. 14B. Also in FIG. 14B, the circle (circumference) indicated with numeral 98 is the outer edge of the pupil of the objective lens, and the inner side of the circle (circumference) is the pupil of the objective lens.

As shown in FIG. 14B, the image 96 of the transmission part is shaped like a bow, and the shape of the pupil 98 of the objective lens is a circle. Here, the image 96 of the transmission part is positioned so as to include part of the outer edge of the pupil 98 of the objective lens. On the other hand, the image 97 of the light-shielding part is positioned so as to cover the pupil of the objective lens as a whole, except the region of the image 96 of the transmission part.

The image 96*a* of the inner edge of the transmission part is positioned inner side of the outer edge of the pupil 98 of the objective lens (the direction approaching the optical axis). The image 96*b* of the outer edge of the transmission part is positioned outer side of the outer edge of the pupil 98 of the objective lens (the direction moving away the optical axis).

However, when compared with the case where no sample is present, the image 95 of the aperture member is displaced leftward along the first axis with respect to the pupil 98 of the objective lens. Therefore, as shown in FIG. 14C, the distance from the image 96*a* of the inner edge of the transmission part to the outer edge of the pupil 98 of the objective lens is smaller than that in FIG. 13C. In this case, the area of the region 99 is smaller than the area of the region 99 in FIG. 13C. Therefore, the brightness of the sample image in FIG. 14C is lower than the brightness of the sample image in FIG. 13C.

Light transmitted through the sample comes close to the optical axis as the inclination of the surface of the sample becomes steep. In this case, the brightness of the sample image becomes low. Conversely, light transmitted through the sample goes away from the optical axis as the inclination of the surface of the sample becomes gentle. In this case, the brightness of the sample image becomes high.

In FIG. 15A, the surface of the sample is lowered from the left side to the right side of the first axis. Light transmitted through the sample is deflected in the direction away from the optical axis. As a result, the image of the aperture member formed at the pupil position of the objective lens is as shown in FIG. 15B. Also in FIG. 15B, the circle (circumference) denoted by the reference sign 98 is the outer edge of the pupil of the objective lens, and the inner side of the circle (circumference) is the pupil of the objective lens.

As shown in FIG. 15B, the image 96 of the transmission part is shaped like a bow, and the shape of the pupil 98 of the objective lens is a circle. Here, the image 96 of the transmission part is positioned so as to include part of the outer edge of the pupil 98 of the objective lens. On the other hand, the image 97 of the light-shielding part is positioned so as to cover the entire pupil of the objective lens, except the region of the image 96 of the transmission part.

The image 96*a* of the inner edge of the transmission part is positioned inner side of the outer edge of the pupil 98 of the objective lens (the direction approaching the optical axis). The image 96*b* of the outer edge of the transmission part is positioned outer side of the outer edge of the pupil 98 of the objective lens (the direction moving away the optical axis).

However, when compared with the case where no sample is present, the image 95 of the aperture member is displaced rightward along the first axis with respect to the pupil 98 of the objective lens. Therefore, as shown in FIG. 15C, the distance from the image 96*a* of the inner edge of the transmission part to the outer edge of the pupil 98 of the objective lens is larger than that in FIG. 13C. In this case, the area of the region 99 is larger than the area of the region 99 in FIG. 13C. Therefore, the brightness of the sample image in FIG. 15C is higher than the brightness of the sample image in FIG. 13C.

Light transmitted through the sample goes away from the optical axis as the inclination of the surface of the sample becomes steep. In this case, the brightness of the sample image becomes high. Conversely, light transmitted through the sample comes close to the optical axis as the inclination of the surface of the sample becomes gentle. In this case, the brightness of the sample image becomes low.

Figure 16A:
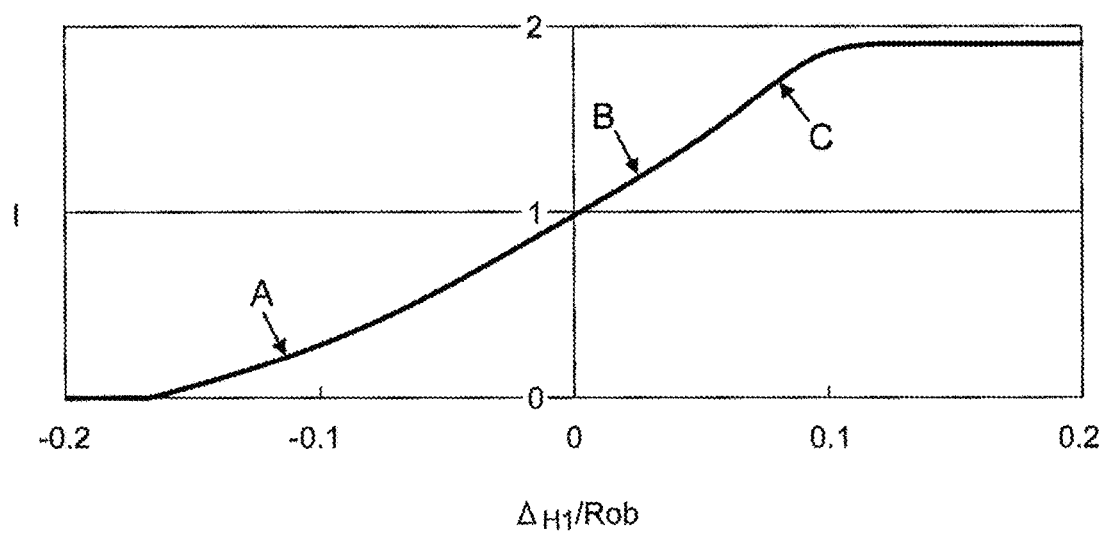
FIG. 16A is a graph showing relationship of an amount of displacement $\Delta_{H1}$ and an amount I of a light flux.
Figure 16B:
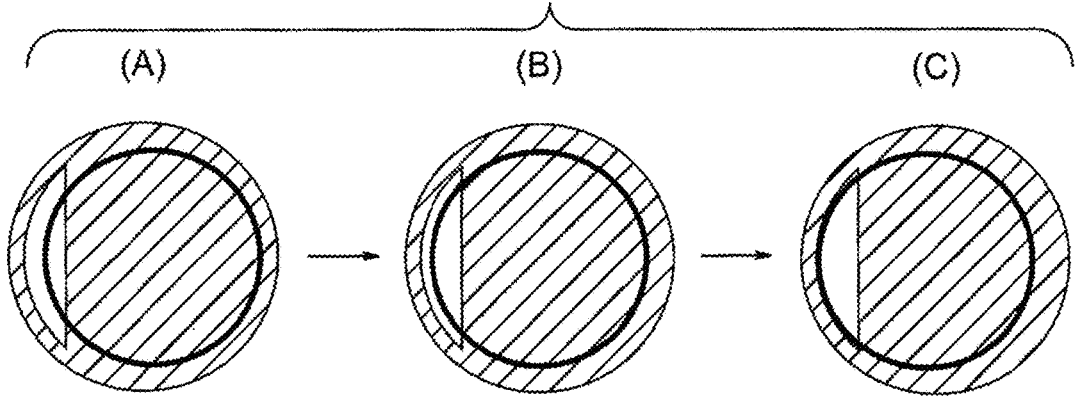
FIG. 16B is a diagram showing displacement of the image of the aperture member relative to the pupil of the objective lens.

FIG. 16A is a graph showing relationship between an amount of displacement $\Delta_{H1}$ and an amount I of the light flux. FIG. 16B is a diagram showing displacement of the image of the aperture member relative to the pupil of the objective lens. The amount of displacement $\Delta_{H1}$ is an amount of displacement of the image of the aperture member relative to the pupil of the objective lens, and is an amount of displacement in a direction along the first axis. The amount I of the light flux is an amount of the light flux passing through the pupil of the pupil projection lens.

In FIG. 16B, the image of the aperture member moves in the direction of the arrow in the order of (A), (B), and (C) with respect to the pupil of the objective lens. The direction in which the image of the aperture member is displaced is the direction along the first axis.

In FIG. 16A, the calculation is based on $L'_0 \times \beta = 0.8 \times RPL$ and $L'_1 \times \beta = 1.1 \times RPL$.

where $L'_0$ denotes a length from the optical axis of the illumination optical system to a predetermined position, $L'_1$ denotes a length from the optical axis of the illumination optical system to the outer edge of the transmission part, on the line connecting the optical axis of the illumination optical system with the predetermined position, the predetermined position is a position in which the length from the optical axis of the illumination optical system is made minimum, from among positions on the inner edge of the transmission part, RPL denotes the radius of the pupil of the pupil projection lens; and β denotes the value obtained by dividing the focal length of the pupil projection lens by the focal length of the objective lens.

Moreover, the transmittance of the transmission part is set to 100%. In FIG. 16A, the numerical values on the horizontal axis are obtained by normalizing the displacement amount $\Delta_{H1}$ by the radius RPL of the pupil of the pupil projection lens. The numerical values on the vertical axis are normalized by the area when the displacement amount $\Delta_{H1}$ is zero:

$$S_0 = RPL^2 \times \theta - RPL \times L' 0 \times \beta \times \sin \theta,$$

where $\theta = \cos^{-1}(L'0 \times \beta / RPL)$.

The area S indicates the region of light flux passing through the pupil of the pupil projection lens. Thus, the area S can be replaced by the amount of light flux I. Then in FIG. 16A, I is used as a variable of the vertical axis.

When no sample is present (or when the surface of the sample is flat), the displacement amount $\Delta_{H1}$ is zero. In this case, the relation between the pupil of the objective lens and the image of the aperture member is as represented by (B) in FIG. 16B. Thus, the amount of light flux I is the amount denoted by the arrow B.

Next, when a sample is present, the displacement amount $\Delta_{H1}$ is not zero. Here, when the surface of the sample is elevated from the left side to the right side of the first axis, the relation between the pupil of the objective lens and the image of the aperture member is as represented by (A) in FIG. 16B. In this case, of the region of the image of the transmission part, the region positioned within the pupil of the objective lens is smaller than that of when the displacement amount $\Delta_{H1}$ is zero. Therefore, the amount of light flux I is the amount denoted by the arrow A.

In contrast, when the surface of the sample is lowered from the left side to the right side of the first axis, the relation between the pupil of the objective lens and the image of the aperture member is as represented by (C) in FIG. 16B. In this case, of the region of the image of the transmission part, the region positioned within the pupil of the objective lens is larger than that of when the displacement amount $\Delta_{H1}$ is zero. Therefore, the amount of light flux I is the amount denoted by the arrow C.

As just described, in the sample shape measuring apparatus of the present embodiment, the amount of light flux I changes depending on a change of the displacement amount $\Delta_{H1}$.

The case where the transmission part is disposed asymmetrically relative to the optical axis of the illumination optical system has been described. The action is acquired even when the transmission part is disposed asymmetrically relative to the optical axis of the detection optical system.

As described above, in the sample shape measuring apparatus of the present embodiment, brightness of the sample image differs between the case where the sample is present and the case where no sample is present. In addition, the brightness of the sample image changes according to the direction of the inclination of the surface of the sample and/or the steepness of the inclination.

Figure 17A:
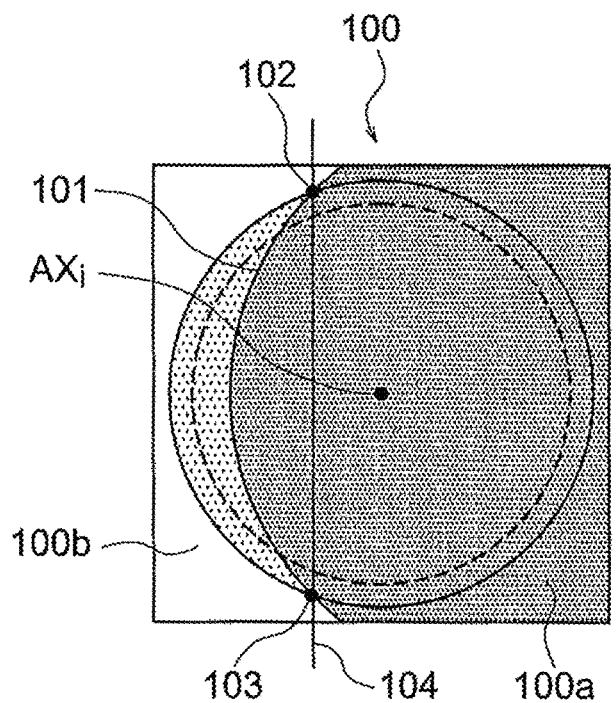
FIG. 17A is a diagram showing a state of illumination light when an aperture member of a modified example 1 is used.
Figure 17B:
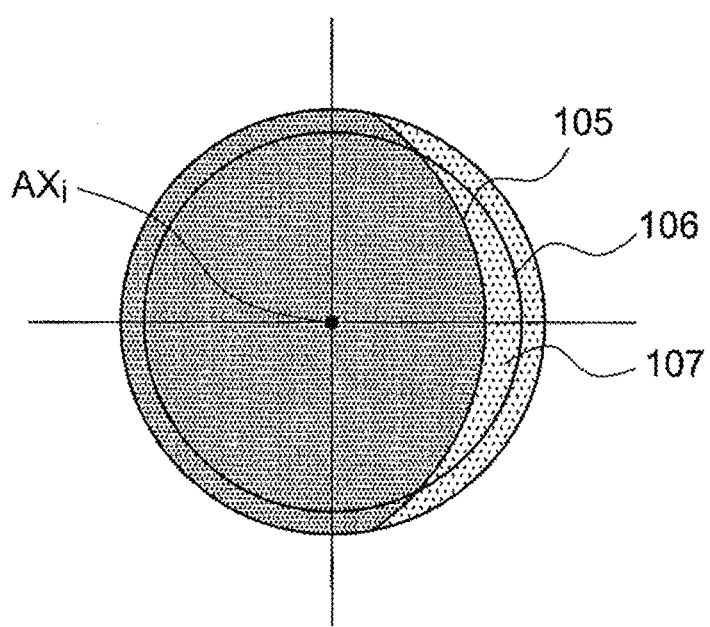
FIG. 17B is a diagram showing a state of imaging light when the aperture member of the modified example 1 is used.

A modified example of the aperture member 90' will be shown. In the following modified examples, "transmission part" is referred to as "opening". FIG. 17A is a diagram showing a state of illumination light when an aperture member of a modified example 1 is used. FIG. 17B is a diagram showing a state of imaging light when the aperture member of the modified example 1 is used. FIG. 17A shows a state of illumination light applied to an aperture member 100. The radiation range of illumination light can be considered as the pupil of the illumination optical system. Therefore, FIG. 17A shows a state in which the pupil of the illumination optical system is superimposed on the aperture member 100.

The aperture member 100 of the modified example 1 has a light-shielding part 100a and an opening 100b. When the aperture member 100 is inserted to the optical path of the illumination optical system, the aperture member 100 is disposed such that the light-shielding part 100a includes the optical axis $AX_i$. The opening 100b is positioned at a place eccentric with respect to the optical axis $AX_i$.

A boundary line 101 is formed between the light-shielding part 100a and the opening 100b. The light-shielding part 100a and the opening 100b are separated from each other by the boundary line 101.

When the pupil of the illumination optical system is superimposed on the aperture member 100, the boundary line 101 intersects the outer edge of the pupil of the illumination optical system at a point 102 and a point 103. The point 102 and the point 103 are the predetermined two points. A straight line 104 is a straight line passing through the point 102 and the point 103.

The boundary line 101 is formed of an arc. The arc is formed so as to be convex from the light-shielding part 100a toward the opening 100b. Therefore, in the aperture member 100, the straight line 104 is positioned between the boundary line 101 and the optical axis $AX_i$.

In the aperture member 100, the boundary line 101 is a line formed of one curved line. However, the boundary line 101 may be any one of a line formed with a plurality of straight lines, a line formed with a plurality of curved line, or a line formed with a curved line and a straight line.

In FIG. 17B, a state of imaging light at the position of the pupil of the detection optical system is shown. A boundary line 105 is the second boundary line. The boundary line 105 is an image of the boundary line 101. A boundary line 106 is the outer side boundary line. The boundary line 106 is formed of part of the outer edge of the pupil of the detection optical system. The light flux transmission region 107 is surrounded by the boundary line 105 and the boundary line 106.

The boundary line 105 and the boundary line 106 are both convex. Then, the direction of the convex shape is the same in the boundary line 105 and the boundary line 106. In this case, the light flux transmission region 107 is shaped like a meniscus having a concave portion facing toward the optical axis $AX_i$ side. Therefore, it can be said that the boundary line 105 is formed of a concave line toward the optical axis $AX_i$ side.

Figure 18A:
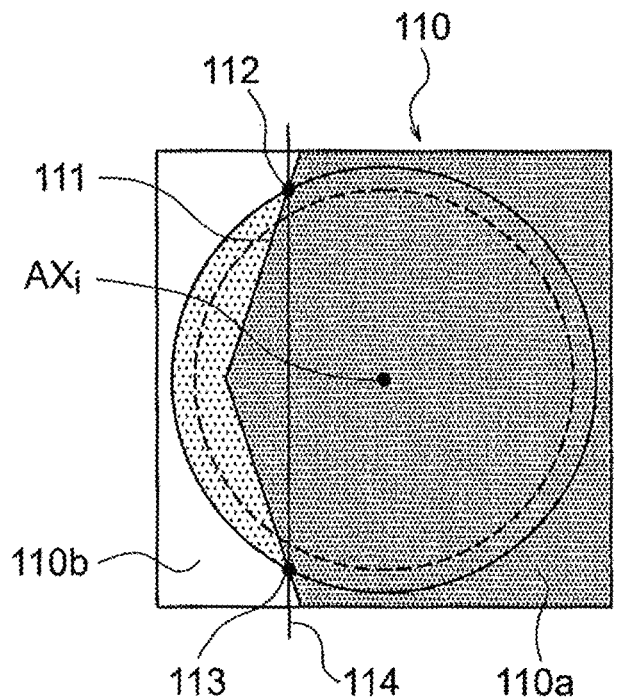
FIG. 18A is a diagram showing an aperture member of a modified example 2.
Figure 18B:
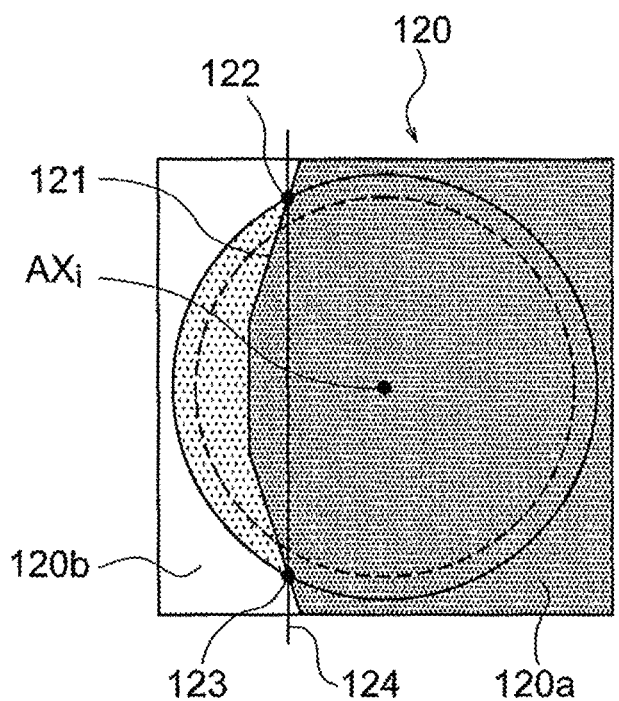
FIG. 18B is a diagram showing an aperture member of a modified example 3.

An aperture member of a modified example 2 is shown in FIG. 18A, and an aperture member of a modified example 3 is shown in FIG. 18B. FIG. 18A is a diagram showing an aperture member formed with two straight lines. FIG. 18B is a diagram showing an aperture member formed with three straight lines.

As shown in FIG. 18A, an aperture member 110 of the modified example 2 has a light-shielding part 110a and an opening 110b. When the aperture member 110 is inserted to the optical path of the illumination optical system, the aperture member 110 is disposed such that the light-shielding part 110a includes the optical axis $AX_i$. The opening 110b is positioned at a place eccentric with respect to the optical axis $AX_i$.

A boundary line 111 is formed between the light-shielding part 110a and the opening 110b. The light-shielding part 110a is separated from the opening 110b by the boundary line 111.

When the pupil of the illumination optical system is superimposed on the aperture member 110, the boundary line 111 intersects the outer edge of the pupil of the illumination optical system at a point 112 and a point 113. The point 112 and the point 113 are predetermined two points. A straight line 114 is a straight line passing through the point 112 and the point 113.

The boundary line 111 is formed with two straight lines. The two straight lines are formed to be convex from the light-shielding part 110a toward the opening 110b. Therefore, in the aperture member 110, the straight line 114 is positioned between the boundary line 111 and the optical axis $AX_i$.

By using the aperture member 110, it is possible to measure a sample having a larger amount of tilt in the surface.

As shown in FIG. 18B, an aperture member 120 of the modified example 3 has a light-shielding part 120a and an opening 120b. When the aperture member 120 is inserted to the optical path of the illumination optical system, the aperture member 120 is disposed such that the light-shielding part 120a includes the optical axis $AX_i$. The opening 120b is positioned at a place eccentric with respect to the optical axis $AX_i$.

A boundary line 121 is formed between the light-shielding part 120a and the opening 120b. The light-shielding part 120a is separated from the opening 120b by the boundary line 121.

When the pupil of the illumination optical system is superimposed on the aperture member 120, the boundary line 121 intersects the outer edge of the pupil of the illumination optical system at a point 122 and a point 123. The point 122 and the point 123 are predetermined two points. A straight line 124 is a straight line passing through the point 122 and the point 123.

The boundary line 121 is formed with three straight lines. The three straight lines are formed so as to be convex from the light-shielding part 120a toward the opening 120b. Therefore, in the aperture member 120, the straight line 124 is positioned between the boundary line 121 and the optical axis $AX_i$.

By using the aperture member 120, it is possible to measure a sample having a larger amount of tilt in the surface.

Figure 19A:
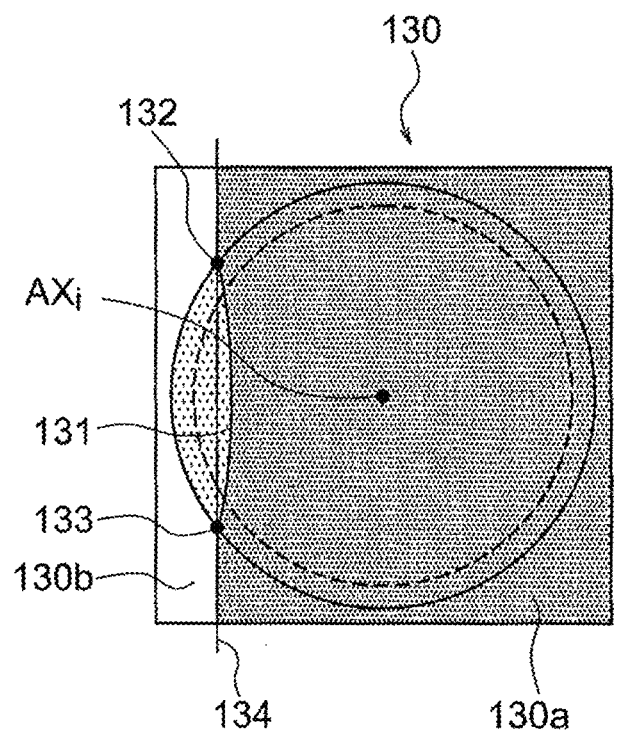
FIG. 19A is a diagram showing a state of illumination light when an aperture member of a modified example 4 is used.
Figure 19B:
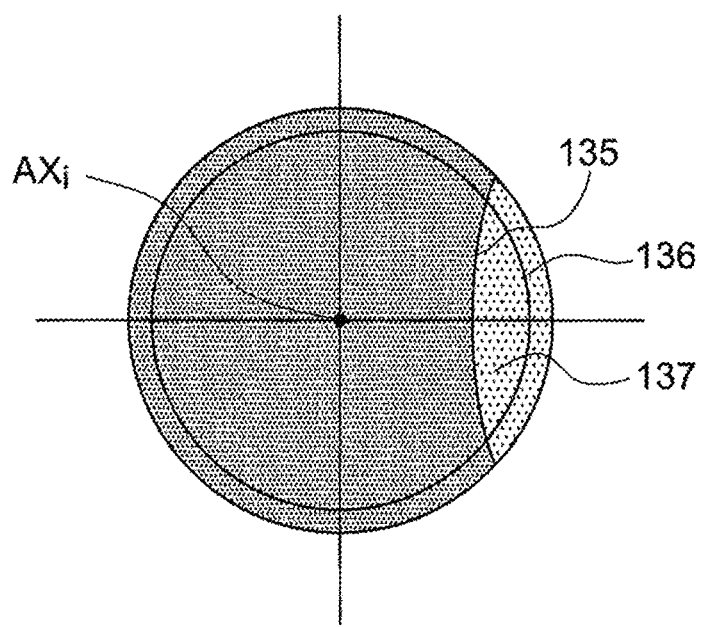
FIG. 19B is a diagram showing a state of imaging light when the aperture member of the modified example 4 is used.

FIG. 19A is a diagram showing a state of illumination light when an aperture member of a modified example 4 is used. FIG. 19B is a diagram showing a state of imaging light when the aperture member of the modified example 4 is used. FIG. 19A shows a state of illumination light applied to an aperture member 130. The radiation range of illumination light can be considered as the pupil of the illumination optical system. Therefore, FIG. 19A shows a state in which the pupil of the illumination optical system is superimposed on the aperture member 130.

The aperture member 130 of the modified example 4 has a light-shielding part 130a and an opening 130b. When the aperture member 130 is inserted to the optical path of the illumination optical system, the aperture member 130 is disposed such that the light-shielding part 130a includes the optical axis $AX_i$. The opening 130b is positioned at a place eccentric with respect to the optical axis $AX_i$.

A boundary line 131 is formed between the light-shielding part 130a and the opening 130b. The light-shielding part 130a and the opening 130b are separated from each other by the boundary line 131.

When the pupil of the illumination optical system is superimposed on the aperture member 130, the boundary line 131 intersects the outer edge of the pupil of the illumination optical system at a point 132 and a point 133. The point 132 and the point 133 are the predetermined two points. A straight line 134 is a straight line passing through the point 132 and the point 133.

The boundary line 131 is formed of an arc. The arc is formed so as to be convex from the opening 130b toward the light-shielding part 130a. Therefore, in the aperture member 130, the boundary line 131 is positioned between the straight line 134 and the optical axis $AX_i$.

In the aperture member 130, the boundary line 131 is a line formed of one curved line. However, the boundary line 131 may be any one of a line formed with a plurality of straight lines, a line formed with a plurality of curved line, or a line formed with a curved line and a straight line.

In FIG. 19B, a state of imaging light at the position of the pupil of the detection optical system is shown. A boundary line 135 is the third boundary line. The boundary line 135 is an image of the boundary line 131. A boundary line 136 is the outer side boundary line. The boundary line 136 is formed of part of the outer edge of the pupil of the detection optical system. The light flux transmission region 137 is surrounded by the boundary line 135 and the boundary line 136.

The boundary line 135 and the boundary line 136 are both convex. Then, the direction of the convex shape is directly opposite between the boundary line 135 and the boundary line 136. In this case, the shape of the light flux transmission region 137 is biconvex. Therefore, it can be said that the boundary line 135 is formed of a line convex toward the optical axis $AX_i$ side.

Figure 20A:
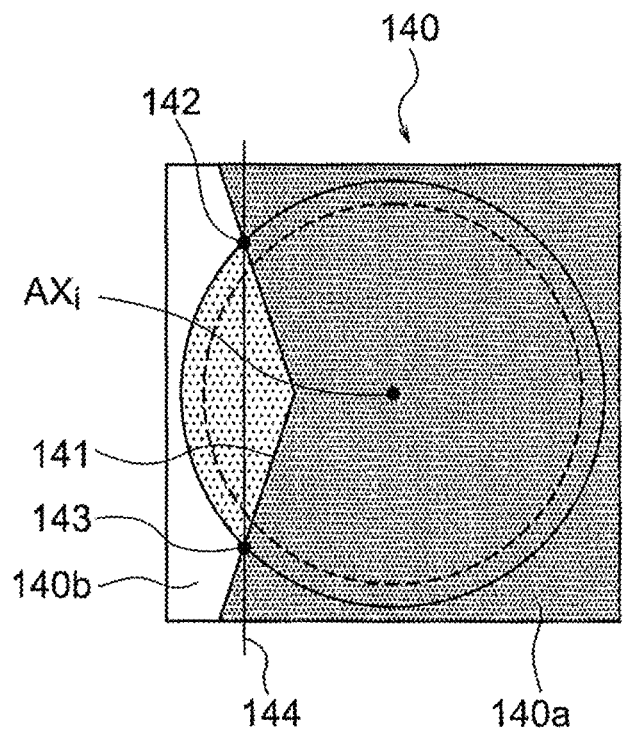
FIG. 20A is a diagram showing an aperture member of a modified example 5.
Figure 20B:
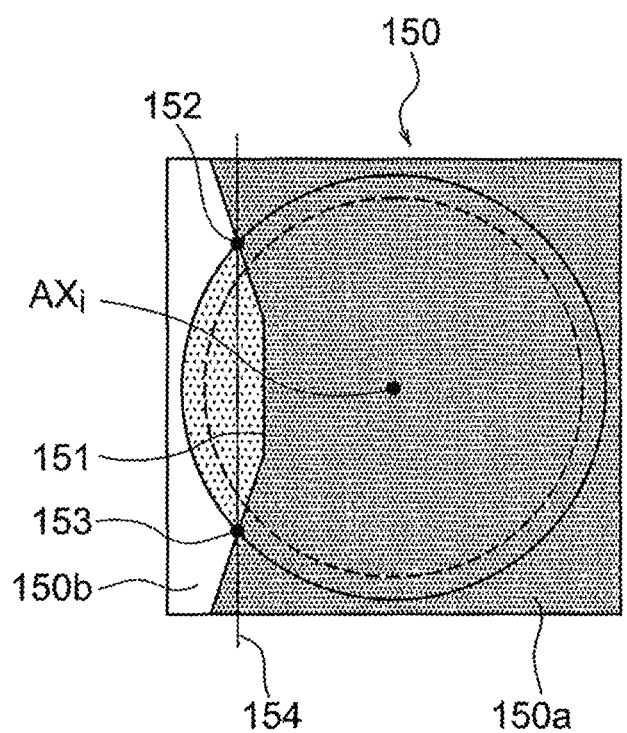
FIG. 20B is a diagram showing an aperture member of a modified example 6.

An aperture member of a modified example 5 is shown in FIG. 20A, and an aperture member of a modified example 6 is shown in FIG. 20B. FIG. 20A is a diagram showing an aperture member formed with two straight lines. FIG. 20B is a diagram showing an aperture member formed with three straight lines.

As shown in FIG. 20A, an aperture member 140 of the modified example 5 has a light-shielding part 140a and an opening 140b. When the aperture member 140 is inserted to the optical path of the illumination optical system, the aperture member 140 is disposed such that the light-shielding part 140a includes the optical axis $AX_i$. The opening 140b is positioned at a place eccentric with respect to the optical axis $AX_i$.

A boundary line 141 is formed between the light-shielding part 140a and the opening 140b. The light-shielding part 141a is separated from the opening 140b by the boundary line 141.

When the pupil of the illumination optical system is superimposed on the aperture member 140, the boundary line 141 intersects the outer edge of the pupil of the illumination optical system at a point 142 and a point 143. The point 142 and the point 143 are the predetermined two points. A straight line 144 is a straight line passing through the point 142 and the point 143.

The boundary line 141 is formed with two straight lines. The two straight lines are formed to be concave from the light-shielding part 140a toward the opening 140b. Therefore, in the aperture member 140, the boundary line 141 is positioned between the straight line 144 and the optical axis $AX_i$.

By using the aperture member 140, it is possible to measure a surface of a sample having a smaller amount of tilt.

As shown in FIG. 20B, an aperture member 150 of the modified example 6 has a light-shielding part 150a and an opening 150b. When the aperture member 150 is inserted to the optical path of the illumination optical system, the aperture member 150 is disposed such that the light-shielding part 150a includes the optical axis $AX_i$. The opening 150b is positioned at a place eccentric with respect to the optical axis $AX_i$.

A boundary line 151 is formed between the light-shielding part 150a and the opening 150b. The light-shielding part 150a is separated from the opening 150b by the boundary line 151.

When the pupil of the illumination optical system is superimposed on the aperture member 150, the boundary line 151 intersects the outer edge of the pupil of the illumination optical system at a point 152 and a point 153. The point 152 and the point 153 are the predetermined two points. A straight line 154 is a straight line passing through the point 152 and the point 153.

The boundary line 151 is formed with three straight lines. The three straight lines are formed so as to be concave from the light-shielding part 150a toward the opening 150b. Therefore, in the aperture member 150, the boundary line 151 is positioned between the straight line 154 and the optical axis
$AX_i$.

By using the aperture member 150, it is possible to measure a surface of a sample having a smaller amount of tilt.

Even in the aperture member of the modified example 1 to the modified example 6, the transmission part is disposed asymmetrically relative to the optical axis of the illumination optical system. Therefore, the abovementioned action and effect are achieved.

In the sample shape measuring apparatus of the present embodiment, at least one of the illumination optical system and the detection optical system includes an optical member. In a case in which the optical member is disposed in the illumination optical system, illumination light which is inclined in a specific direction is generated. Moreover, in a case in which the optical member is disposed in the detection optical system, illumination almost identical to bright field illumination is carried out.

In the sample shape measuring apparatus of the present embodiment, illumination light deflected in a certain direction is merely applied to the sample. Thus, in derivation of the distribution of the amount of tilt in the surface of the sample, light emerged from the sample, that is, light transmitted through the sample is merely utilized, and the contrast of an image or the interference between non-diffracted light and diffracted light is not utilized. Therefore, according to the sample shape measuring apparatus of the present embodiment, even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

In the sample shape measuring apparatus of the present embodiment, the illumination which is almost identical to the bright field illumination is carried out, and a part of light that has reached the pupil of the observation optical system or a part of light that has reached a conjugate image of the pupil of the observation optical system is merely transmitted. Thus, in derivation of the distribution of the amount of tilt at the surface of the sample, light emerged from the sample, that is, light transmitted through the sample is merely utilized, and a contrast of an image or an interference between non-diffracted light and diffracted light are not utilized.

According to the sample shape measuring apparatus of the present embodiment, it is possible to measure the surface shape of the sample with high accuracy even when the surface shape of the sample is smooth. Furthermore, since a predetermined region is set, the SN ratio is improved compared with when a predetermined region is not set. Therefore, it is possible to calculate the amount of tilt in the surface of the sample with high accuracy.

In the sample shape measuring apparatus of the present embodiment, it is preferable that the detection optical system include the optical member, the optical member be an aperture member having a light-shielding part or a darkening part, and a transmission part, and the transmission part be positioned so as to include an outer side and a part of an inner side of an image of a pupil of the illumination optical system.

The aperture member 49 has the light-shielding part 49a and the transmission part 49b. The transmission part 49b is positioned so as to include a part of an outer side and a part of an inner side of the image of the pupil of the illumination optical system.

The aperture member 50 has the light-shielding part 50a1 and the transmission part 50b. The transmission part 50b is positioned so as to include an entire outer side and a part of an inner side of the image of the pupil of the illumination optical system. Similar is true for the aperture member 50'.

The aperture member 90 has the light-shielding part 90a1 and the transmission part 90b. The transmission part 90b is positioned so as to include a part of an outer side and a part of an inner side of the image of the pupil of the illumination optical system. Similar is true for the aperture member 90'.

In such manner, in the sample shape measuring apparatus of the present embodiment, the transmission part is positioned so as to include at least a part of an outer side and a part of an inner side of the image of the pupil of the illumination optical system.

By using the aperture member 49, the aperture member 50, or the aperture member 90, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

For the pupil of the illumination optical system, it is preferable to have the following relationship.

> In a case in which a light flux of illumination light fills the pupil of the objective lens pupil diameter (mm) of the illumination optical system=numerical aperture of the objective lens×focal length/2

> In a case in which a light flux of illumination light does not fill the pupil of the objective lens pupil diameter (mm) of the illumination optical system=light flux diameter of illumination light at pupil position of objective lens/2

In the sample shape measuring apparatus of the present embodiment, it is preferable that the detection optical system include the optical member, the optical member be an aperture member having a light-shielding part or a darkening part, and a transmission part, the light-shielding part or the darkening part be positioned so as to include an optical axis of the detection optical system, and the transmission part be positioned so as to include an outer side and a part of an inner side of an image of a pupil of the illumination optical system.

The aperture member 50 has the light-shielding part 50a1 and the transmission part 50b. The light-shielding part 50a1 is positioned so as to include the optical axis of the detection optical system. The transmission part 50b is positioned so as to include an entire outer side and a part of an inner side of the image of the pupil of the illumination optical system. Similar is true for the aperture member 50'.

The aperture member 90 has the light-shielding part 90a1 and the transmission part 90b. The light-shielding part 90a1 is positioned so as to include the optical axis of the detection optical system. The transmission part 90b is positioned so as to include a part of an outer side and a part of an inner side of the image of the pupil of the illumination optical system. Similar is true for the aperture member 90'.

In such manner, in the sample shape measuring apparatus of the present embodiment, the light-shielding part or the darkening part is positioned so as to include the optical axis of the detection optical system, and the transmission part is positioned so as to include at least a part of an outer side and a part of an inner side of the image of the pupil of the illumination optical system.

By using the aperture member 50 and the aperture member 90, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, it is preferable that the detection optical system include the optical member, the optical member be an aperture member having a light-shielding part or a darkening part, and a transmission part, the light-shielding part or the darkening part be positioned so as to include an optical axis of the detection optical system, and the transmission part be positioned so as not to include the optical axis, but to include an entire edge of an image of a pupil of the illumination optical system.

The aperture member 50 has the light-shielding part 50a1 and the transmission part 50b. The light-shielding part 50a1 is positioned so as to include the optical axis of the detection optical system. The transmission part 50b is positioned so as to include an entire outer side and a part of an inner side of the image of the pupil of the illumination optical system. In other words, the transmission part is positioned so as not to include the optical axis, but to include an entire edge of the image of the pupil of the illumination optical system. Similar is true for the aperture member 50'.

By using the aperture member 50, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, it is preferable that the detection optical system include the optical member, the optical member be an aperture member having a light-shielding part or a darkening part, and a transmission part, the light-shielding part or the darkening part be positioned so as to include an optical axis of the detection optical system, and the transmission part is eccentric with respect to the optical axis, and be positioned so as to include a part of an edge of an image of a pupil of the illumination optical system.

The aperture member 90 has the light-shielding part 90a1 and the transmission part 90b. The light-shielding part 90a1 is positioned so as to include the optical axis of the detection optical system. The transmission part 90b is positioned so as to include a part of an outer side and a part of an inner side of the image of the pupil of the illumination optical system. The transmission part is eccentric with respect to the optical axis. Similar is true for the aperture member 90'.

By using the aperture member 90, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, it is preferable that the illumination optical system include an objective lens, the detection optical system include a pupil projection lens, and the following conditional expression be satisfied:

$$R0 < Rill \times \beta < R1$$

where,

R0 denotes a length from an optical axis of the pupil projection lens up to a predetermined position, R1 denotes a length from the optical axis of the pupil projection lens up to an outer edge of the transmission part, and denotes a length on a line connecting the optical axis of the pupil projection lens and a predetermined position, and here the predetermined position is a position at which a length from the optical axis of the pupil projection lens is the minimum, from among positions on an inner edge of the light-shielding part, Rill denotes a radius of the pupil of the illumination optical system, and $\beta$ denotes a value obtained by dividing a focal length of the pupil projection lens by a focal length of the objective lens.

By satisfying the conditional expression, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, light that passes through the pupil of the observation optical system is detected. Therefore, the transmission part of the aperture member is positioned at the inner side of the pupil of the observation optical system. Moreover, the edge of the image of the pupil of the illumination optical system is included in the transmission part. This signifies that the edge of the image of the pupil of the illumination optical system is positioned at the inner side of the pupil of the observation optical system.

In the sample shape measuring apparatus of the present embodiment, it is possible to use an optical system of a microscope. In the optical system of the microscope, a microscope objective lens is used as the observation optical system, and a condenser lens is used as the illumination optical system. Moreover, in the optical system of the microscope, it is possible to use a plurality of microscope objective lenses and a plurality of condenser lenses. Accordingly, there exist a large number of combinations of a numerical aperture of the illumination optical system and a numerical aperture of the observation optical system.

A size of the image of the pupil of the illumination optical system is determined by the numerical aperture of the illumination optical system and the numerical aperture of the observation optical system. Therefore, according to a combination of the illumination optical system and the observation optical system, there is a possibility that the image of the pupil of the illumination optical system is larger than the pupil of the observation optical system. In this case, the edge of the image of the pupil of the illumination optical system is not positioned at the inner side of the pupil of the observation optical system.

In such a case, a light flux diameter of light emerged from the light source is made thin. By making such arrangement, at the pupil position of the observation optical system, the light flux diameter of the illumination light is included in the transmission part. Since a position of the light flux of the illumination light varies in accordance with the amount of tilt in the surface of the sample, it is possible to detect the variation in the amount of tilt in the surface of the sample as a variation in brightness.

As described heretofore, it is possible to replace the image of the pupil of the illumination optical system with a light flux of the illumination light at the pupil position of the observation optical system. Therefore, it is possible to put it in another way as follows.

'The transmission part includes the outer side and a part of the inner side of the image of the pupil of the illumination optical system' can be put in another way as 'the transmission part includes the outer side and a part of the inner side of a light flux of the illumination light at the pupil position of the observation optical system'.

'The transmission part includes a part of the edge of the image of the pupil of the illumination optical system' can be put in another way as 'the transmission part includes a part of the edge of a light flux of the illumination light at the pupil position of the observation optical system'.

'The transmission part is provided so as to include the entire edge of the image of the pupil of the illumination optical system' can be put in another way as 'the transmission part is provided so as to include the entire light flux of the illumination light at the pupil position of the observation optical system'.

'Rill denotes the radius of the pupil of the illumination optical system' can be put in another way as 'Rill denotes a radius of a light flux of the illumination light at the pupil position of the observation optical system'.

In the sample shape measuring apparatus of the present embodiment, it is preferable that the illumination optical system includes the optical member, and the optical member is an aperture member having a light-shielding part or a darkening part, and a transmission part.

In the sample shape measuring apparatus of the present embodiment, it is preferable that the illumination optical system include an optical member, the optical member is an aperture member including a light-shielding part or a darkening part, and a transmission part, the aperture member be disposed in a predetermined position such that the light-shielding part or the darkening part includes the optical axis of the illumination optical system, the predetermined position be a position between the light source unit and the scanning unit, or a pupil position of the illumination optical system, the transmission part is located outer side of an outer edge of the light-shielding part or the darkening part, an image of an inner edge of the transmission part is formed inner side of the outer edge of the pupil of the detection optical system, and an image of an outer edge of the transmission part is formed outer side of the outer edge of the pupil of the detection optical system.

Figure 21:
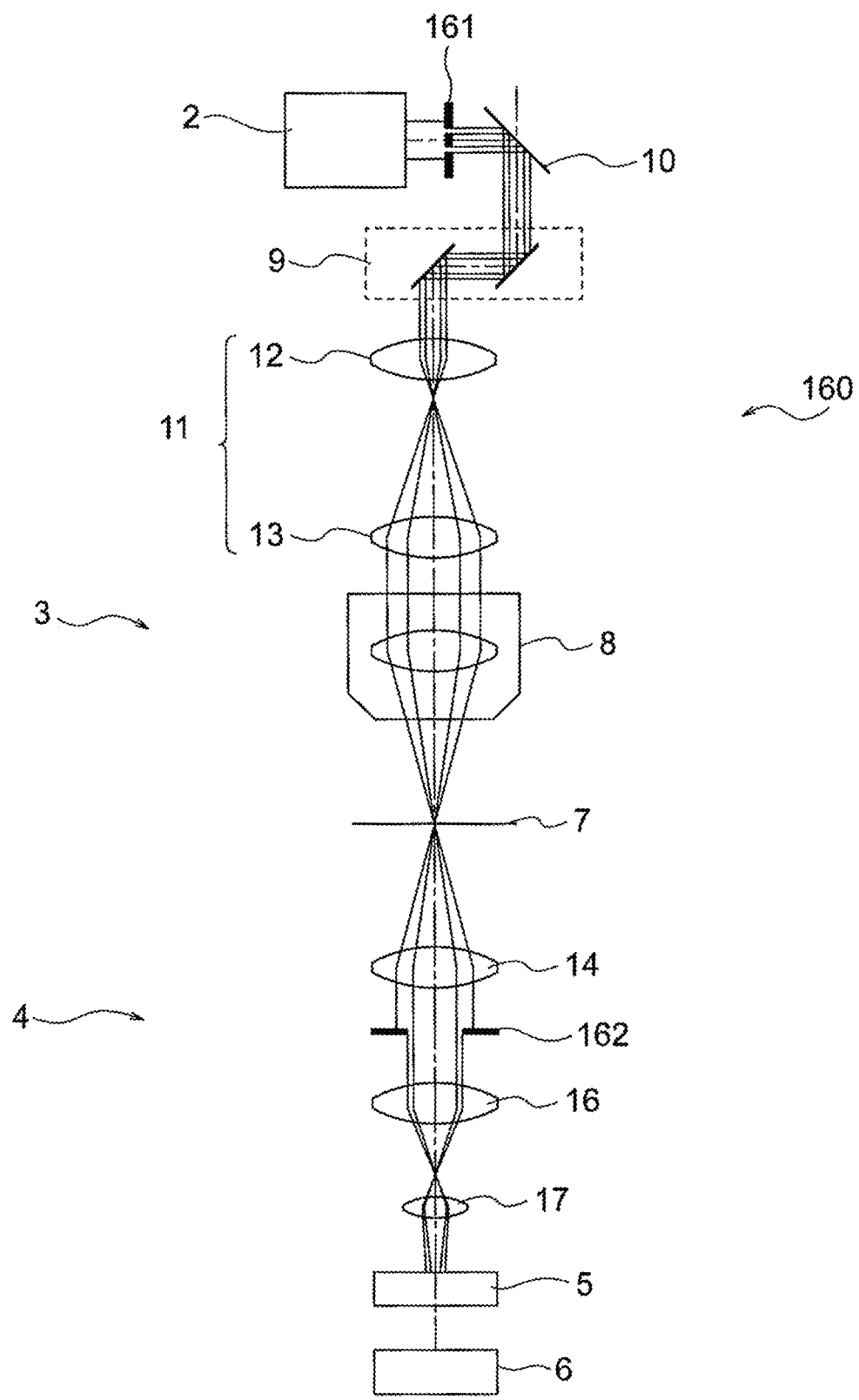
FIG. 21 is a diagram showing another sample shape measuring apparatus of the present embodiment.

Another sample shape measuring apparatus of the present embodiment will be described. FIG. 21 is a diagram showing another sample shape measuring apparatus of the present embodiment. The same reference numerals are assigned to the same configurations as those in FIG. 1, and their detailed descriptions are omitted.

A sample shape measuring apparatus 160 includes an optical member 161. The optical member 161 is an aperture member including a light-shielding part or a darkening part, and a transmission part. As the optical member 161, for example, it is possible to use the aperture member 50, the aperture member 50'. The aperture member 49, the aperture member 90, or the aperture member 90' may be used.

The optical member 161 is disposed at the predetermined position. The predetermined position is a position between the light source and the scanning unit, or the pupil position of the illumination optical system. In the sample shape measuring apparatus 160, the optical member 161 is disposed between the light source unit 2 and the optical scanning unit 9.

The optical member 161 is disposed such that the light-shielding part or the darkening part includes the optical axis of the illumination optical system. For this reason, the illumination light emerged from the optical member 161 has an annular shape.

The position between the light source unit 2 and the optical scanning unit 9 is a position conjugate with the pupil position of the illumination optical system 3. Accordingly, it is possible to regard the optical member 161 as being disposed at the pupil position of the illumination optical system 3. In addition, the pupil position of the illumination optical system 3 is conjugate with the position of the pupil of the detection optical system 4. Accordingly, the image of the optical member 161 is formed at the pupil 162 of the detection optical system.

The case where the optical member is disposed in the illumination optical system has already been explained. Specifically, as shown in FIG. 11A, in the sample shape measuring apparatus of the present embodiment, the amount I of the light flux changes according to change in amount of displacement Δ between the arrow B and the arrow C.

In this way, in the sample shape measuring apparatus of the present embodiment, illumination light deflected in a certain direction is merely applied to the sample. Thus, in derivation of the distribution of the amount of tilt in the surface of the sample, light transmitted through the sample, that is, light transmitted through the sample is merely utilized, and the contrast of an image or the interference between non-diffracted light and diffracted light is not utilized. Therefore, according to the sample shape measuring apparatus of the present embodiment, even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

In the sample shape measuring apparatus of the present embodiment, it is preferable that the processing apparatus have a function of reconstructing an image.

The reconstruction of an image will be described later.

In the sample shape measuring apparatus of the present embodiment, it is preferable that the illumination optical system include the objective lens, the sample shape measuring apparatus of the present embodiment include a first aperture member and a second aperture member to be inserted to and removed from an optical path, in the first aperture member, a portion including the optical axis of the objective lens be a light-shielding part, the first aperture member have a first opening at a position eccentric with respect to the optical axis, in the second aperture member, a portion including the optical axis of the objective lens be a light-shielding part, the second aperture member have a second opening at a position eccentric with respect to the optical axis, and a direction connecting the optical axis with the centroid of the first opening when the first aperture member is inserted to the optical path intersect a direction connecting the optical axis with the centroid of the second opening when the second aperture member is inserted to the optical path.

In the sample shape measuring apparatus of the present embodiment, the illumination optical system includes the objective lens. Therefore, an aperture member is disposed in the illumination optical system.

The sample shape measuring apparatus of the present embodiment includes an aperture unit. The aperture unit includes a first aperture member 171, a second aperture member 172, and a moving mechanism 173.

The first aperture member 171 and the second aperture member 172 are both held at the moving mechanism 173. A slider or a turret is available as the moving mechanism 173, for example. When the moving mechanism 173 is a slider, the first aperture member 171 and the second aperture member 172 move in the direction orthogonal to the optical axis 174. When the moving mechanism 173 is a turret, the first aperture member 171 and the second aperture member 172 rotate around an axis parallel to the optical axis 174.

Figure 22A:
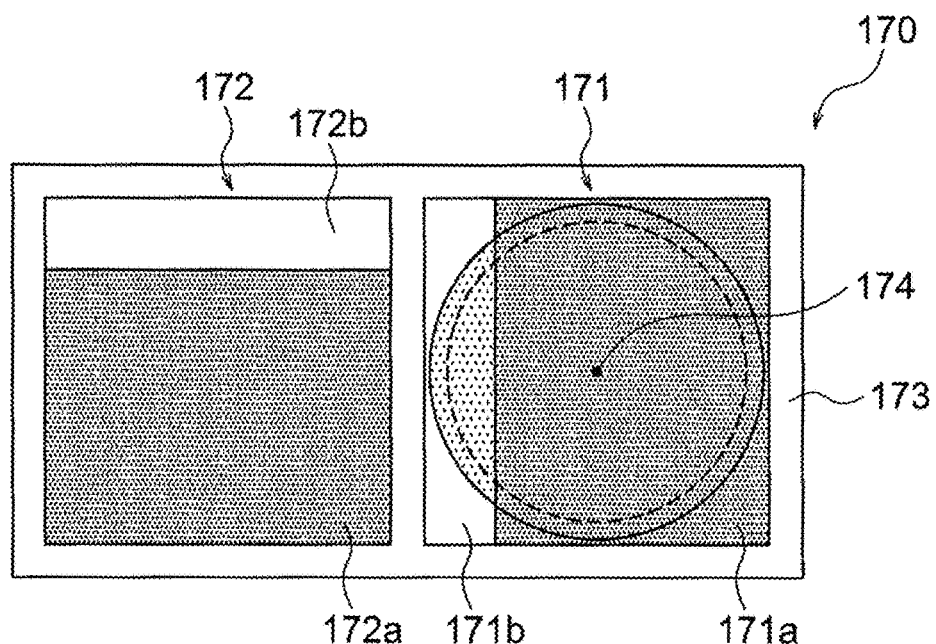
FIG. 22A is a diagram showing a state in which a first aperture member is inserted into an optical path.
Figure 22B:
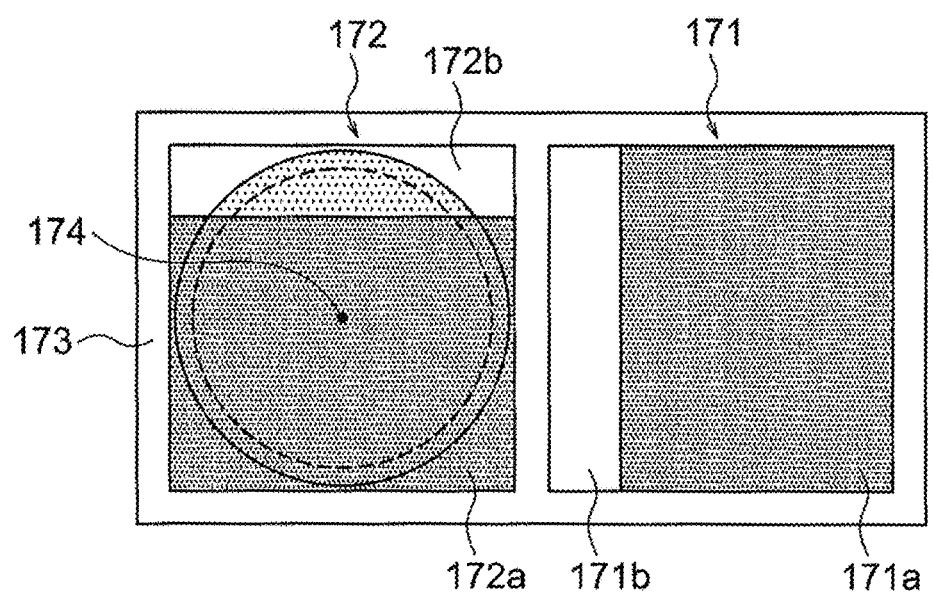
FIG. 22B is a diagram showing a state in which a second aperture member is inserted into the optical path.

FIG. 22A is a diagram showing a state in which the first aperture member is inserted to the optical path. FIG. 22B is a diagram showing a state in which the second aperture member is inserted to the optical path.

The first aperture member 171 includes a light-shielding part 171a and a first opening 171b. In the first aperture member 171, a portion including the optical axis 174 is the light-shielding part 171a. The first aperture member 171 has the first opening 171b at a position eccentric with respect to the optical axis 174.

The second aperture member 172 includes a light-shielding part 172a and a second opening 172b. In the second aperture member 172, a portion including the optical axis 174 is the light-shielding part 172a. The second aperture member 172 has the second opening 172b at a position eccentric with respect to the optical axis 174.

Then, the direction connecting the optical axis 174 with the centroid of the first opening 171b and the direction connecting the optical axis 174 with the centroid of the second opening 172b intersect when the first aperture member 171 is inserted to the optical path and when the second aperture member 172 is inserted to the optical path. In FIG. 22A and FIG. 22B, the first opening 171b is positioned on one of two straight lines orthogonal to each other, and the second opening 172b is positioned on the other straight line.

The area of the illumination light passing through the first opening 171b is equal to the area of the illumination light passing through the second opening 172b. Therefore, a state of change in brightness of an image when inclination angle is changed is the same when the first aperture member 71 is inserted to the optical path and when the second aperture member 72 is inserted to the optical path.

The spectral transmittance characteristic in the first opening 171b is equal to the spectral transmittance characteristic in the second opening 172b. In this case, measurement can be performed using one light source. The wavelength band of light emitted from the light source 51 may be either wide or narrow.

The spectral transmittance characteristic in the first opening 17b may be differentiated from the spectral transmittance characteristic in the second opening 172b. In this case, the measurement method includes a method in which measurement is performed without changing the wavelength of illumination light and a method in which measurement is performed by changing the wavelength of illumination light.

In the method in which measurement is performed without changing the wavelength of illumination light, a light source emitting light in a wide wavelength band is used as the light source. An example of the light source emitting light in a wide wavelength band is a white light source. Furthermore, a plurality of photoelectric conversion elements are used as the optical detection element. An example of the detection element including a plurality of photoelectric conversion elements is a three-CCD camera.

The three-CCD camera includes three CCDs. A red filter is disposed for the first CCD, a green filter is disposed for the second CCD, and a blue filter is disposed for the third CCD.

Then, for example, the spectral transmittance characteristic in the first opening 171b is matched with the spectral transmittance characteristic of the red filter, and the spectral transmittance characteristic in the second opening 172b is matched with the spectral transmittance characteristic of the green filter.

Then, in measurement, a white light source is disposed in the optical path, and measurement is performed with the first CCD when the first aperture member 171 is inserted to the optical path, whereas measurement is performed with the second CCD when the second aperture member 172 is inserted to the optical path.

In the method in which measurement is performed by changing the wavelength of illumination light, a plurality of light sources may be used or one light source may be used.

When a plurality of light sources are used, for example, a second light source is prepared in addition to a first light source. Then, the wavelength band of light emitted from the first light source is differentiated from the wavelength band of light emitted from the second light source. In addition, the spectral transmittance characteristic in the first opening 171b is matched with the wavelength band of light emitted from the first light source, and the spectral transmittance characteristic in the second opening 172b is matched with the wavelength band of light emitted from the second light source.

Then, in measurement, when the first aperture member 171 is inserted to the optical path, measurement is performed using the first light source, and when the second aperture member 172 is inserted to the optical path, measurement is performed using the second light source.

When one light source is used, a plurality of optical filters are prepared. For example, a first optical filter and a second optical filter are prepared. Furthermore, the spectral transmittance characteristic in the first opening 171b is matched with the spectral transmittance characteristic of the first optical filter, and the spectral transmittance characteristic in the second opening 172b is matched with the spectral transmittance characteristic of the second optical filter.

Then, in measurement, when the first aperture member 171 is inserted to the optical path, measurement is performed using the first optical filter, and when the second aperture member 172 is inserted to the optical path, measurement is performed using the second optical filter.

In the sample shape measuring apparatus, it is possible to detect change in quantity of light of the imaging light in any direction. Therefore, according to the sample shape measuring apparatus of the present embodiment, it is possible to obtain the direction of tilt and the amount of tilt in the surface of a sample.

In the sample shape measuring apparatus of the present embodiment, it is preferable that the illumination optical system include the objective lens, the optical member be an aperture member, in the aperture member, a portion including the optical axis of the objective lens be a light-shielding part, the aperture member have a first opening and a second opening at a position eccentric with respect to the optical axis, and a direction connecting the optical axis with the centroid of the first opening when the aperture member is inserted to the optical path intersect a direction connecting the optical axis with the centroid of the second opening.

In the sample shape measuring apparatus of the present embodiment, the illumination optical system includes the objective lens. Therefore, an aperture member is disposed in the illumination optical system.

Figure 23:
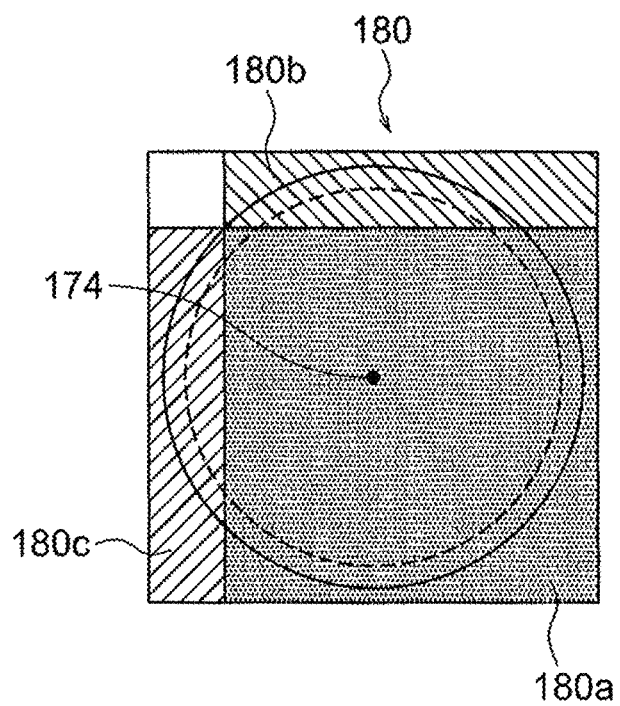
FIG. 23 is a diagram showing a state in which an aperture member is inserted into the optical path.

FIG. 23 is a diagram showing a state in which the aperture member is inserted to the optical path. An aperture member 180 has a light-shielding part 180a, a first opening 180b, and a second opening 180c. In the aperture member 180, a portion including the optical axis 174 is the light-shielding part 180a. The aperture member 180 has the first opening 180b and the second opening 180c at a position eccentric with respect to the optical axis 174.

Then, the direction connecting the optical axis 174 with the centroid of the first opening 180b intersects the direction connecting the optical axis 174 with the centroid of the second opening 180c. In FIG. 23, the first opening 180b is positioned on one of two straight lines orthogonal to each other and the second opening 180c is positioned on the other straight line.

The area of illumination light passing through the first opening 180b is equal to the area of the illumination light passing through the second opening 180c. Therefore, a state of change in area when the inclination angle is changed is the same when illumination light passes through the first opening 180b and when illumination light passes through the second opening 180c.

The spectral transmittance characteristic in the first opening 180b need to be differentiated from the spectral transmittance characteristic in the second opening 180c. By using a plurality of photoelectric conversion elements for the detection element or by changing the wavelength of the illumination light, it is possible to perform measurement with the aperture member 180 kept always disposed in the optical path.

In the sample shape measuring apparatus of the present embodiment, it is possible to detect change in quantity of light of the imaging light in any direction, without moving the aperture member. Therefore, according to the sample shape measuring apparatus of the present embodiment, it is possible to obtain the direction of tilt and the amount of tilt in the surface of the sample.

In the sample shape measuring apparatus of the present embodiment, it is preferable that the illumination optical system include the objective lens, the optical member be an aperture member, in the aperture member, a portion including the optical axis of the objective lens be a light-shielding part, the aperture member have an opening at a position eccentric with respect to the optical axis, and a direction connecting the optical axis with a centroid of the opening be changeable.

In the sample shape measuring apparatus of the present embodiment, the illumination optical system includes the objective lens. Therefore, an aperture member is disposed in the illumination optical system.

Figure 24:
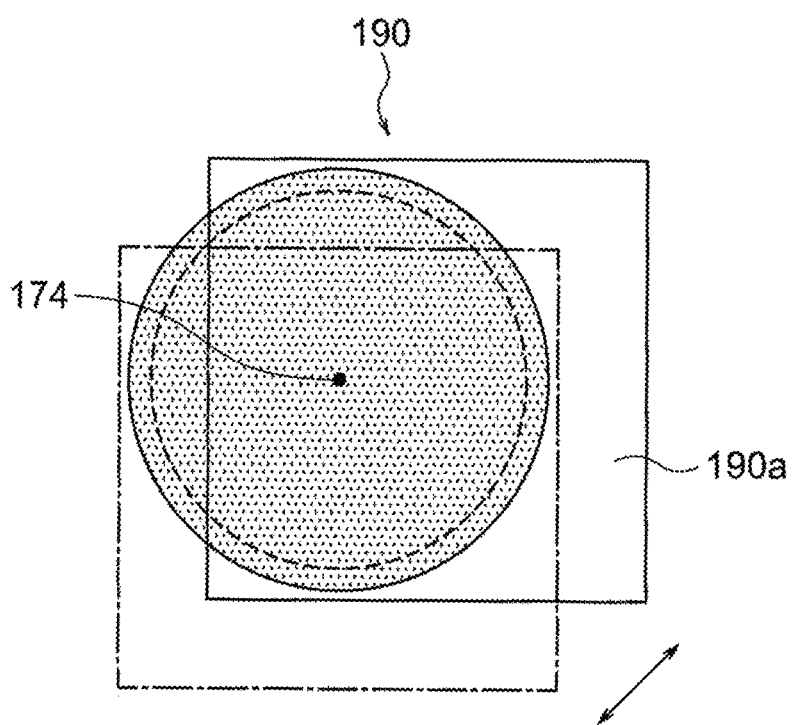
FIG. 24 is a diagram showing a state in which an aperture member is inserted into the optical path.

FIG. 24 is a diagram showing a state in which an aperture member is inserted to the optical path. An aperture member 190 has a light-shielding part 190a. In the aperture member 190, a portion including the optical axis 174 of the objective lens is the light-shielding part 190a. The aperture member 190 has an opening at a position eccentric with respect to the optical axis 174.

In the sample shape measuring apparatus of the present embodiment, the aperture member 190 is movable from the position shown by the solid line to the position shown by the dashed and single-dotted line. That is, the direction connecting the optical axis with the opening centroid is changeable.

By moving the aperture member 190 to the position shown by the solid line, it is possible to achieve the same state as in FIG. 22A. Furthermore, by moving the aperture member 190 to the position shown by the dashed and single-dotted line, it is possible to achieve the same state as in FIG. 22B.

In the sample shape measuring apparatus of the present embodiment, it is possible to detect change in quantity of light of the imaging light in any direction. Therefore, according to the sample shape measuring apparatus of the present embodiment, it is possible to obtain the direction of tilt and the amount of tilt in the surface of the sample.

In the sample shape measuring apparatus of the present embodiment, it is preferable that the illumination optical system include an objective lens, the optical member be a aperture member which has a light-shielding part, and at least one of a size of the light-shielding part and a numerical aperture on a sample side of the objective lens be variable.

Figure 25A:
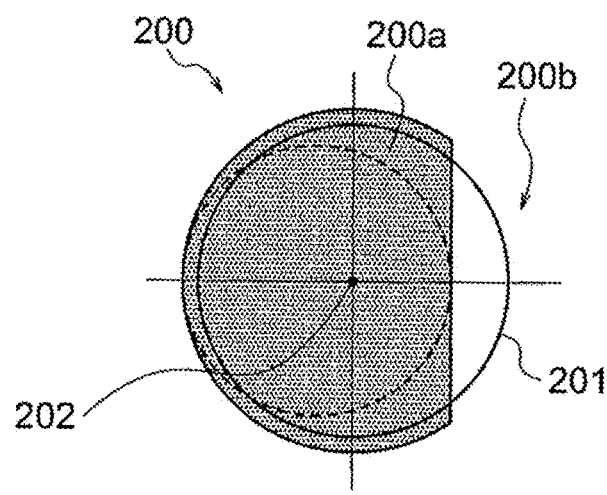
FIG. 25A is a diagram showing a state in which a quantity of light is zero.

As mentioned above, in the sample shape measuring apparatus of the present embodiment, the quantity of light detected by the light detection element varies according to the amount of tilt at the surface of the sample. FIG. 25A is a diagram showing a state when the quantity of light is zero. In FIG. 25A, the overall imaging light is indicated by a circle of dashed line. A light-shielding part 200a is positioned so as to include an optical axis 202.

In this state, as shown in FIG. 25A, the whole of the imaging light is shielded at the light-shielding part 200a. Consequently, in this case, since there is no light flux that passes through a pupil 201 of the objective lens, it is not possible to measure the amount of tilt.

In order to enable to further measure of the amount of tilt, it is necessary that a state in which imaging light is emerged from the aperture member 200.

Figure 25B:
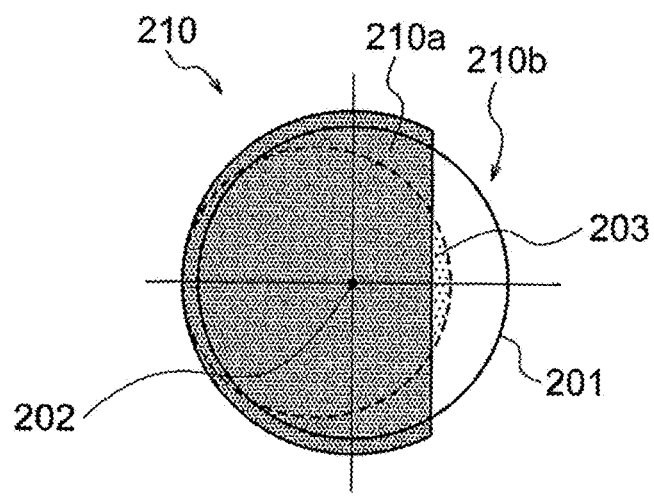
FIG. 25B is a diagram showing displacement of the image of an aperture member relative to the pupil of the objective lens.

As a method for realizing the state in which imaging light emerges from the aperture member 200, a method of changing the size of the light-shielding part 200a or the size of the transmission part 200b is available. For changing the size of the light-shielding part 200a or the size of the transmission part 200b, the aperture member 200 may be replaced. FIG. 25B is a diagram illustrating a state in which the aperture member is replaced.

An aperture member 210 has a light-shielding part 210a and a transmission part 210b. A size of the light-shielding part 210a is smaller than a size of the light-shielding part 200a. In other words, a size of the transmission part 210b is larger than a size of the transmission part 200b.

Then, the aperture member 200 is to be replaced with the aperture member 210, without replacing the objective lens. By making such arrangement, imaging light 203 reaches the transmission part 210b. In other words, a state in which imaging light 203 emerges from the aperture member 210 is realized. As a result, it is possible to widen a range in which the amount of tilt can be measured.

The aperture member 200 is disposed at the pupil position of the objective lens. In a case in which the pupil of the objective lens is positioned at the interior of the objective lens, the aperture member 200 is also disposed at the interior of the objective lens. Even in such state, the replacement may be carried out when it is possible to replace the aperture member 200 with the aperture member 210. In a case in which it is difficult to replace the aperture member 200 with the aperture member 210, the replacement of the aperture member 200 and the aperture member 210 may be carried out at the position of the conjugate image of the pupil of the objective lens.

Figure 25C:
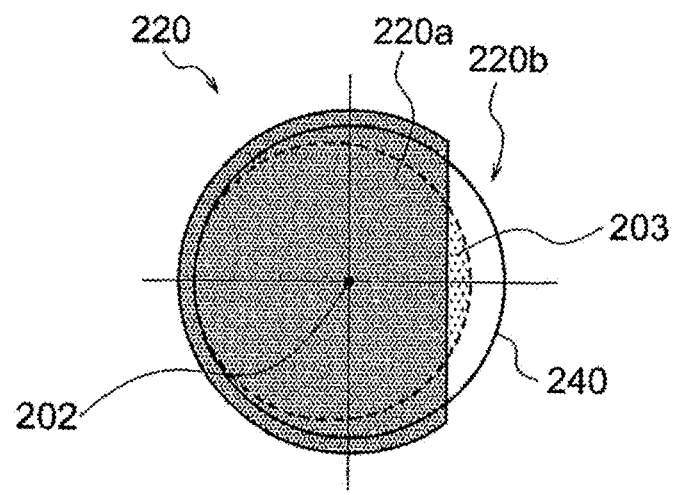
FIG. 25C is a diagram showing a state of a light flux passing through the pupil of the objective lens.

Another method for realizing the state in which imaging light 203 emerges from the aperture member 200, a method of changing the numerical aperture on the sample side of the objective lens is available. For changing the numerical aperture on the sample side of the objective lens, the objective lens may be replaced. FIG. 25C is a diagram illustrating a state in which the objective lens is replaced.

Let an objective lens A to be the objective lens having the aperture member 200, and an objective lens B to be an objective lens having an aperture member 220. The numerical aperture on the sample side differs for the objective lens A and the objective lens B.

The aperture member 220 has a light-shielding part 220a and a transmission part 220b. A size of the light-shielding part 220a differs from a size of the light-shielding part 200a. In other words, a size of the transmission part 220b differs from a size of the transmission part 200b.

As mentioned above, the numerical aperture on the sample side differs for the objective lens A and the objective lens B. Consequently, a diameter of a pupil 201 of the objective lens A differs from a diameter of the pupil 240 of the objective lens B. Moreover, a size of the imaging light at a pupil position of the objective lens also differs for the objective lens A and the objective lens B.

Therefore, by replacing the objective lens A with the objective lens B, imaging light 203 reaches the transmission part 220b. In other words, a state in which imaging light 203 emerges from the aperture member 220 is realized. As a result, it is possible to widen a range in which the amount of tilt can be measured.

In the sample shape measuring apparatus of the present embodiment, it is preferable that a change in a numerical aperture on a sample side of the objective lens be carried out by switching a plurality of objective lenses.

By making such arrangement, it is possible to measure samples having various amounts of tilt. As the plurality of objective lenses, objective lenses with same magnification but different numerical aperture on sample side are available. When such plurality of objective lenses is used, by switching the objective lens, it is possible to change a range of measurement and a sensitivity of measurement without changing the magnification.

In the sample shape measuring apparatus of the embodiment, it is preferable that the optical element which changes alight flux diameter be disposed between the light source and the scanning unit.

Figure 26:
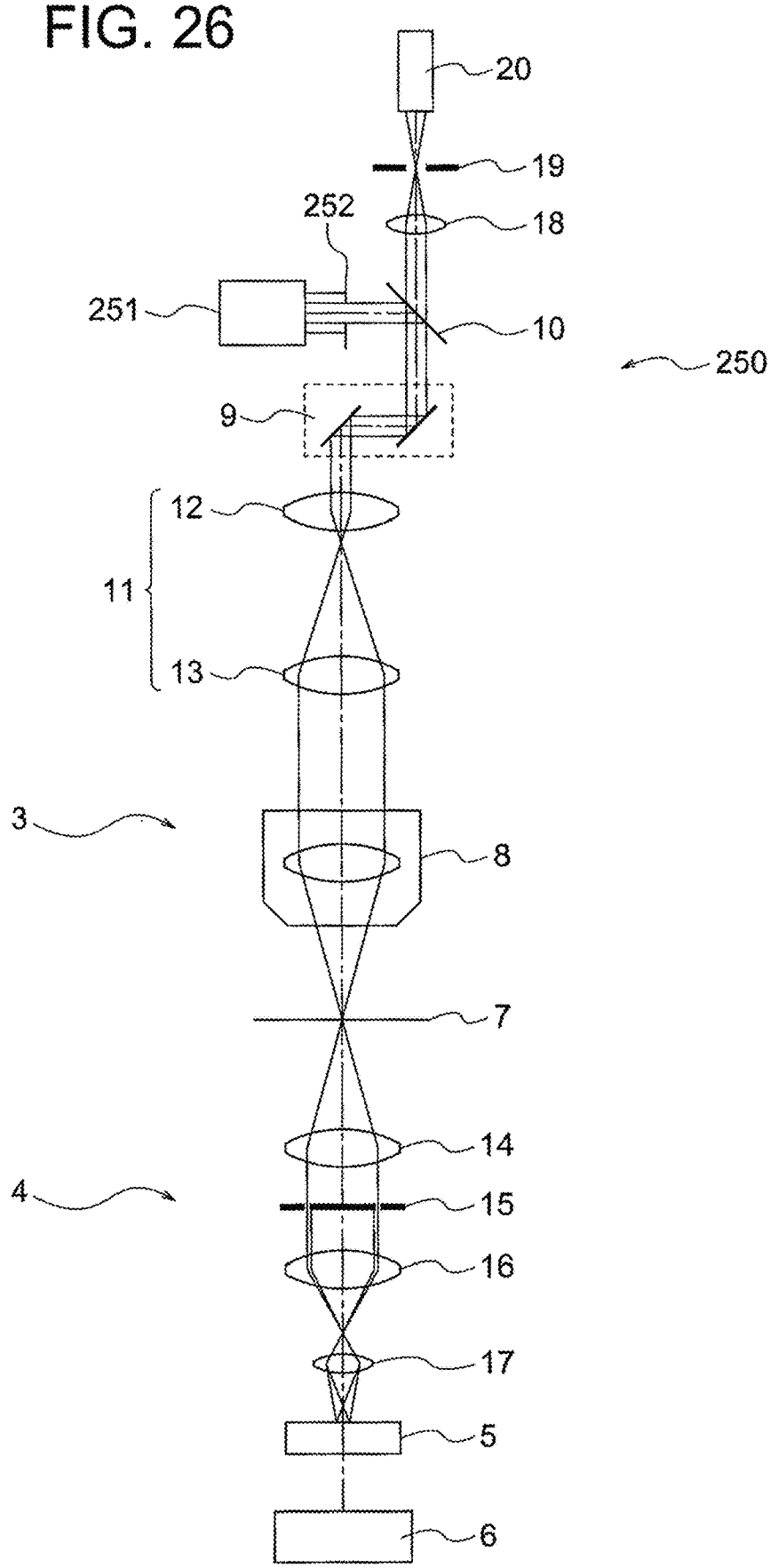
FIG. 26 is a diagram showing another sample shape measuring apparatus of the present embodiment.

Another sample shape measuring apparatus of the present embodiment will be described. FIG. 26 is a diagram showing another sample observation apparatus of the present embodiment. The same reference numerals are assigned to the same configurations as those in FIG. 1, and their detailed descriptions are omitted.

A sample shape measuring apparatus 250 includes a light source unit 251 and a light flux diameter changing member 252. In the sample shape measuring apparatus 250, the detection optical system 4 includes the optical member 15. The optical member 15 is an aperture member including a light-shielding part or a darkening part, and a transmission part.

In the sample shape measuring apparatus 250, an image of an outer edge of the pupil of the illumination optical system is formed between the inner edge of the transmission part and the outer edge of the transmission part. Accordingly, it is possible to convert change in shape at the sample into change in displacement of the image of the pupil of the illumination optical system.

The illumination light passes through the pupil of the illumination optical system. In the following explanation, the outer edge of the pupil of the illumination optical system is replaced with an outer edge of the illumination light flux. To convert change in shape at the sample into change in displacement of the image of the pupil of the illumination optical system, an image of the outer edge of the illumination light flux may be formed between the inner edge of the transmission part and the outer edge of the transmission part.

In the sample shape measuring apparatus 250, a microscope optical system is used. For this reason, a dry-type microscope objective lens or an immersion-type microscope objective lens is used as the objective lens 8. A state in which a dry-type microscope objective lens is used is referred to as first state, and a state in which an immersion-type microscope objective lens is used is referred to as second state.

In the first state, suppose that the image of the outer edge of the illumination light flux is formed between the inner edge of the transmission part and the outer edge of the transmission part. When the first state is changed to the second state, the objective lens 8 is changed from the dry-type microscope objective lens to the immersion-type microscope objective lens.

Generally, the numerical aperture of the immersion-type microscope objective lens is larger than the numerical aperture of the dry-type microscope objective lens. For this reason, when diameter of the illumination light flux emitted from the light source unit 251 is maintained at the light flux diameter in the first state, the image of the outer edge of the illumination light flux is not formed between the inner edge of the transmission part and the outer edge of the transmission part in the second state. As a result, in the second state, it is difficult to convert change in shape at the sample to change in displacement of the image of the pupil of the illumination optical system.

In the sample shape measuring apparatus 250, it is possible to insert the light flux diameter changing member 252 into the optical path, in the optical path between the light source unit 251 and the light flux separation unit 10. The light flux diameter changing member 252 includes an opening. The size of the opening is set smaller than the diameter of the illumination light flux emitted from the light source unit 251 in the first state.

With change from the first state to the second state, the light flux diameter changing member 252 is inserted into the optical path. In this manner, it is possible to set the diameter of the illumination light flux emitted from the light source unit 251 smaller than the diameter of the illumination light flux in the first state. In this manner, also in the second state, the image of the outer edge of the illumination light flux is formed between the inner edge of the transmission part and the outer edge of the transmission part. As a result, also in the second state, it is possible to convert change in shape at the sample into change in displacement of the image of the pupil of the illumination optical system.

The explanation described above has been made for the case where the objective lens 8 is changed from the dry-type microscope objective lens to the immersion-type microscope objective lens, but the structure is not limited thereto. It suffices that the diameter of the illumination light flux emitted from the light source unit 251 is changed in accordance with change of the number of apertures of the illumination optical system. In addition, it suffices that the diameter of the illumination light flux emitted from the light source unit 251 is changed in accordance with change of the number of apertures of the detection optical system.

In the sample shape measuring apparatus of the present embodiment, it is preferable that in a step of calculating of the amount of tilt, the amount of tilt be calculated based on a correspondence relation obtained in advance.

As mentioned above, in the sample shape measuring method of the present embodiment, the amount of tilt is calculated based on the quantity of light of the imaging light. Then, the relationship of the quantity of light of the imaging light and the amount of tilt is to be obtained in advance. By doing so, it is possible to calculate the amount of tilt promptly from the quantity of light of the imaging light that is obtained, based on the correspondence relation.

In the sample shape measuring apparatus of the present embodiment, it is preferable that the correspondence relation be represented by a lookup table including the quantity of light and the amount of tilt as parameters.

FIG. 27 is an example of the lookup table. As shown in FIG. 27, the lookup table has brightness and the angle of inclination as parameters. The brightness indicates the quantity of light of the imaging light and the angle of inclination indicates the amount of tilt in the surface of a sample.

For creating the lookup table, a refractive index of the sample is necessary. In a case in which the sample is a cell, various substances exist in the cell. Therefore, the refractive index of the cell as a whole is a refractive index obtained by averaging the refractive indices of these substances (hereinafter referred to as "average refractive index $n_{AVE}$ of a cell"). The average refractive index $n_{AVE}$ of a cell varies depending on the kinds of substances existing in the cell. Therefore, a value of the average refractive index $n_{AVE}$ of a cell is not restricted to one value.

Moreover, for example, in a case in which the sample is a cell, culture liquid or preservative solution may be present around the cell. Therefore, for creating the lookup table, a refractive index of the culture liquid or a refractive index of the preservative solution become necessary.

The lookup table shown in FIG. 27 is a lookup table in a case where the sample is a cell. In this lookup table, the table is created by setting the refractive index of the culture liquid or the refractive index of the preservative solution as 1.33. Moreover, three refractive indices (1.34, 1.35, and 1.36) are assumed for the average refractive index $n_{AVE}$ of the cell, and results obtained from the refractive indices are summarized in one table.

In step S33, the difference or the ratio between the quantity of light of the imaging light and the reference quantity of light is calculated. The calculated value represents the quantity of light of the imaging light. Then, the brightness in the lookup table is searched for the value matching the calculated value. If the value matching the calculated value is found, the inclination angle corresponding to the found value is obtained from the lookup table. Thus, it is possible to quickly obtain the amount of tilt in the surface of the sample.

On the other hand, the value matching the calculated value may not exist in the lookup table. In this case, two values closest to the calculated value are extracted from among the brightness in the lookup table. Then, the inclination angle is obtained using the extracted two values. Thus, it is possible to obtain the amount of tilt in the surface of the sample.

In the sample shape measuring apparatus of the present embodiment, it is preferable that the correspondence relation be represented by an expression including the quantity of light and the amount of tilt as parameters.

The area S of the imaging light transmitted through the objective lens and the inclination angle $\theta_s$ are represented by expressions. The area S represents the quantity of light of the imaging light, and the inclination angle $\theta_s$ represents amount of tilt in the surface of the sample.

In step S33, the difference or the ratio between the quantity of light of the imaging light and the reference quantity of light is calculated. The calculated value represents the quantity of light of the imaging light. Then, the inclination angle $\theta_s$ is obtained by substituting the calculated value into the area S. By doing this, it is possible to obtain the amount of tilt in the surface of the sample.

In the sample shape measuring apparatus of the present embodiment, it is preferable that the illumination light be applied to the sample by light of a first wavelength band and light of a second wavelength band, and the first wavelength band includes at least a wavelength band different from the second wavelength band.

Figure 28:
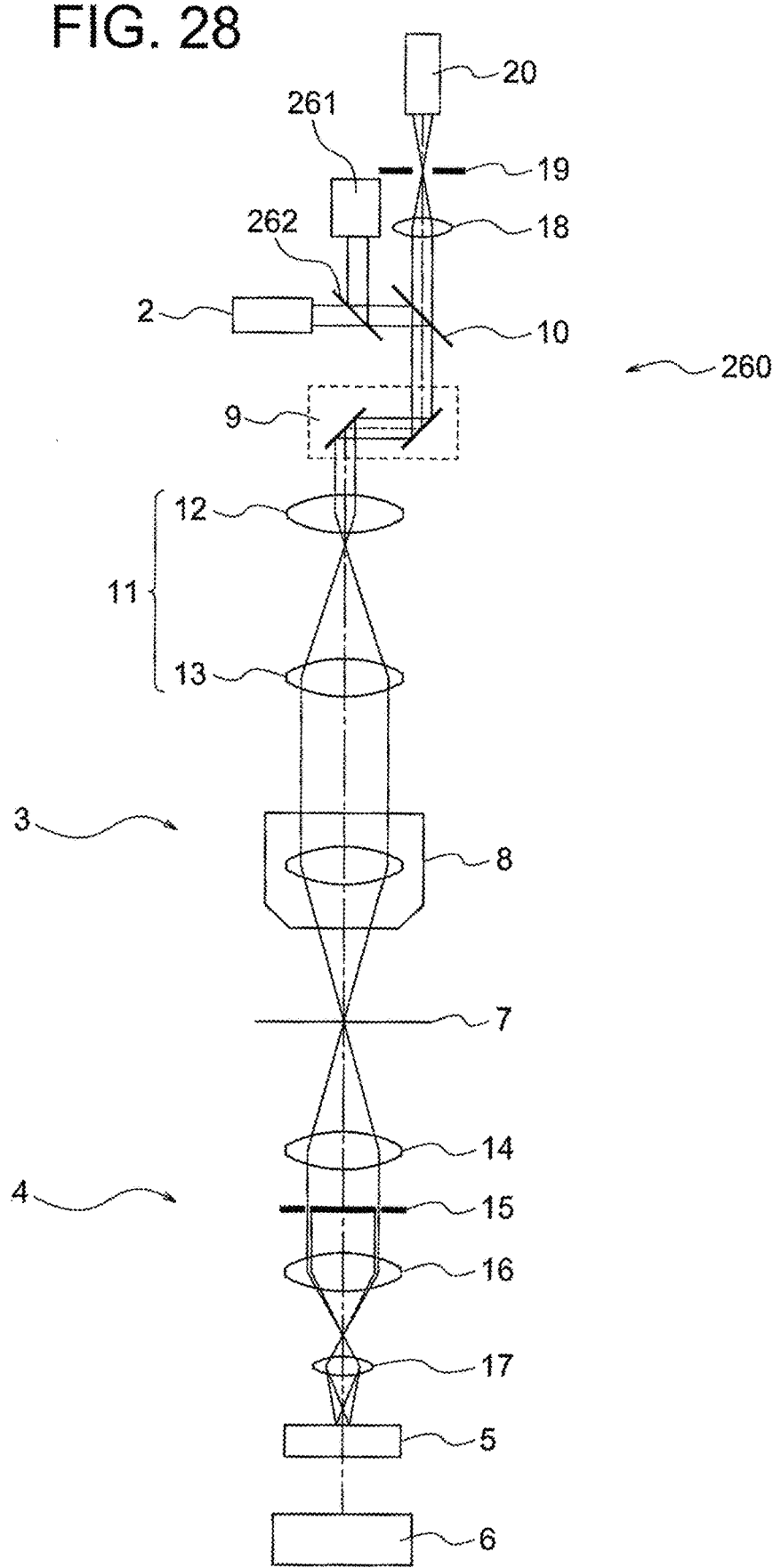
FIG. 28 is a diagram showing another sample shape measuring apparatus of the present embodiment.

Another sample shape measuring apparatus of the present embodiment is shown in FIG. 28. A sample shape measuring apparatus 260 includes a second light source 261, a light-ray separating unit 262, and an optical filter 263. Light of a first wavelength band is emitted from the light source 2 and light of a second wavelength band is emitted from the second light source 261.

The first wavelength band includes at least a wavelength band different from the second wavelength band. The light emitted from the second light source 261 is reflected by the light-ray separating unit 262. Accordingly, the light emitted from the second light source 261 travels along an optical path same as of light emitted from the light source 2.

As a result, it is possible to apply the illumination light to the sample by the light of the first wavelength band and the light of the second wavelength band. Detection of the light of the first wavelength band and detection of the light of the second wavelength band may be carried out by the optical filter 263. For instance, at a time of carrying out detection by the light of the first wavelength band, the optical filter 263 is inserted into an optical path.

Figure 29A:
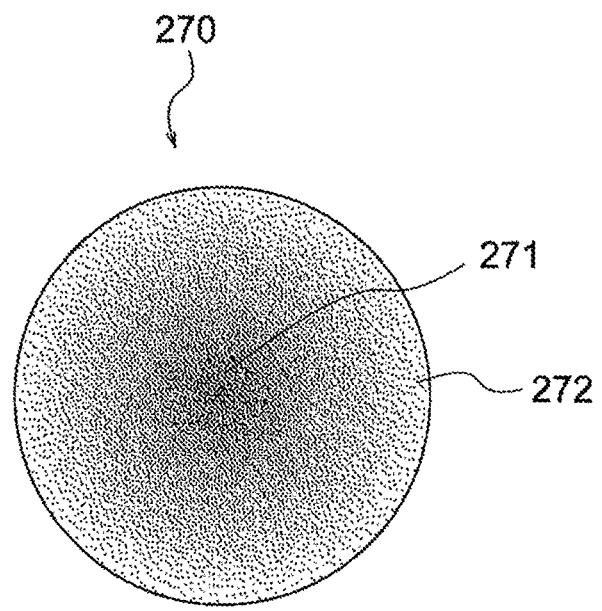
FIG. 29A is a diagram showing intensity distribution of illumination light.
Figure 29B:
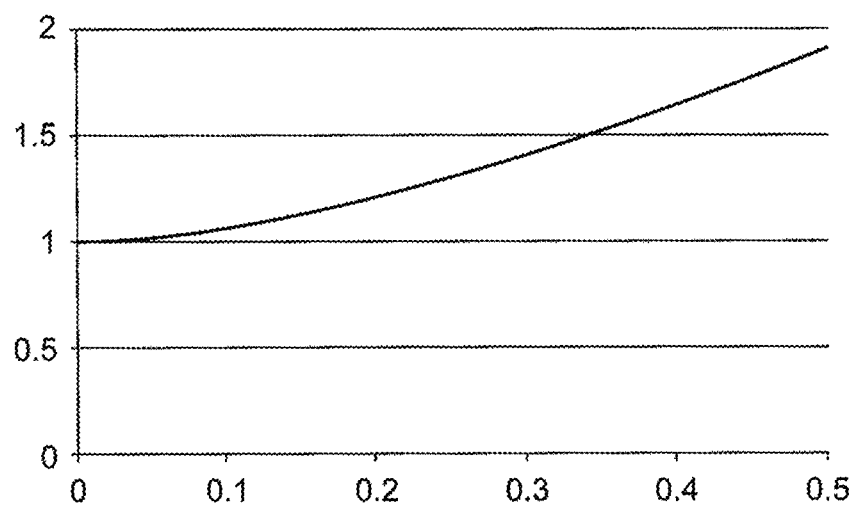
FIG. 29B is a graph showing the intensity distribution of the illumination light.

FIG. 29A is a diagram showing intensity distribution of the illumination light. FIG. 29B is a graph showing the intensity distribution of the illumination light.

Illumination light 270 is illumination light of which a light intensity is distributed unevenly. Immediately before being incident on an aperture member, a shape of the illumination light 270 is circular.

In the illumination light 270, the light intensity differs between center 271 of the light flux and periphery 272 of the light flux. The light intensity in the center 271 is smaller than the light intensity in the periphery 272. In addition, the light intensity increases from the center 271 toward the periphery 272.

In another sample shape measuring apparatus of the present embodiment, an aperture member is disposed both of the illumination optical system and the detection optical system. Here, in the illumination optical system, the illumination-side aperture member is disposed, and in the detection optical system, the detection-side aperture member is disposed. Then, the illumination-side aperture member and the detection-side aperture member each have a plurality of transmission parts.

Figure 30A:
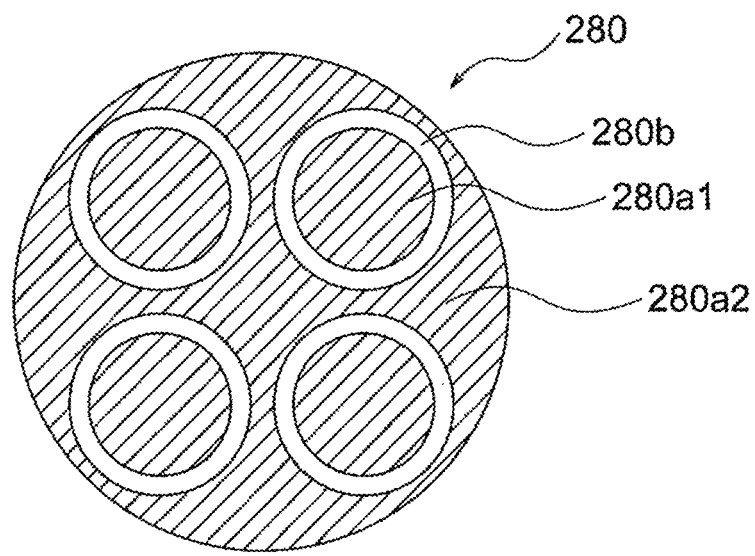
FIG. 30A is a diagram showing an illumination-side aperture member.
Figure 30B:
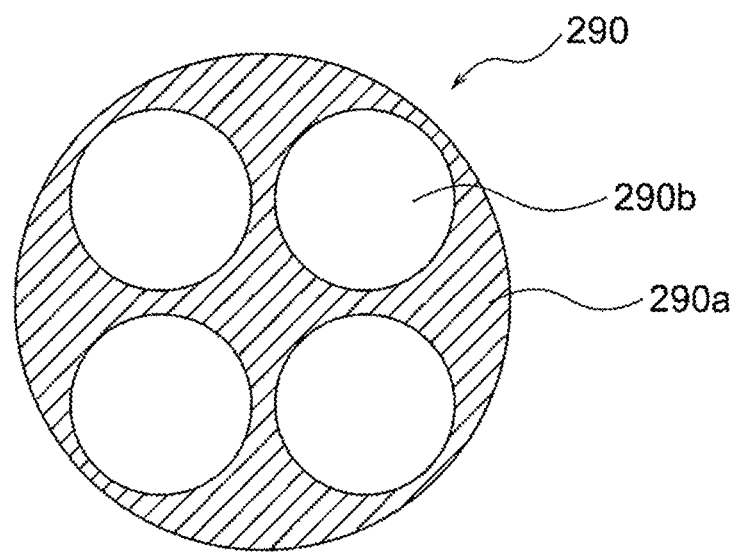
FIG. 30B is a diagram showing a detection-side aperture member.

FIG. 30A is a diagram showing the illumination-side aperture member and FIG. 30B is a diagram showing the detection-side aperture member. As shown in FIG. 30A, the illumination-side aperture member 280 includes a light-shielding part 280a1 and a transmission part 280b. Further, the aperture member 280 includes a light-shielding part 280a2.

The light-shielding parts 280a1, 280a2 and the transmission part 280b are formed from a transparent member, such as a glass plate or a resin plate. The light-shielding parts 280a1 and 280a2 are formed by applying light-shielding paint on a glass plate, for example. On the other hand, nothing is applied to the transmission part 280b. That is, the transmission part 280b is a glass plate as it is.

A shape of the light-shielding part 280a1 is a circle. Meanwhile, a shape of the transmission part 280b is band-shaped, specifically is an annulus.

In the illumination-side aperture member 280, a plurality of the light-shielding parts 280a1 are formed. Therefore, a plurality of the transmission parts 280b are also formed. Specifically, four transmission parts 280b are formed. Then, the four transmission parts 280b are disposed two-dimensionally. The illumination-side aperture member 280 is disposed at the position of the aperture member.

Meanwhile, as shown in FIG. 30B, the detection-side aperture member 290 includes a light-shielding part 290a and a transmission part 290b. The light-shielding part 290a and the transmission part 290b are formed from a transparent member, such as a glass plate or a resin plate.

The light-shielding parts 290a is formed by applying light-shielding paint on a glass plate, for example. On the other hand, nothing is applied to the transmission part 290b. That is, the transmission part 290b is a glass plate as it is.

An outer shape of the transmission part 290b and an outer shape of the transmission part 280b are similar. Specifically, since the outer shape of the transmission part 280b is a circle, the outer shape of the transmission part 290b also is a circle.

In the detection-side aperture member 290, a plurality of the transmission parts 290b are formed. Specifically, four transmission parts 290b are formed. Then, the four transmission parts 290b are disposed two-dimensionally. The detection-side aperture member 290 is disposed at the position of the pupil of the pupil projection lens.

Moreover, one transmission part 280b is paired with one transmission part 290b. Then, a pair of the transmission part 280b and the transmission part 290b is disposed so that their centers are made to be conjugate.

For instance, the right upper transmission part 280b of the illumination-side aperture member 280 is paired with the left lower transmission part 290b of the detection-side aperture member 290. Moreover, when an image of the right upper transmission part 280b is formed at the position of the left lower transmission part 290b, the center of the left lower transmission part 290b and the image of the right upper transmission part 280b coincide with each other.

Moreover, the image of the inner edge of the transmission part 280b is formed inner side of the outer edge of the transmission part 290b, and the image of the outer edge of the transmission part 280b is formed outer side of the outer edge of the transmission part 290b. Therefore, in the case of using the transmission part 280b and the transmission part 290b as a pair, the advantageous effects described above can be also obtained.

According to the sample shape measuring apparatus of the present embodiment, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

Further, in the sample shape measuring apparatus of the present embodiment, not only light passing through the periphery of the pupil of the objective lens but also light passing through the center of the pupil of the objective lens can contribute to imaging. Therefore, it is possible to obtain a brighter shadow image.

Figure 31:
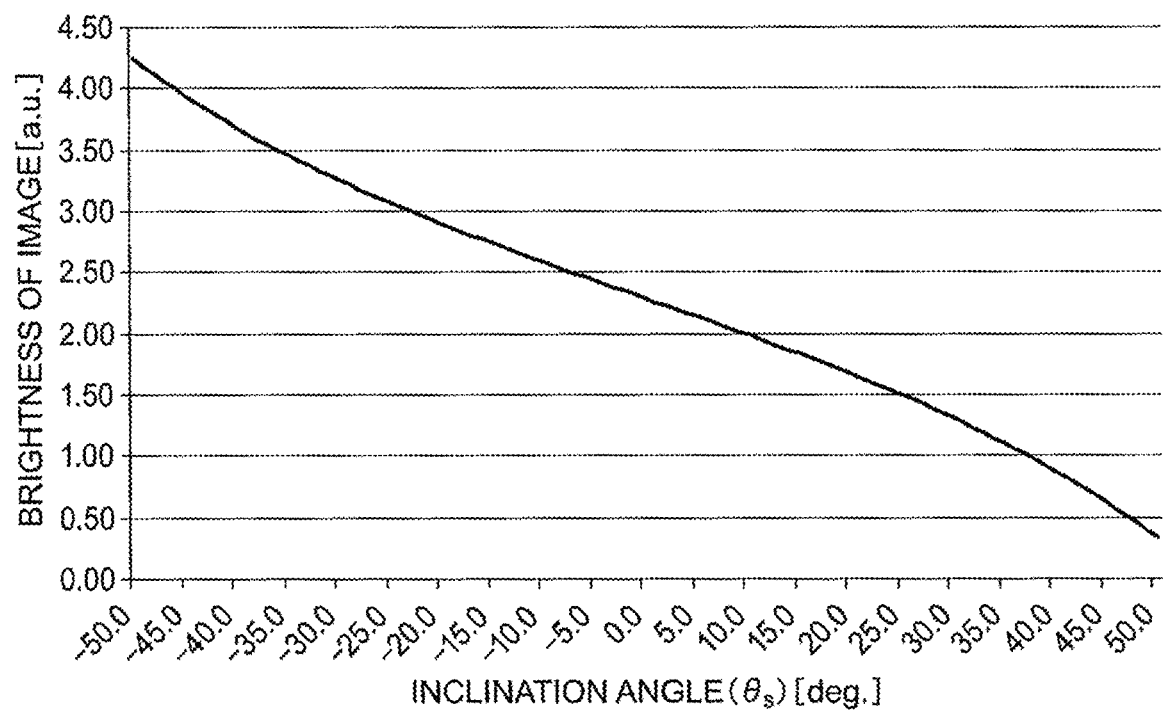
FIG. 31 is a graph indicating relationship of an angle of tilt $\theta_s$ and an area S.

As described above, the area S of the imaging light transmitted through the objective lens and the inclination angle $\theta_s$ are represented by expressions. The graph representing the relation between the inclination angle $\theta_s$ and the area S is shown in FIG. 31. The imaging light emerged from the objective lens is collected, for example, by an imaging lens. At the light-collecting position, an image of the sample is formed. When the area S of the imaging light emerged from the objective lens changes, the brightness of the image of the sample changes. Furthermore, when the inclination angle $\theta_s$ changes, the tilt angle of the surface of the sample relative to the optical axis changes. Then, in the graph shown in FIG. 31, the tilt angle is replaced by the inclination angle $\theta_s$ and the brightness of the image is replaced by the area S to show the relation between the tilt angle and the brightness of the image.

Furthermore, the values of the parameters are as follows.
n'=1.33,
n=1.35,
f=18 [mm],
$\theta_{NA}$=9.2 [deg.] (NA=0.16),
$\theta_{min}$=6.5 [deg.]

As can be understood from the curve representing the relation between the inclination angle $\theta_s$ and the area S (hereinafter referred to as "characteristic curve"), as the value of the inclination angle $\theta_s$ increases, the brightness of the image decreases monotonously. In this way, the brightness of the image and the inclination angle $\theta_s$ are in one-to-one correspondence.

Then, illumination light deflected in a certain direction is applied to a sample, and a two-dimensional image of the sample is obtained. Then, information of the quantity of light (brightness) is obtained for each pixel of the obtained two-dimensional image. Here, the refractive index (average refractive index) n of the sample, the refractive index n' of the immersion liquid, the focal length f of the objective lens, the numerical aperture $\theta_{NA}$ on the sample side of the objective lens, and the angle $\theta_{min}$ are known. Therefore, they can be used to derive the inclination angle $\theta_s$ for each pixel. That is, it is possible to derive the distribution of the amount of tilt in the surface of the sample.

The sample shape measuring apparatus of the present embodiment has a sample shape measuring method. The sample shape measuring method will be described. Here, suppose that the illumination optical system includes the objective lens and optical member. The aperture member is disposed in an optical path of the illumination optical system. Even in a case in which the aperture member is disposed in an optical path of the detection optical system, it is possible to use the sample shape measuring method.

Figure 32:
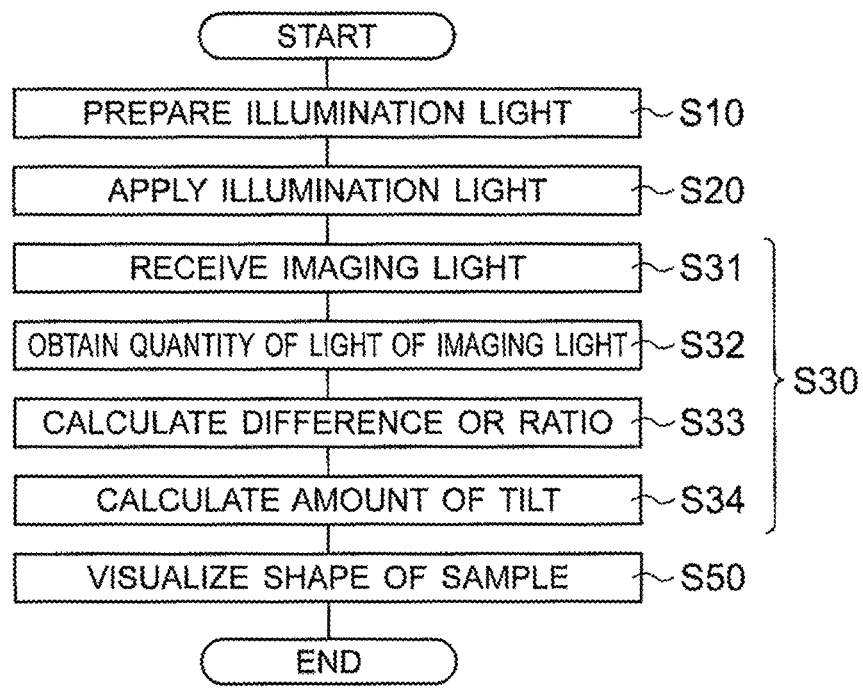
FIG. 32 is a flowchart of a sample shape measuring method.

FIG. 32 is a flowchart of a sample shape measuring method. The sample shape measuring method includes step S10 of preparing illumination light, step S20 of applying the illumination light, and predetermined processing step S30. The predetermined processing step S30 includes step S31 of receiving imaging light, step S32 of obtaining the quantity of light of the imaging light, step S33 of calculating the difference or the ratio, step S34 of calculating the amount of tilt, and S50 of visualizing the shape of the sample.

In the sample shape measuring t method, first of all, step S10 is executed. Step S10 is a step of preparing illumination light. In step S10, a predetermined illumination region is set in the illumination optical system. The predetermined illumination region is a region where illumination light passes through. The predetermined illumination region is set by disposing the optical member in the optical path of the illumination optical system. Here, the optical member is disposed so as to include the optical axis and to shield part of light flux of illumination light.

Furthermore, the optical member is disposed at the pupil position of the illumination optical system, specifically, the pupil position of the condenser lens. The position of the pupil of the condenser lens is conjugate to the pupil position of the detection optical system, specifically, the position of the pupil of the objective lens. Therefore, an image of the predetermined illumination region is formed at the position of the pupil of the objective lens. Here, the image of the predetermined illumination region is formed so as to be distributed in both the inner side and the outer side of the pupil of the objective lens.

In this way, the predetermined illumination region is set at the pupil position of the illumination optical system so as not to include the optical axis and is set such that the illumination light passing through the predetermined illumination region is applied to part of the inner side of the pupil and the outer side of the pupil at the pupil position of the observation optical system.

When step S10 is finished, step S20 is executed. Step S20 is a step of applying illumination light. In step S20, illumination light is applied to a sample. Here, oblique illumination light is applied to a sample. That is, illumination light is applied to a sample such that light flux intersects the optical axis at the sample position, and is transmitted through the sample. The sample is illuminated whereby imaging light is transmitted through the sample. The light transmitted through the sample is incident on the observation optical system.

When step S20 is finished, step S30 is executed. Step S30 is a step of performing predetermined processing. In step S30, step S31, step S32, step S33, and step S34 are executed.

In step S30, first, step S31 is executed. Step S31 is a step of receiving imaging light. The imaging light is the light emerged from the observation optical system.

When step S31 is finished, step S32 is executed. Step S32 is a step of obtaining the quantity of light of the imaging light. The quantity of light of the imaging light is the quantity of light received in step S31.

When step S32 is finished, step S33 is executed. Step S33 is a step of calculating the difference or the ratio. In step S33, the difference or the ratio between the quantity of light received in step S31, that is, the quantity of light of the imaging light and a reference quantity of light is calculated.

When step S33 is finished, step S34 is executed. Step S34 is a step of calculating the amount of tilt. In step S34, the amount of tilt in the surface of the sample is calculated from the result of calculation in step S33.

As step S34 is finished, step S50 is executed. At step S50, a shape of a sample 7 is calculated from the amount of tilt. The shape of the sample 7 is visualized from the calculated shape. By doing so, it is possible to visually grasp the shape of the sample. Step S30 may include step S50.

Furthermore, in the sample shape measuring method of the present embodiment, it is preferable that the reference quantity of light be a quantity of light in a state in which no sample is present.

When the same sample is illuminated with illumination light with different quantities of light, the quantity of light of the imaging light also varies. Thus, if the amount of tilt is calculated using the quantity of light of the imaging light alone, the surface shape changes with the quantity of light of the illumination light even though the sample is the same. Then, in the sample shape measuring method of the present embodiment, the difference or the ratio between the quantity of light of the imaging light and the reference quantity of light is calculated. By doing this, it is possible to precisely obtain the surface shape of the sample even when the quantity of light of the illumination light changes.

Since a reference quantity of light is the quantity of light in a state in which no sample is present, the reference quantity of light is the quantity of light of the illumination light. Therefore, by calculating the difference or the ratio to the quantity of light of the imaging light using the reference quantity of light, it is possible to precisely obtain the surface shape of the sample even when the quantity of light of the illumination light changes.

Figure 33:
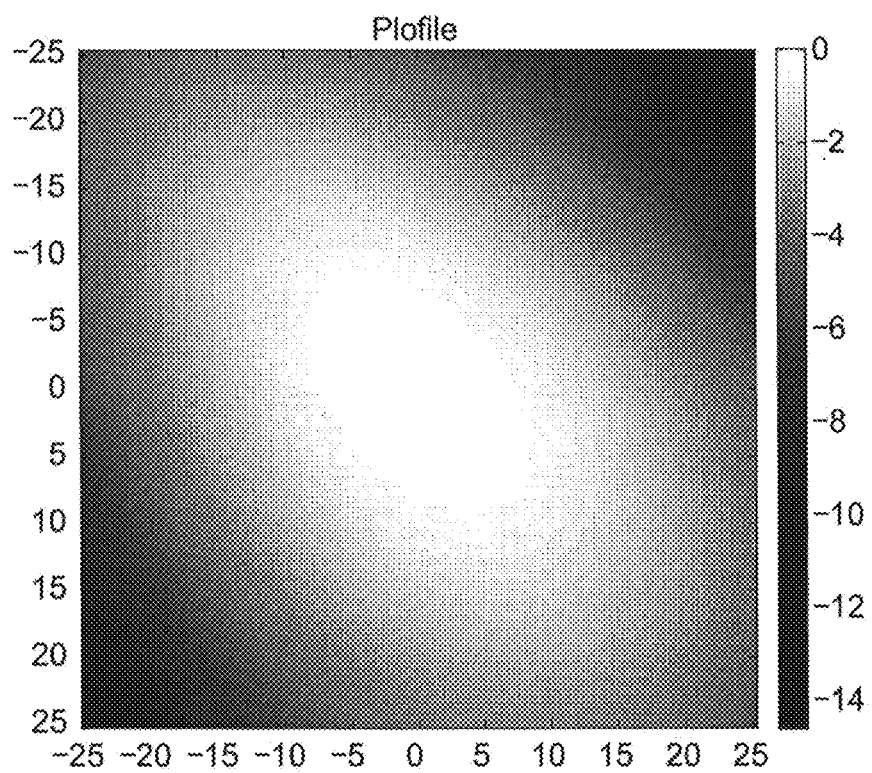
FIG. 33 is a diagram showing a distribution of a height in a virtual sample.

An example of simulation will now be illustrated. FIG. 33 is a diagram showing the distribution of height in a virtual sample. In the virtual sample, the central portion is highest and the height decreases toward the periphery.

Figure 34A:
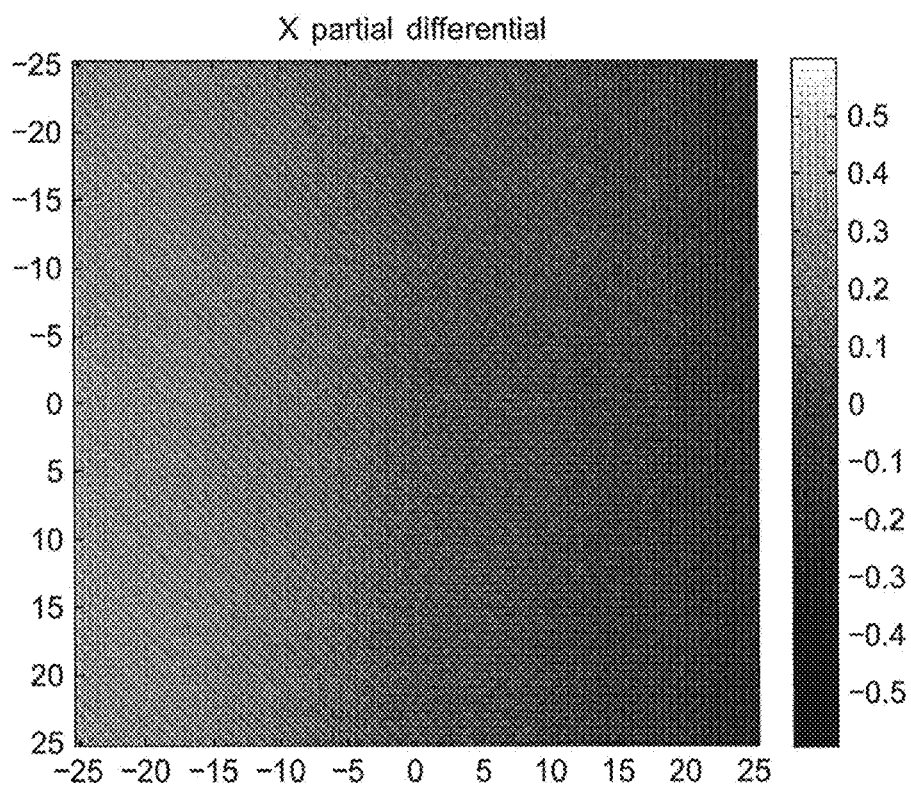
FIG. 34A is a diagram showing a distribution of an inclination angle at a first position.
Figure 34B:
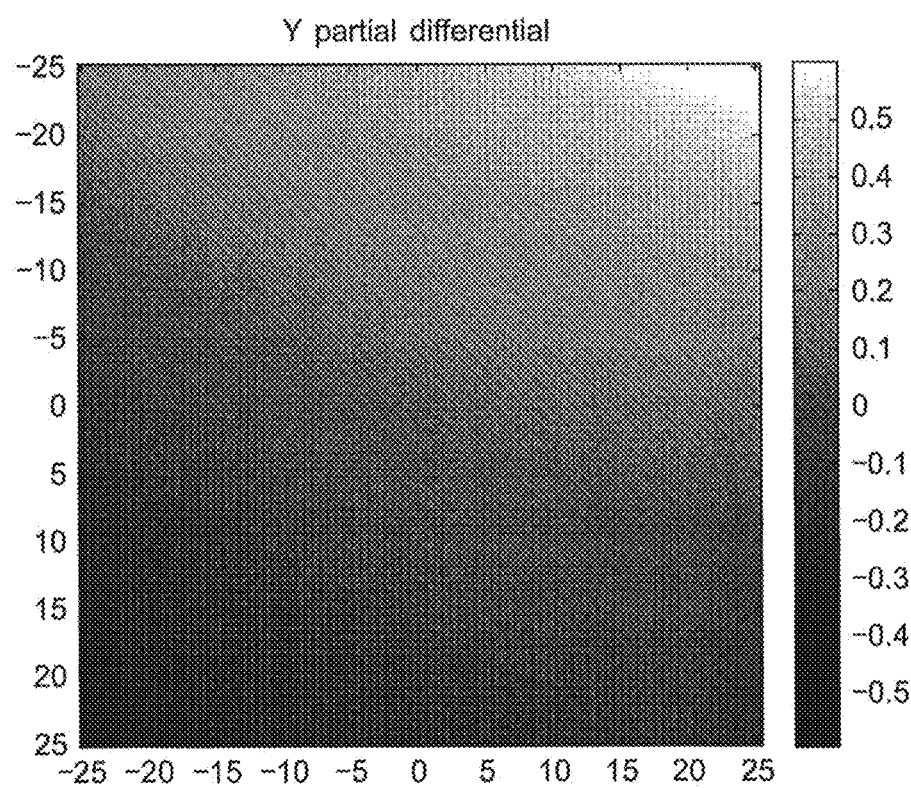
FIG. 34B is a diagram showing a distribution of an inclination angle at a second position.

FIG. 34A is a diagram showing the distribution of inclination angle in the first position. FIG. 34B is a diagram showing the distribution of inclination angle in the second position. The distribution of inclination angle shown in FIG. 34A and FIG. 34B is the distribution of inclination angle in a virtual sample.

The distribution of inclination angle shown in FIG. 34A is the distribution of inclination angle when the predetermined illumination region is moved to the first position. The first position is positioned on the X axis. Therefore, the distribution of inclination angle shown in FIG. 34A represents the distribution of inclination angle in the X direction.

The distribution of inclination angle shown in FIG. 34B is the distribution of inclination angle when the predetermined illumination region is moved to the second position. The second position is positioned on the Y axis. Therefore, the distribution of inclination angle shown in FIG. 34B represents the distribution of inclination angle in the Y direction.

In simulation, when the distribution of height or the distribution of inclination angle is to be calculated, the quantity of light in a case where the amount of tilt in a virtual sample is zero is calculated in advance. The distribution of height shown in FIG. 33 and the distribution of inclination angle shown in FIG. 34A and FIG. 34B show the difference from the quantity of light in a case where the amount of tilt is zero.

Figure 35:
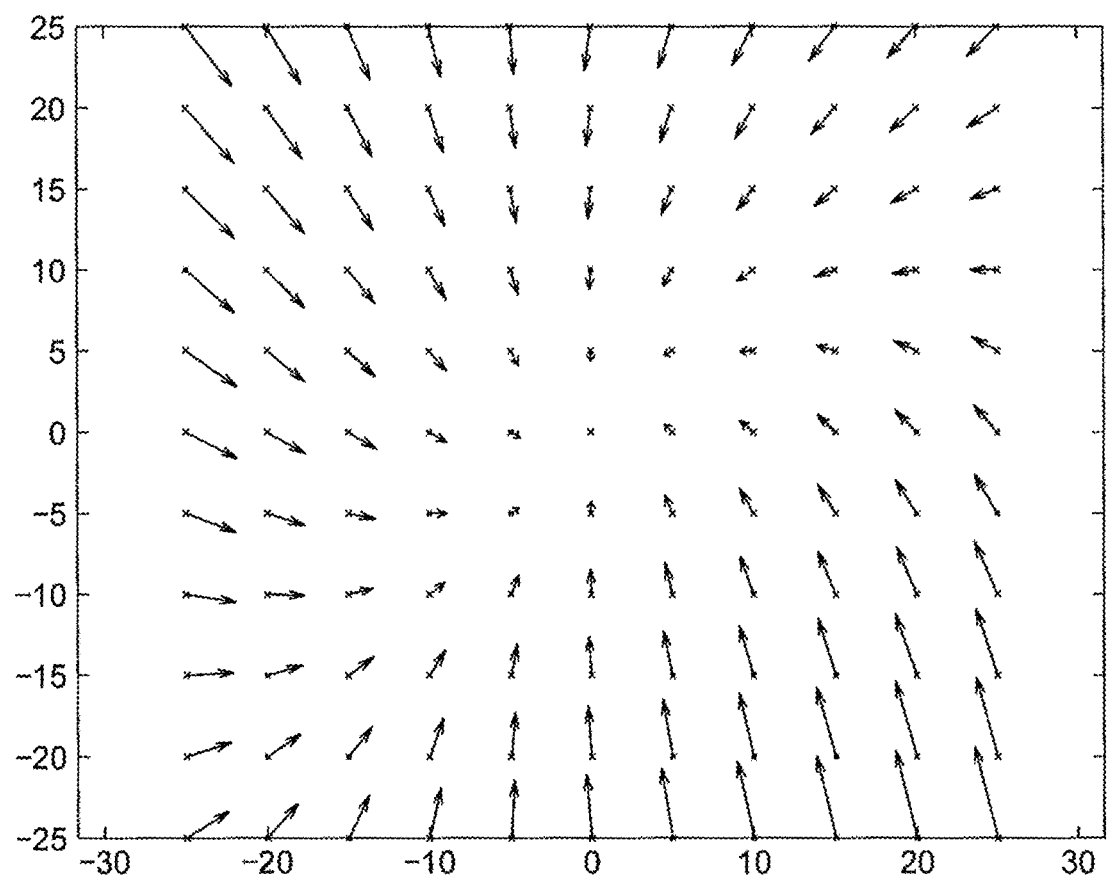
FIG. 35 is a diagram showing a tilt direction and an amount of tilt in a predetermined pixel.
Figure 36:
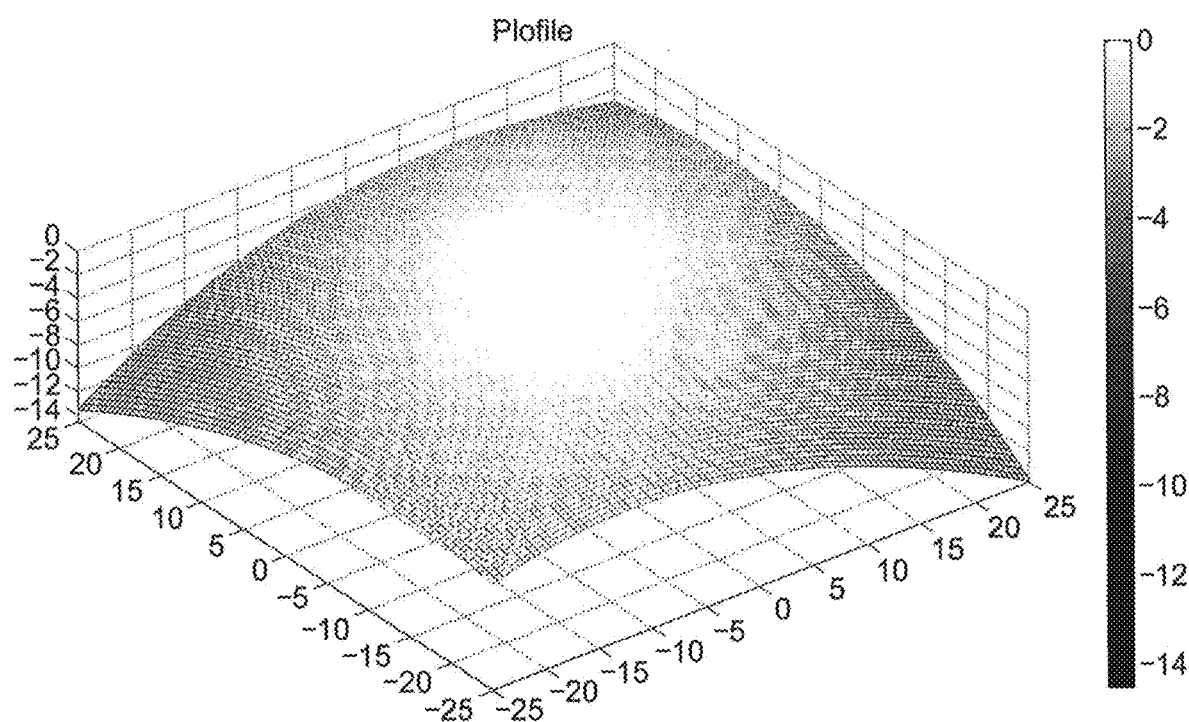
FIG. 36 is a diagram showing a height distribution of a virtual sample.

FIG. 35 is a diagram showing the tilt direction and the amount of tilt in a predetermined pixel. The tilt direction and the amount of tilt in a predetermined pixel is calculated from the distribution of inclination angle shown in FIG. 34A and FIG. 34B, that is, the amount of tilt in the Y direction and in the X direction of each pixel. In FIG. 35, "x" indicates an analysis point and the direction of an arrow shows the direction of tilt at the analysis point, and the length of an arrow indicates the amount of tilt (absolute value). The analysis point indicates the position of a predetermined pixel. Predetermined pixels are discretely extracted from all pixels. Therefore, the analysis points are also discretely distributed.

FIG. 365 is a diagram showing the height distribution of a virtual sample. This height distribution is derived using the result in FIG. 35. The height distribution may be analyzed using the above-noted result such that the directions of tilt and the amounts of tilt of adjacent pixels are smoothly connected. By doing this, it becomes possible to derive the height distribution of a sample surface smoothly. Examples of the analysis method include fitting and spline processing.

An example of measurement in which the sample shape measuring apparatus of the present embodiment is used will be described.

As mentioned above, the sample shape measuring apparatus of the present embodiment may further include the second light detection element. Accordingly, it is possible to carry out detection of fluorescent light by the second light detection element.

A sample shape measuring apparatus 1 shown in FIG. 1 includes an optical detector 20 as the second light detection element. Fluorescent light generated at the sample 7 is detected by the optical detector 20 via a confocal pinhole 19.

In the sample shape measuring apparatus 1, a confocal optical system is formed in an optical system from the sample 7 up to the optical detector 20. In the confocal optical system, an optical cross-sectional image (hereinafter, referred to as 'cross-sectional image') of a sample is acquired. Moreover, it is possible to acquire optical cross-sectional images at various heights (hereinafter, referred to as 'serial cross-sectional images') by varying a focal position along an optical axis direction. Even by moving a sample in the optical axis direction, without changing the focal position, it is possible to acquire serial cross-sectional images.

In a case in which the fluorescent light is received by the optical detector 20, it is possible to acquire a cross-sectional image of the fluorescent light. Moreover, by varying the focal position along the optical axis direction, it is possible to acquire serial cross-sectional images of the fluorescent light.

For acquiring a cross-sectional image efficiently at a desired position in the optical axis direction, it is preferable that the desired position and the focal position be brought to a coincident state as much as possible.

Moreover, for acquiring the serial cross-sectional images efficiently, it is preferable to vary the focal position between a position at which the height of the sample is the highest (hereinafter, referred to as 'highest position') and a position at which the height of the sample is the lowest (hereinafter, referred to as 'lowest position').

The intensity of the fluorescent light is $10^{-6}$ of the excitation light, which is extremely weak. In a fluorescent observation, a sample is stained in a substance which emits fluorescent light. When the excitation light is applied continuously to an object which emit the fluorescent light, discoloration occurs. As the discoloration occurs, the emission of the fluorescent light from the sample is ceased.

For such reason, it is preferable that the desired position and the focal position can be brought quickly to the coincident state. Moreover, it is preferable to start acquiring the cross-sectional image or to terminate acquiring the cross-sectional image near the highest position and near the lowest position.

The sample shape measuring apparatus of the present embodiment is capable of measuring the surface shape of a sample. Accordingly, based on the measurement result, even in a case of acquiring one cross-sectional image, it is possible to acquire the cross-sectional image at an arbitrary height. Moreover, it is possible to set a position of starting acquisition of the cross-sectional images and a position of terminating acquisition of the cross-sectional images near the highest position and near the lowest position.

Figure 37:
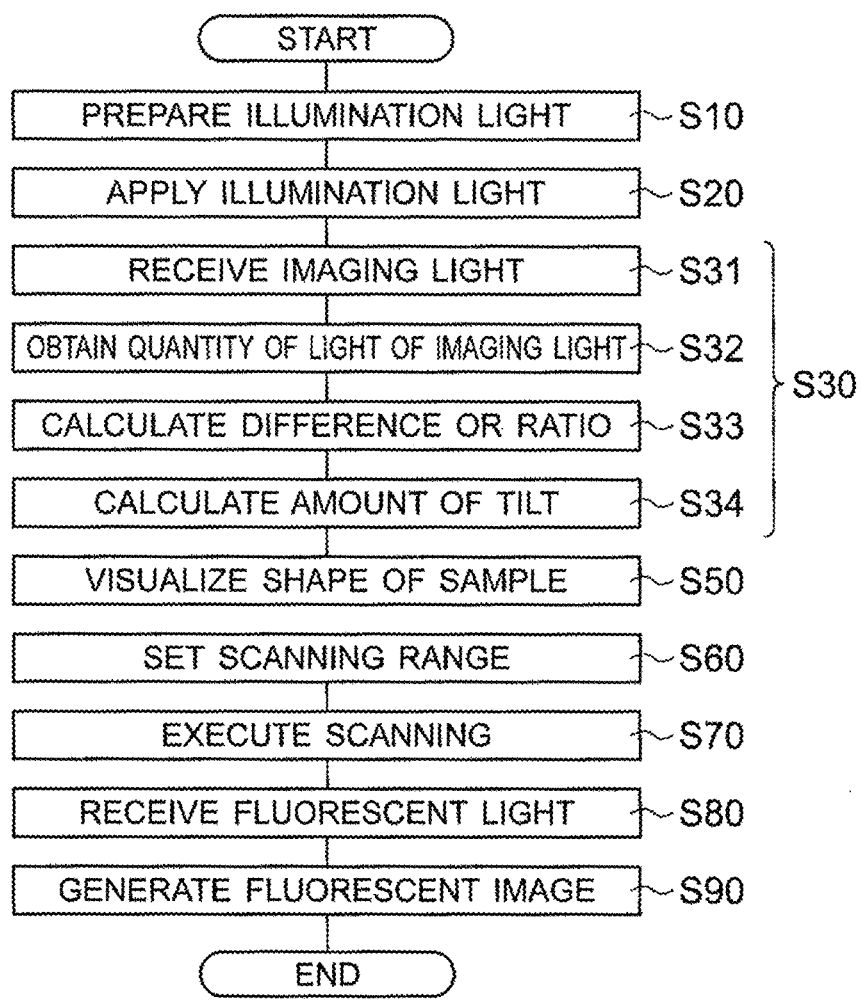
FIG. 37 is a flowchart showing a method of generating a fluorescent image.

FIG. 37 is a flowchart showing a method of generating a fluorescent image. Same numbers are assigned to steps identical to steps in flowchart of FIG. 32, and description thereof is omitted.

As step S50 is finished, step S60 is executed. Step S60 is a step of setting a scanning range. In scanning, there is a scanning in a plane which is orthogonal to an optical axis and a scanning in a direction along the optical axis. Let the scanning in a plane which is orthogonal to the optical axis be an XY-scanning. Let the scanning in the direction along the optical axis be a Z-scanning. At step S60, a scanning range of the XY-scanning and a scanning range of the Z-scanning are set. A scanning range in the optical axis direction is set.

As step S60 is finished, step S70 is executed. Step S70 is a step of executing scanning. At step S70, a range that has been set is subjected to an XYZ-scanning. Accordingly, a light spot moves over the range that has been set. In other words, the light spot is applied to the sample.

As step S70 is finished, step S80 is executed. Step S80 is a step of receiving fluorescent light. At step S80, the fluorescent light is received at the optical detector 20. The fluorescent light received at the optical detector 20 is converted to an electric signal.

As step S80 is finished, step S90 is executed. Step S90 is a step of generating a fluorescent image. At step S90, an image is generated based on the electric signal output from the optical detector 20. The generated image is an image acquired by a confocal optical system, or a so-called confocal image.

Since the confocal image is an image with an extremely narrow focal depth, it can be deemed as a cross-sectional image. By executing step S90, a fluorescent cross-sectional image is acquired.

The flowchart shown in FIG. 37 shows a case in which the range of the Z-scanning is set to a range for acquiring one cross-sectional image, at step S60. Accordingly, as step S90 is finished, the overall processing ends.

In a case in which the range of the Z-scanning is set to a range for acquiring a plurality of cross-sectional images, steps from step S70 to step S90 are executed repeatedly.

As mentioned above, the sample shape measuring apparatus of the present embodiment is equipped with a function of measuring the surface shape of a sample. Furthermore, the sample shape measuring apparatus of the present embodiment can be equipped with a confocal optical system. By the sample shape measuring apparatus of the present embodiment being equipped with the confocal optical system, it is possible to impart a function of acquiring a cross-sectional image to the sample shape measuring apparatus of the present embodiment.

The larger the number of the cross-sectional images, an amount of information related to the sample increases. Therefore, it is preferable to be able to acquire the cross-sectional images serially. In a case of acquiring the serial cross-sectional images, it is preferable to make small an amount of movement of the focal position as much as possible.

An apparatus having only the function of acquiring the cross-sectional image (hereinafter, referred to as 'first apparatus') and an apparatus having the sample shape measuring method of the present embodiment and the function of acquiring the cross-sectional image (hereinafter, referred to as 'second apparatus') will be compared.

As mentioned above, in the fluorescent sample, the discoloration occurs when the excitation light is applied. As the discoloration progresses, the fluorescent light generated from the sample becomes weak. In acquisition of the serial cross-sectional images, the excitation light is applied repeatedly to the sample. When applied time becomes excessively long, it becomes difficult to acquire a cross-sectional image having a high SN ratio. Similar is the case when the applied frequency becomes excessively large.

Figure 38A:
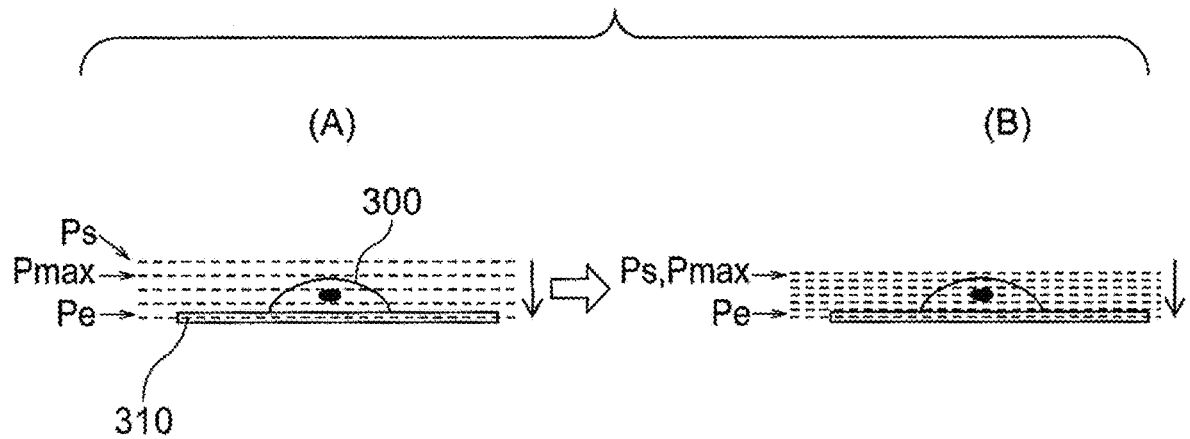
FIG. 38A is a diagram showing a state in which serial cross-sectional images are acquired by a first apparatus.

Acquisition of the serial cross-sectional images by the first apparatus will be described. FIG. 38A is a diagram showing a state in which serial cross-sectional images are acquired by the first apparatus. Here, (A) in FIG. 38A shows a state of a job before acquisition. Moreover, (B) in FIG. 38A shows a state of acquisition of the serial cross-sectional images.

In FIG. 38A, a position Pmax is the highest position at a sample 300, or a position near the highest position. A position Ps is a scanning-start position in the first apparatus. The position Ps is set at a height higher than a height at the position Pmax. A position Pe is a scanning-end position. Each of the position Pmax, the position Ps, and the position Pe is a position in an optical axis direction, with a bottom surface of a glass slide 310 as a point of origin.

For acquiring the serial cross-sectional images efficiently, it is preferable to set the position Ps as near as possible to the position Pmax. For this, a job for finding the position Pmax is to be carried out before acquiring the serial cross-sectional images.

In the first apparatus, as a job before acquisition of the serial cross-sectional images, a first scanning using the excitation light is carried out. In the first apparatus, no image except an image by the confocal optical system is acquired. In the confocal optical system, one cross-sectional image is acquired by the XY-scanning at one time. However, it is not possible to find the position Pmax by only one cross-sectional image. Similar is true for the lowest position.

Therefore, in the first apparatus, as shown in (A) of FIG. 38A, the first Z-scanning is carried out upon setting the scanning range roughly, before acquiring the serial cross-sectional images. At this time, the position Ps is to be set at a position adequately away from the position Pmax.

For determining the position Pmax as accurately as possible, the amount of movement of the focal position is made small. However, when the amount of movement of the focal position is small, the time for which the excitation light is applied to the sample 300 becomes long.

As mentioned above, in a fluorescent sample, the discoloration occurs when the excitation light is applied. For preventing the discoloration of the fluorescent light, the time for which the excitation light is applied to the sample 300 has to be made short. For such reason, as shown in (A) of FIG. 38A, in the first scanning, there is no other choice but to make the amount of movement of the focal position large.

By carrying out the first scanning, it is possible to find the height of the sample 300. In other words, the position Pmax is found. Accordingly, it is possible to set the position Ps based on the position Pmax. Although the description is omitted, since the lowest position on the sample 300 is also found, it is possible to set the position Pe as well.

By the position Ps and the position Pe being set, the scanning range of the Z-scanning is determined. When the amount of movement or the frequency of movement of the focal position is set, the second scanning, or in other words, the acquisition of the serial cross-sectional images becomes possible.

Moreover, (B) in FIG. 38A is a diagram showing a state of carrying out second scanning. Since the position Pmax is found, in the second scanning, unlike in the first scanning, the position Ps coincides with the position Pmax. Moreover, in the second scanning, an interval of moving the focal position has become narrower as compared to that in the first scanning. As a result, it is possible to acquire a large number of serial cross-sectional images.

Figure 38B:
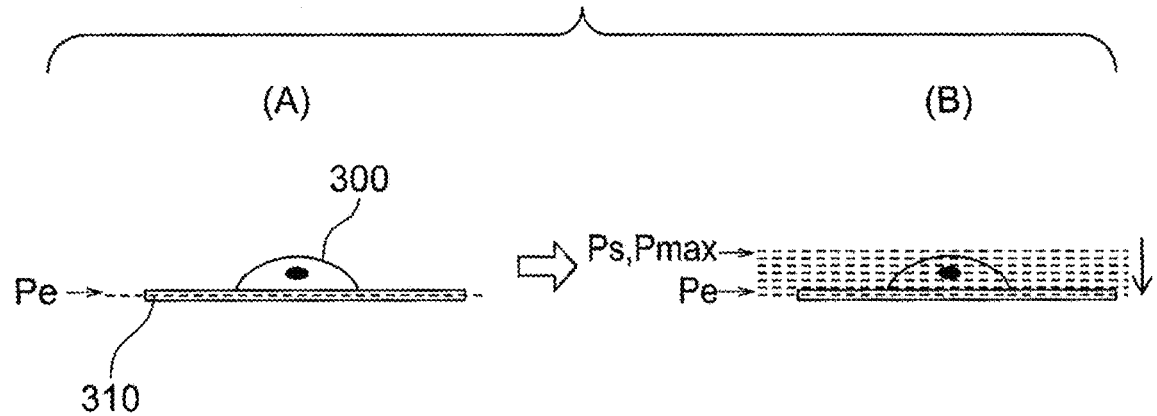
FIG. 38B is a diagram showing a state in which serial cross-sectional images are acquired by a second apparatus.

Acquisition of the serial cross-sectional images by the second apparatus will be described. FIG. 38B is a diagram showing a state in which serial cross-sectional images are acquired by the second apparatus. Here, (A) in FIG. 38B shows a state of a job before acquisition. Moreover, (B) in FIG. 38B shows a state of acquisition of the serial cross-sectional images are acquired.

Even in the second apparatus, as the job before acquisition of the serial cross-sectional images, the first scanning using the excitation light is carried out. In the second apparatus, the confocal optical system is not used. In other words, in the first scanning, the confocal lens 18, the confocal pinhole 19, and the optical detector 20 are not used. Instead, the detection optical system 4 shown in FIG. 1 is used. By using the detection optical system 4, it is possible to measure the surface shape of a sample.

In the second apparatus, the confocal lens 18, the confocal pinhole 19, and the detection optical system 20 are not used in the first scanning. Consequently, information acquired by the XY-scanning at one time is not information of one certain height of the sample, but, is information of the overall sample. In other words, in the second apparatus, it is possible to measure the shape of a sample by the XY-scanning at one time. Therefore, in the second apparatus, it is not necessary to move the focal position in the first scanning as in the first apparatus.

In the second apparatus, a focal position in the first XY-scanning is to be near the surface of the sample, at an interior of the sample 300, or near a bottom surface of the sample. In (A) in FIG. 38B, the focal position is set near a cover glass 310.

By carrying out the first scanning, it is possible to find the height of the sample. When a focal position in the first scanning is let to be a position Pe, a position Pmax is found with reference to the position Pe. Accordingly, it is possible to set a position Ps based on the position Pmax.

By the position Ps and the position Pe being set, the scanning range of the Z-scanning is determined. When the amount of movement or the frequency of movement of the focal position is set, the second scanning, or in other words, the acquisition of the serial cross-sectional images, becomes possible.

Moreover, (B) in FIG. 38B is a diagram showing a state of carrying out the second scanning. Since the position Pmax is found, the second scanning is carried out in a state in which the position Ps and the position Pmax coincide. As a result, as in the first apparatus, it is possible to acquire a large number of serial cross-sectional images.

As it is evident upon comparing (A) in FIG. 38A and (A) in FIG. 38B, in the first apparatus, the Z-scanning is carried out, whereas, in the second apparatus, the Z-scanning is not carried out. Therefore, in the second apparatus, the applied time of the excitation light is short as compared to that in the first apparatus. As a result, in the second apparatus, it is possible to reduce the discoloration as compared to that in the first apparatus.

Moreover, in the measurement of the surface shape of the sample, light transmitted through the sample 300 is used. An intensity of the transmitted light is extremely high as compared to the intensity of the fluorescent light. Therefore, in the second apparatus, even when the intensity of the excitation light is extremely small, it is possible to measure the surface shape of the sample. As a result, in the second apparatus, it is possible to reduce the discoloration as compared to that in the first apparatus.

The job before acquisition may be carried out at a plurality of focal positions. By making such arrangement, even when the height of the sample 300 is high, it is possible to measure the shape of the overall sample 300.

In this case, the Z-scanning is to be carried out similarly as in the first apparatus. However, a width (thickness of sample) that can be measured by the job at one time is much wider as compared to the cross-sectional image in the first apparatus. Therefore, it is possible to make the frequency of the Z-scanning extremely small as compared to that in the first apparatus. Moreover, as mentioned above, in the second scanning, the intensity of the excitation light is small as compared to that in the first apparatus. Therefore, even when the Z-scanning is carried out, in the second apparatus, it is possible to reduce the discoloration as compared to that in the In the sample shape measuring apparatus of the present embodiment, it is preferable that the light of the first wavelength band be light of a wavelength band in which the fluorescent light is not excited, the light of the second wavelength band is a light of a wavelength band in which the fluorescent light is excited, and the illumination light is applied to the sample such that the light of the first wavelength band is applied prior to applying the light of the second wavelength band.

In the abovementioned description, the job before acquisition in the second apparatus was carried out with the excitation light. However, since the transmitted light is used in the measurement of the surface shape of the sample, the excitation light may not be used in the job before acquisition.

Therefore, in the second apparatus, the job before acquisition is carried out by the light of the first wavelength band. The light of the first wavelength band is light of a wavelength band in which the fluorescent light is not excited. In this case, even when the applied time of the illumination light is long, the discoloration does not occur. As a result, in the second apparatus, it is possible to reduce the discoloration as compared to that in the first apparatus.

Figure 39:
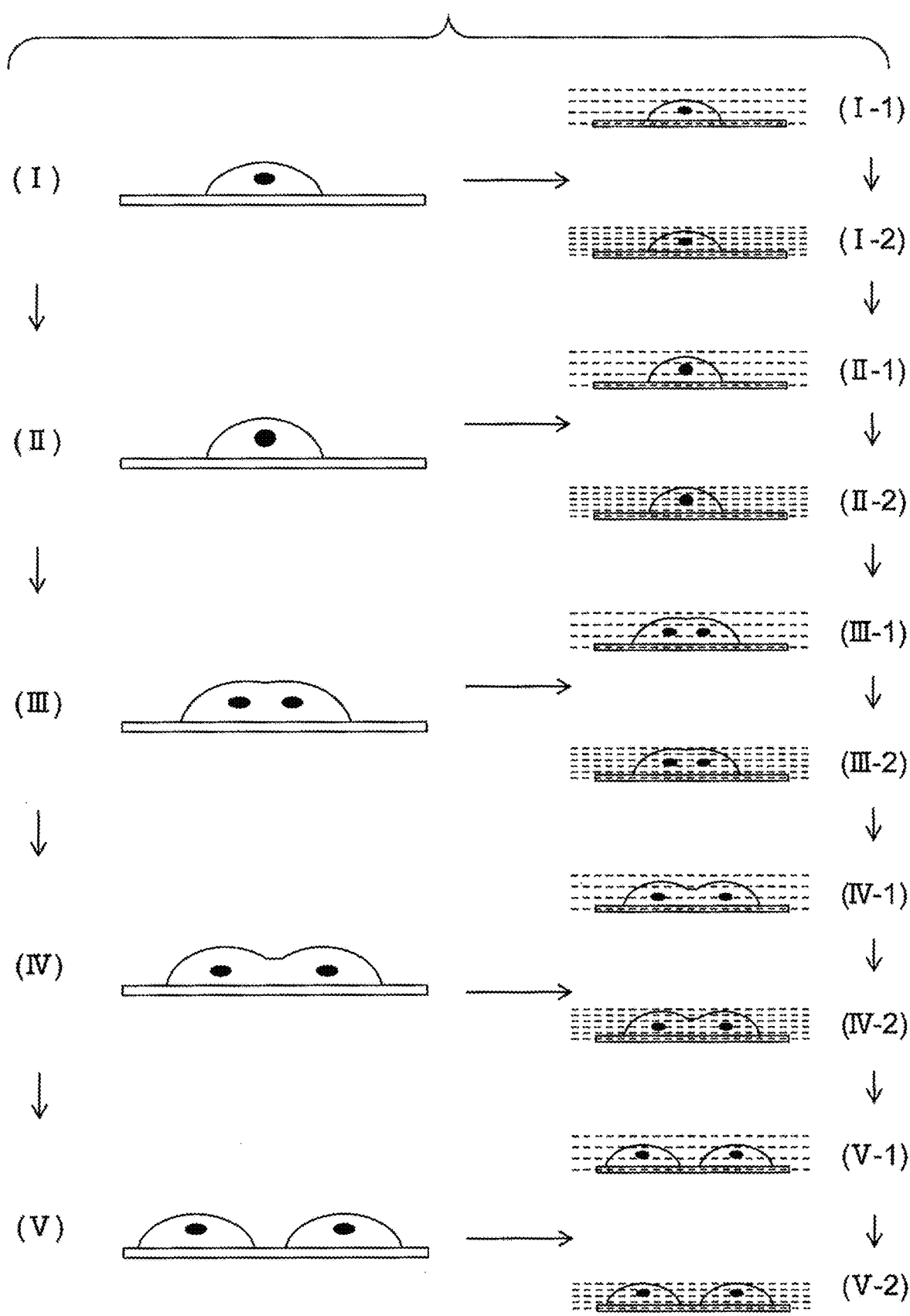
FIG. 39 is a diagram showing a state of an observation by the first apparatus.
Figure 40:
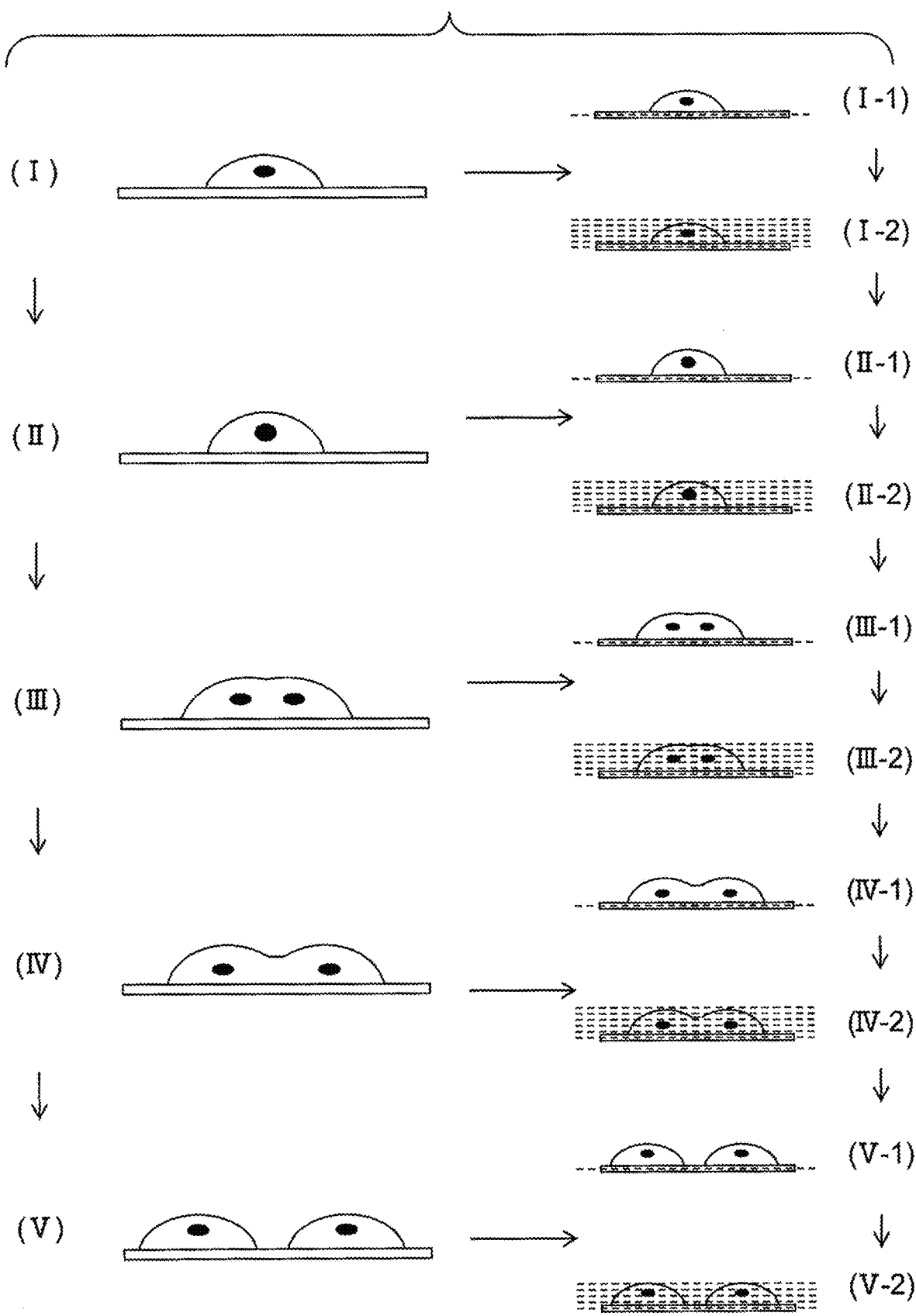
FIG. 40 is a diagram showing a state of an observation by the second apparatus.

It is possible to use the sample shape measuring apparatus of the present embodiment for a time-lapse observation. FIG. 39 is a diagram showing a state of an observation by the first apparatus. FIG. 40 is a diagram showing a state of an observation by the second apparatus.

In FIG. 39 and FIG. 40, a state in which a cell is divided is shown. A cell undergoes variation from a state (I) to a state (V). It is possible to acquire various information by acquiring serial cross-sectional images in each state.

Although the description in detail is omitted, the excitation light is applied to a cell at the time of observation of (I-2), (II-2), (III-2), (IV-2), and (V-2) in both of a time-lapse observation by the first apparatus and a time-lapse observation by the second apparatus.

However, in the time-lapse observation by the first apparatus, the excitation light is applied to a cell even for (I-1), (II-1), (III-1), (IV-1), and (V-1). Furthermore, the intensity of the excitation light at that time is almost same as the intensity of the excitation light for (I-2), (II-2), (III-2), (IV-2), and (V-2).

On the other hand, also in the time-lapse observation by the second apparatus, the excitation light is applied to a cell even for (I-1), (II-1), (III-1), (IV-1), and (V-1). However, in the second apparatus, the Z-scanning is not carried out. Therefore, in the second apparatus, the applied time of the excitation light is short as compared to that in the first apparatus. Furthermore, in the second apparatus, the intensity of the excitation light is small as compared to that in the first apparatus. Therefore, it is possible to reduce the discoloration as compared to that in the time-lapse observation by the first apparatus.

In the second apparatus, the light of the first wavelength band, or in other words, light of a wavelength band in which the fluorescent light is not excited, may be applied to the sample for (I-1), (II-1), (III-1), (IV-1), and (V-1). By doing so, it is possible to further reduce the discoloration.

In the sample shape measuring apparatus of the present embodiment, it is possible to acquire three-dimension information by carrying out the XYZ-scanning. Therefore, it is possible to display information acquired in different forms.

Figure 41A:
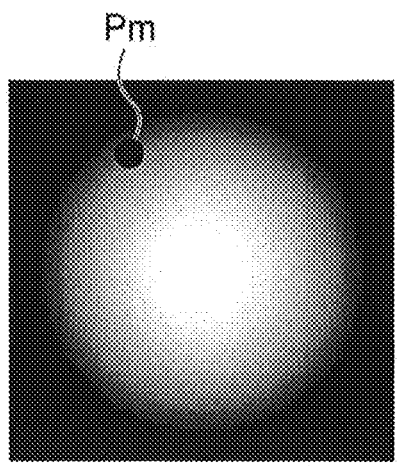
FIG. 41A is a diagram showing a display example 1.
Figure 41B:
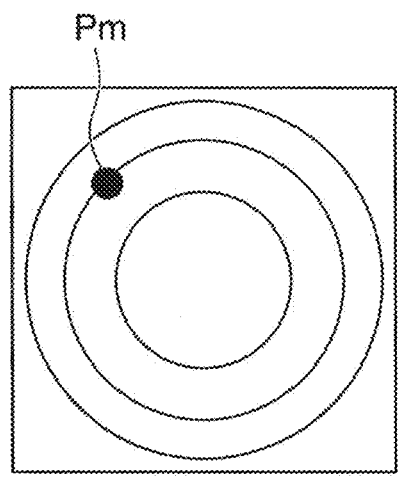
FIG. 41B is a diagram showing a display example 2.
Figure 41C:
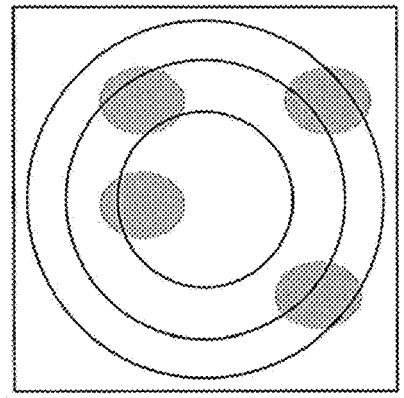
FIG. 41C is a diagram showing a display example 3.

A state in which acquired information is displayed in an XY plane is shown in FIG. 41A, FIG. 41B, and FIG. 41C. FIG. 41A shows a display example 1. FIG. 41B shows a display example 2, and FIG. 41C shows a display example 3.

In the display example 1, information of a height of a sample is shown in light and dark. The information of the height of a sample may be displayed by changing colors. In the display example 2, information of the height of a sample is displayed by contour lines. As shown the diagrams, in both the display example 1 and the display example 2, it is possible to display a measurement point Pm for example.

In the display example 3, information of the height of a sample is displayed by contour lines, and furthermore, fluorescent image having a circular shape is shown. In the sample shape measuring apparatus of the present embodiment, the job before acquisition and the second scanning are carried out. Prior to the second scanning, it is possible to display the scanning range in the second scanning by superimposing on an image displayed by the contour lines.

Figure 42A:
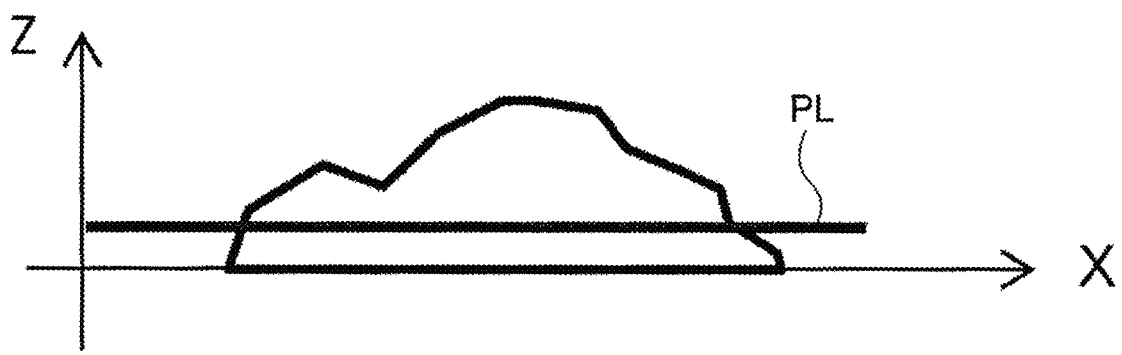
FIG. 42A is a diagram showing a display example 4.
Figure 42B:
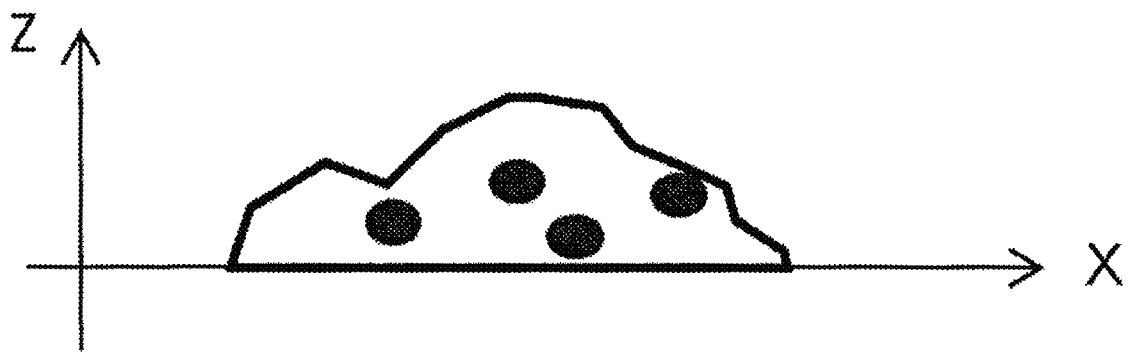
FIG. 42B is a diagram showing a display example 5.

A state in which acquired information is displayed in the XZ-plane is shown in FIG. 42A and FIG. 42B. FIG. 42A is a diagram showing a display example 4 and FIG. 42B is a diagram showing a display example 5.

In the display example 4, a state in which a measured surface is superimposed on a cross-section of a sample is displayed. In the display example 5, a state in which a fluorescent image having a circular shape is superimposed on a cross-section of a sample is displayed.

Figure 43A:
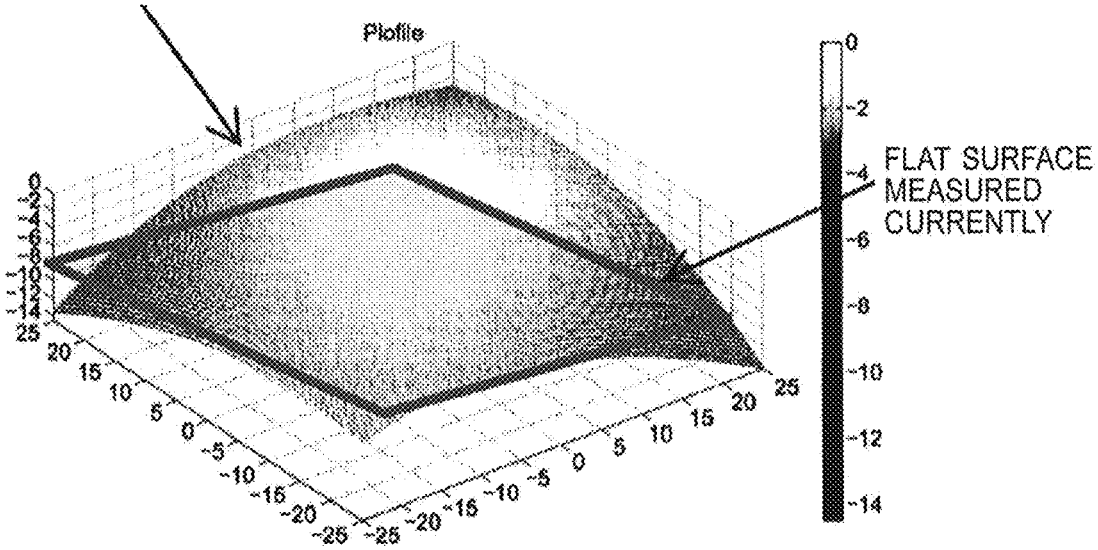
FIG. 43A is a diagram showing a display example 6.
Figure 43B:
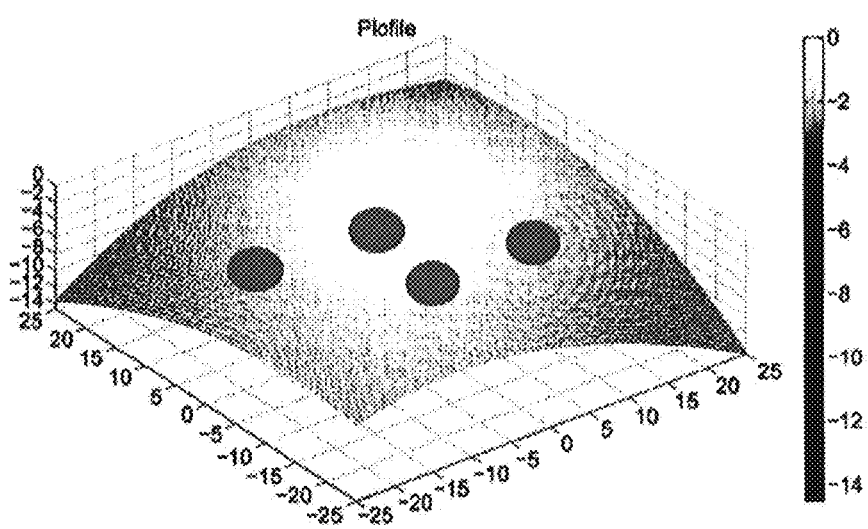
FIG. 43B is a diagram showing a display example 7.

A state in which acquired information is displayed stereoscopically is shown in FIG. 43A and FIG. 43B. FIG. 43A is a diagram showing a display example 6 and FIG. 43B is a diagram showing a display example 7.

In the display example 6, a state in which information of the height of a sample is shown by a birds eye view and a measured surface is superimposed on the birds eye view is displayed. In the display example 7, a state in which information of the height of a sample is shown by a birds eye view and a fluorescent image having a circular shape is superimposed on the birds eye view is displayed.

Figure 44A:
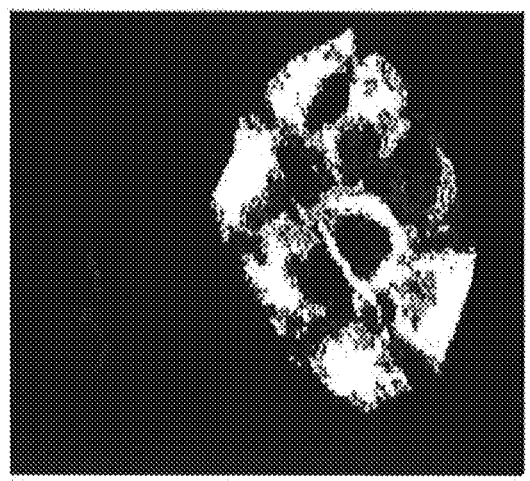
FIG. 44A is a florescent image of a sample.
Figure 44B:
FIG. 44B is an image showing a distribution of an inclination angle in an X-direction.
Figure 44C:
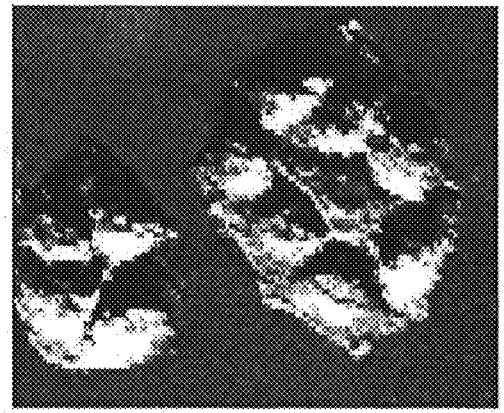
FIG. 44C is an image showing a distribution of an inclination angle in a Y-direction.
Figure 45:
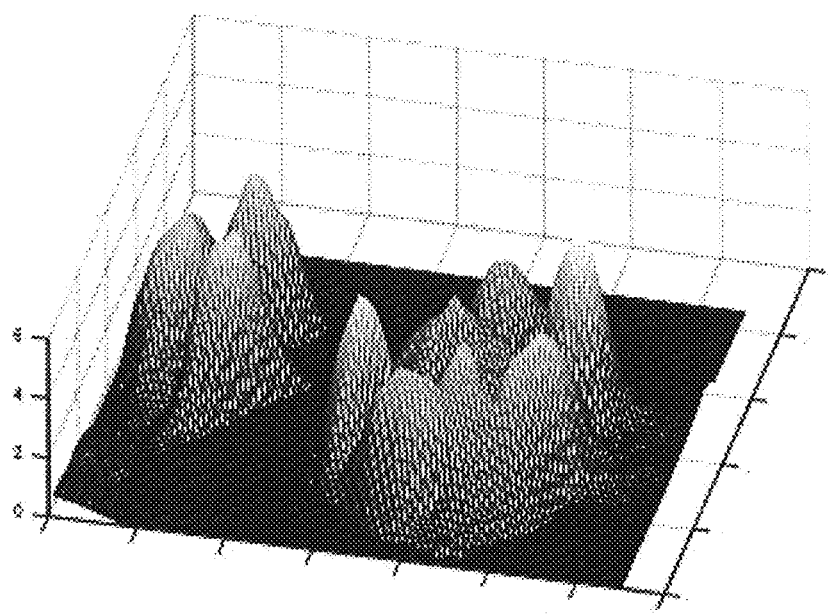
FIG. 45 is a diagram showing a height of a sample.

An example of measurement by the sample shape measuring apparatus of the present embodiment is shown. FIG. 44A is a fluorescent image of a sample. FIG. 44B is an image showing a distribution of an inclination angle in an X-direction. FIG. 44C is an image showing a distribution of an inclination angle in a Y-direction. FIG. 45 is a diagram showing the height of a sample.

The fluorescent image of the sample is acquired by detecting the fluorescent light. Therefore, a region in which the fluorescent light is not generated is displayed by black. An image indicating the distribution of the inclination angle is acquired by detecting the transmitted light. Therefore, light and dark locations differ in the fluorescent image and the image indicating the distribution of the inclination angle.

Both the image shown in FIG. 44B and the image shown in FIG. 44C include information of the height of a sample. Therefore, it is possible to acquire information of the height of a sample from the two images as shown in FIG. 45.

According to the present embodiment, it is possible to provide a sample shape measuring apparatus which is capable of measuring a surface shape of a sample with high accuracy even for a sample for which a reflectance of the surface is low.

As described heretofore, the present invention is suitable for a sample shape measuring apparatus which is capable of measuring a surface shape of a sample with high accuracy even for a sample for which a reflectance of the surface is low.

What is claimed is:

1. A sample shape measuring apparatus, comprising:
a light source unit; an illumination optical system; a detection optical system; a light detection element; and a processing apparatus, wherein
the illumination optical system and the detection optical system are disposed to face each other with a sample interposed therebetween,
light emitted from the light source unit is incident on the illumination optical system,
a light spot is formed between the illumination optical system and the detection optical system by the illumination optical system,
a scanning unit is disposed in an optical path from the light source unit to the light detection element,
the scanning unit relatively moves the light spot and the sample,
illumination light applied to the sample by the illumination optical system is transmitted through the sample,
light transmitted through the sample is incident on the detection optical system,
the light detection element receives light emerged from the detection optical system,
at least one of the illumination optical system and the detection optical system includes an optical member, and
the processing apparatus
obtains a quantity of light based on a received light,
calculates at least one of a difference and a ratio between the quantity of light and a reference quantity of light,
calculates an amount of tilt at a surface of the sample based on at least one of the difference and the ratio, and
calculates a shape of the sample from the amount of tilt.

2. The sample shape measuring apparatus according to claim 1, wherein
the detection optical system includes the optical member,
the optical member is an aperture member having a light-shielding part or a darkening part, and a transmission part, and
the transmission part is positioned so as to include an outer side and a part of an inner side of an image of a pupil of the illumination optical system.

3. The sample shape measuring apparatus according to claim 1, wherein
the detection optical system includes the optical member,
the optical member is an aperture member having a light-shielding part or a darkening part, and a transmission part,
the light-shielding part or the darkening part is positioned so as to include an optical axis of the detection optical system, and
the transmission part is positioned so as to include an outer side and a part of an inner side of an image of a pupil of the illumination optical system.

4. The sample shape measuring apparatus according to claim 1, wherein
the detection optical system includes the optical member,
the optical member is an aperture member having a light-shielding part or a darkening part, and a transmission part,
the light-shielding part or the darkening part is positioned so as to include an optical axis of the detection optical system, and
the transmission part is positioned so as not to include the optical axis, but to include an entire edge of an image of a pupil of the illumination optical system.

5. The sample shape measuring apparatus according to claim 4, wherein
the illumination optical system includes an objective lens,
the detection optical system includes a pupil projection lens,
the following conditional expression is satisfied:

$$R0 < Rill \times \beta < R1$$

where,
R0 denotes a length from an optical axis of the pupil projection lens up to a predetermined position,
R1 denotes a length from the optical axis of the pupil projection lens up to an outer edge of the transmission part, and denotes a length on a line connecting the optical axis of the pupil projection lens and a predetermined position, and here
the predetermined position is a position at which a length from the optical axis of the pupil projection lens is the minimum, from among positions on an inner edge of the light-shielding part,
Rill denotes a radius of the pupil of the illumination optical system, and
β denotes a value obtained by dividing a focal length of the pupil projection lens by a focal length of the objective lens.

6. The sample shape measuring apparatus according to claim 1, wherein
the detection optical system includes the optical member,
the optical member is an aperture member having a light-shielding part or a darkening part, and a transmission part,
the light-shielding part or the darkening part is positioned so as to include an optical axis of the detection optical system, and
the transmission part is eccentric with respect to the optical axis, and is positioned so as to include a part of an edge of an image of a pupil of the illumination optical system.

7. The sample shape measuring apparatus according to claim 1, wherein
the illumination optical system includes the optical member, and
the optical member is an aperture member having a light-shielding part or a darkening part, and a transmission part.

8. The sample shape measuring apparatus according to claim 1, wherein the processing apparatus has a function of reconstructing an image.

9. The sample shape measuring apparatus according to claim 1, wherein
the illumination optical system include an objective lens,
further comprising a first aperture member and a second aperture member to be inserted to and removed from an optical path,
in the first aperture member, a portion including an optical axis of the objective lens is a light-shielding part,
the first aperture member has a first opening at a position eccentric with respect to the optical axis,
in the second aperture member, a portion including the optical axis of the objective lens is a light-shielding part,
the second aperture member has a second opening at a position eccentric with respect to the optical axis, and
a direction connecting the optical axis with a centroid of the first opening when the first aperture member is inserted to the optical path intersects a direction connecting the optical axis with a centroid of the second opening when the second aperture member is inserted to the optical path.

10. The sample shape measuring apparatus according to claim 1, wherein
the illumination optical system include an objective lens,
the optical member is a aperture member,
in the aperture member, a portion including an optical axis of the objective lens is a light-shielding part,
the aperture member has a first opening and a second opening at a position eccentric with respect to the optical axis, and
a direction connecting the optical axis with a centroid of the first opening when the aperture member is inserted to the optical path intersects a direction connecting the optical axis with a centroid of the second opening.

11. The sample shape measuring apparatus according to claim 1, wherein
the illumination optical system include an objective lens,
the optical member is a aperture member,
in the aperture member, a portion including an optical axis of the objective lens is a light-shielding part,
the aperture member has an opening at a position eccentric with respect to the optical axis, and
a direction connecting the optical axis with a centroid of the opening is changeable.

12. The sample shape measuring apparatus according to claim 1, wherein
the illumination optical system include an objective lens,
the optical member is a aperture member which has a light-shielding part, and
at least one of a size of the light-shielding part and a numerical aperture on a sample side of the objective lens is variable.

13. The sample shape measuring apparatus according to claim 12, wherein a change in a numerical aperture on a sample side of the objective lens is carried out by switching a plurality of objective lenses.

14. The sample shape measuring apparatus according to claim 1, wherein
in a step of calculating the amount of tilt, the amount of tilt is calculated based on a correspondence relation obtained in advance.

15. The sample shape measuring apparatus according to claim 14, wherein the correspondence relation is represented by a lookup table including a quantity of light and an amount of tilt as parameters.

16. The sample shape measuring apparatus according to claim 14, wherein the correspondence relation is represented by an expression including a quantity of light and an amount of tilt as parameters.

17. The sample shape measuring apparatus according to claim 1, further comprising:
a second light detection element to detect radiated light from the sample, wherein
detection of fluorescence is preformed by the second light detection element.

18. The sample shape measuring apparatus according to claim 1, wherein
the illumination light is applied to the sample by light of a first wavelength band and light of a second wavelength band, and
the first wavelength band includes at least a wavelength band which is different from the second wavelength band.

19. The sample shape measuring apparatus according to claim 18, wherein
the light of the first wavelength band is light of a wavelength band in which fluorescent light is not excited,
the light of the second wavelength band is light of a wavelength band in which the fluorescent light is excited, and
the illumination light is applied to the sample such that the light of the first wavelength band is applied prior to applying the light of the second wavelength band.

* * * * *